United States Patent [19]
Driskell

[11] Patent Number: 5,933,138
[45] Date of Patent: Aug. 3, 1999

[54] METHOD TO ASSESS THE PHYSICAL EFFORT TO ACQUIRE PHYSICAL TARGETS

[76] Inventor: Stanley W. Driskell, 4830 Washtenaw Ave., No. C2, Ann Arbor, Mich. 48108

[21] Appl. No.: 08/991,480

[22] Filed: Dec. 16, 1997

Related U.S. Application Data

[62] Division of application No. 08/641,230, Apr. 30, 1996.

[51] Int. Cl.⁶ .......................................... G06F 3/00
[52] U.S. Cl. .................................. 345/333; 707/6
[58] Field of Search ................................. 345/333, 334; 707/1, 3, 6

[56] References Cited

PUBLICATIONS

Myers, Brad A., "User Interface Software Tools," *ACM Transactions on Computer–Human Interaction*, Mar. 1995, pp. 64–103.

Olson, Judith R. and Gary M. Olson, "The Growth of Cognitive Modeling in Human–Computer Interaction Since GOMS," *Human–Computer Interaction*, 1990, pp. 221–265.

Card, Stuart K., Thomas P. Moran and Allen Newell, "The Model Human Processor: An Engineering Model of Human Performance," in Boff, K.R., L. Kaufman and J.P. Thomas (eds), *Handbook of Perception and Human Performance; Cognitive Processes and Performance*, 1986, pp. 45/1 –45/35.

Stuart K. Card, William K. English, and Betty J. Burr, "Evaluation of Mouse, Rate–Controlled Isometric Joystick, Step Keys, and Text Keys for Text Selection on a CRT," *Ergonomics*, 1978, pp. 602–613.

Riecken, D., et al, "Dealing with Complexity: Uniting Agents and Direct Manipulators," Cort. on Human Factors in Computer Systems, p. 191 1995.

Remington, R.J., "Demonstration of Lockheed Computer-–Human Interface Rapid Prototyping", Human Society 35th Annual Meeting, p. 1171 1991.

Berry, R E, et al, "The Evolution of the Common User Access Workplace Model," *IBM Systems Journal*, v.31, N3, pp. 414–428, 1992.

Jiang, Jian–Ping, "Automating a Human Factors Evaluation of Graphical User Interface . . . ," 2nd Int. Sym. on Ground Data Systems, pp. 685–690 1992.

Drury, Colin and Errol R. Hoffmann, "A Model for Movement Time on Data–Entry Keyborads," *Ergonomics*, 1992, pp. 129–147.

Fitts, Paul M., "The Information Capacity of the Human Motor System in Controlling the Amplitude of Movement," *Journal of Experimental Psychology*, 1954, pp. 381–391.

Fitts, Paul M. and James R. Peterson, "Information Capacity of Discrete Motor Responses," *Journal of Experimental Psychology*, 1964, pp. 103–112.

(List continued on next page.)

*Primary Examiner*—A. Katbab
*Attorney, Agent, or Firm*—Harness, Dickey & Pierce, P.L.C.

[57] ABSTRACT

An objective, quantitative metric is used in a system that measures the physical effort expended by a user on computer input devices while the user manages the functionality of application software so that an evaluation of the desirability of computer-human interfaces being evaluated is generated. For certain convex polygonal targets of arbitrary size and location relative to a target acquiring device, the present invention identifies a circular subset of points that permits determination of the width and distance parameters of Fitts' Index of Difficulty and thus, permits objective quantification of the physical effort incurred in acquiring a target via computer input devices. The invention itself presents a method for symbolically expressing actual targets appearing on a computer-human interface and physical actions required by a user to accomplish a task set utilizing the application software. This symbolic capability also presents procedures for storing relevant alterations to actual targets occasioned by user manipulations. Targets to which the invention applies are computer interface entities in the shapes of triangles, standard rectangles, parallelograms, trapezoids, and general convex quadrilaterals.

1 Claim, 59 Drawing Sheets

PUBLICATIONS

Gillan, Douglas J., Kritina Holden, Susan Adam, Marianne Rudisill, and Laura Magee, "How Does Fitts' Law Fit Pointing and Dragging?" *CHI '90 Proceedings,* 1990, pp. 227–234.

Jagacinski, Richard J., Daniel W. Repperger, Martin S. Moran, Sharon L. Ward, and Betty Glass, "Fitts' Law and the Microstructure of Rapid Discrete Movements," *Journal of Experimental Psychology: Human Perception and Performance,* 1980, pp. 309–320.

Kerr, Barry A. and Gary D. Langolf, "Speed of Aiming Movements," *Quarterly Journal of Experimental Psychology,* 1977, pp. 475–481.

Langolf, Gary D., Don B. Chaffin, James A. Foulke, "An Investigation of Fitts' Law Using a Wide Range of Movement Amplitudes," *Journal of Motor Behavior,* 1976, pp. 113–128.

MacKenzie, I. Scott, "A Note on the Information–Theoretic Basis for Fitts' Law," *Journal of Motor Behavior,* 1989, pp. 323–330.

MacKenzie, I. Scott, "Fitts' Law as a Research and Design Tool in Human–Computer Interaction," *Human–Computer Interaction,* 1992, pp. 91–139.

Ware, Colin and Ravin Balakrishnan, "Reaching for Objects in VR Displays; Lag and Frame Rate," *ACM Transactions on Computer–Human Interaction,* 1994, pp. 331–356.

Welford, Alan T., *Fundamentals of Skill,* 168, Chapter 5, pp. 137–160.

Card, Stuart K., Jock D. Mackinlay, and George G. Robertson, "The Design Space of Input Devices," *CHI '90 Proceedings,* 1990. pp. 117–124.

Mackinlay, Jock D., Stuart K. Card, and George G. Robertson, "A Semantic Analysis of the Design Space of Input Devices," *Human–Computer Interaction,* 1990, pp. 145–190.

Moran, Thomas P., "The Command Language Grammar: A Representation for the User Interface of Interactive Computer Systems," *International Journal of Man–Machine Studies,* 1981, pp. 3–50.

Sharratt, B.D., "Top–Down Interactive Systems Design: Some Lessons Learnt From Using Command Language Grammar," *Human–Computer Interaction –Interact '87,* pp. 395–399.

Specifications of the Graphic-User-Interface and Standard Test Suite Artifacts

\# Define variable constants:

\D[SCREEN = (11.5, 8.5)]
\D[WINDOW.window = (11.0, 8.0)]
\D[PORT.view = (10.5, 6.3)]
\D[CANVAS.canvas = (10.5, 20.0)]
\D[SIZE.Icon = (0.3, 0.3)]
\D[SIZE.Option= (1.3, 0.3)]
\D[SIZE.HorScroll = (9.9, 0.3)]
\D[SIZE.VerScroll = (0.3, 5.7)]

\# Define the Icon Structure

\GC[CLASS=IconClass, SHAPE=STDRECT(SIZE.Icon)]
\GS[STRUCTURE=IconStru,
　　START
　　　\GO[OBJECT=<Icon1,Icon2,Icon3>,　　　　　　　　　CLASS=IconClass,　LOCATION=(0,0)]
　　　\GO[OBJECT=<Icon4>,　　　　　　　　　　　　　　CLASS=IconClass,　LOCATION=Icon3(TR(+0.1,0.0))]
　　　\GO[OBJECT=<Cut,Copy,Paste,>,　　　　　　　　　CLASS=IconClass,　LOCATION=Icon4(TR(+0.1,0.0))]
　　　\GO[OBJECT=<Icon8,Icon9>,　　　　　　　　　　　CLASS=IconClass,　LOCATION=Paste(TR(+0.1,0.0))]
　　　\GO[OBJECT=<Icon10,Icon11,Icon12>,　　　　　　 CLASS=IconClass,　LOCATION=Icon9(TR(+0.1,0.0))]
　　　\GO[OBJECT=<Icon13>,　　　　　　　　　　　　　 CLASS=IconClass,　LOCATION=Icon12(TR(+0.1,0.0))]
　　　\GO[OBJECT=<Icon14,Icon15,Icon16,Icon17>,　　　CLASS=IconClass,　LOCATION=Icon13(TR(+0.1,0.0))]
　　　\GO[OBJECT=<Bold,Italic,Underline>,　　　　　　CLASS=IconClass,　LOCATION=Icon17(TR(+0.1,0.0))]
　　　\GO[OBJECT=<Icon21>,　　　　　　　　　　　　　 CLASS=IconClass,　LOCATION=Underline(TR(+0.1,0.0))]
　　END]

FIGURE 9B

\# Define the Drop-Down Bar Menu Structure

\GS[STRUCTURE=TopLevStru
  START
    \GE[ENTITY=<File>,      SHAPE=STDRECT(0.5,0.3),  LOCATION=(0.0,0.0)]
    \GE[ENTITY=<View>,      SHAPE=STDRECT(0.8,0.3),  LOCATION=(0.5,0.0)]
    \GE[ENTITY=<Edit>,      SHAPE=STDRECT(0.8,0.3),  LOCATION=(1.3,0.0)]
    \GE[ENTITY=<Tools>,     SHAPE=STDRECT(1.4,0.3),  LOCATION=(2.1,0.0)]
    \GE[ENTITY=<Window>,    SHAPE=STDRECT(0.7,0.3),  LOCATION=(3.5,0.0)]
    \GE[ENTITY=<Format>,    SHAPE=STDRECT(1.1,0.3),  LOCATION=(4.2,0.0)]
    \GE[ENTITY=<Options>,   SHAPE=STDRECT(1.0,0.3),  LOCATION=(5.3,0.0)]
  END,
  /TEXT=TAG]
\GC[CLASS=OptClass,         SHAPE=STDRECT(SIZE.Option)]
\GS[STRUCTURE=EditStru,     OBJECT=<Undo,Redo,Repeat,Cut,Copy,Paste,(B)>,           CLASS=OptClass, /TEXT=TAG)]
\GS[STRUCTURE=FmtStru,      OBJECT=<Size Font,Type Font,Italic,Bold,Underline,(B)>, CLASS=OptClass, /TEXT=TAG)]

\GT[TREESTRU=MenuStru       STRUCTURE=TopLevStru
  \GA[ASSOCIATION=Lev1,
  START
    \GP[PARENT=Edit,        ASSOCIATION=EditOpt,  STRUCTURE=EditStru,  LOCATION=Edit(BL)]
    \GP[PARENT=Format,      ASSOCIATION=FmtOpt,   STRUCTURE=FmtStru,   LOCATION=Format(BL)]
  END]

\# Define Horizontal and Vertical Scroll Bars

\GC[CLASS=ButtonClass,      SHAPE=STDRECT(SIZE.Icon)]
\GC[CLASS=SliderClass,      SHAPE=STDRECT(SIZE.Icon)]

FIGURE 9C

```
\GS[STRUCTURE=HorScrollStru
   START
      \GO[OBJECT=LeftScrollButton,    CLASS= ButtonClass,                    LOCATION=(0.0,0.0)]
      \GE[ENTITY=HorScrollBar,        SHAPE=STDRECT(SIZE.HorScroll),         LOCATION=LeftScrollButton(TR)]
      \GO[OBJECT=HorSlider,           CLASS= SliderClass,                    LOCATION=HorScrollBar(TL(+2.4,+0.0))]
      \GO[OBJECT=RightScrollButton,   CLASS= ButtonClass,                    LOCATION=HorScrollBar(TR)]
   END]

\GS[STRUCTURE=VerScrollStru
   START
      \GO[OBJECT=UpScrollButton,      CLASS= ButtonClass,                    LOCATION=(0.0,0.0)]
      \GE[ENTITY=VerScrollBar,        SHAPE=STDRECT(SIZE.VerScroll),         LOCATION=UpScrollButton(BL)]
      \GO[OBJECT=VerSlider,           CLASS= SliderClass,                    LOCATION=VerScrollBar(TL(+0.0,+3.5))]
      \GO[OBJECT=DownScrollButton,    CLASS= ButtonClass,                    LOCATION=VerScrollBar(BL)]
   END]

\# Define the ViewPort Structure

\GS[STRUCTURE=ViewPortStru
   START
      \GE[ENTITY=Canvas,              SHAPE=STDRECT(CANVAS.Canvas),          LOCATION=(0.0,0.0)]
      \GE[ENTITY=ViewPort,            SHAPE=STDRECT(PORT.Port),              LOCATION=(0.0,0.0)]
      \GO[OBJECT=HorScroll,           CLASS= HorScrollStru,                  LOCATION=ViewPort(BL)]
      \GO[OBJECT=VerScroll,           CLASS= VerScrollStru,                  LOCATION=ViewPort(TR)]
   END]
```

FIGURE 9D

```
# Define the Window

\GC[CLASS=TitleBarClass,           SHAPE=STDRECT(9.9,0.3)]
\GC[CLASS=WindowClass,             SHAPE=STDRECT(WINDOW.window)]

\GS[STRUCTURE=GUIStru,
    START
      \GE[ENTITY=Window,           SHAPE=STDRECT(WINDOW.Window),   LOCATION=(0.0,0.0,0.0)]
      \GO[OBJECT=Close,                                            LOCATION=(0,0)]
      \GE[ENTITY=TitleBar,         SHAPE=STDRECT(9.9,0.3),         LOCATION=Close(TR)]
      \GO[OBJECT=Minimize,         CLASS=ButtonClass,              LOCATION=TitleBar(TR)]
      \GO[OBJECT=Maximize,         CLASS=ButtonClass,              LOCATION=Minimize(TR)]
      \GA[ASSOCIATION=Menu,        STRUCTURE=MenuStru,             LOCATION=(0.0,0.0,0.4)]
      \GA[ASSOCIATION=Icon,        STRUCTURE=IconStru,             LOCATION=(0.0,0.0,0.8)]
      \GA[ASSOCIATION=VP,          STRUCTURE=ViewPortStru,         LOCATION=(0.0,1.2)]
    END]

GA[ASSOCIATION=W,   STRUCTURE=GUIStru,   LOCATION=SCREEN(+0.1,+0.1),   /FOCUS=ALLOW]

Populate Application With Artifacts of Standard Test Suite

\GE[ENTITY=W.VP<Trap>,     SHAPE=QUAD((0.83,2.74),(1.02,2.93),(1.59,3.03),(1.02,2.19)),   /MIDDLE=DELETE]
\GE[ENTITY=W.VP<Circle>,   SHAPE=CIRCLE((0.25),(8.35,4.70)),                              /APEX=SCALE]
\GE[ENTITY=W.VP<Trian>,    SHAPE=TRIANGLE((7.04,2.69),(7.17,3.17),(7.35,2.48)),           /MIDDLE=MOVE]
\GE[ENTITY=W.VP<Rect>,     SHAPE=STDREC((8.20,2.90),(8.50,3.65)),                         /EDGE=SCALE]
\GE[ENTITY=W.VP<Panel1>,   SHAPE=STDRECT((2.56,4.04),(5.69,4.53)),                        /TEXT=PARAGRAPH]
\GE[ENTITY=W.VP<Panel2>,   SHAPE=STDRECT((0.36,5.24),(4.05,5.52)),                        /TEXT=PARAGRAPH]
\GT[TARGET=W.VP<Panel1>,   TEXT="This is a string of text which is to receive some bold font before paste."]
\GT[TARGET=W.VP<Panel2>,   TEXT="Quoted text ""indicated here"" is the portion to cut."]
```

FIGURE 9E

Exemplar Task Templates

TASK: Target-Acquire     ACTION: RubberRect     ARGS: TARGET=$tag$, CORNER=$id$, DISPLACE=$(\{+|-\}\Delta_x, \{+|-\}\Delta_x)$, PRECISION$_1$=$\varepsilon$, PRECISION$_2$=$\delta$, BUTTON=$b$
PO: Cursor to ([CORNER$_x$] $\{+|-\}$[DISPLACE$_x$],[CORNER$_Y$ $\{+|-\}$[DISPLACE$_Y$]) $\pm$ [PRECISION$_1$] of [TARGET]
PO: Press [BUTTON] button
PO: Cursor to ([OPP-CORNER$_x$] $\{+|-\}$[DISPLACE$_x$],[OPP-CORNER$_Y$]$\{+|-\}$[DISPLACE$_Y$]) $\pm$ [PRECISION$_2$] of [TARGET]
PO: Release [BUTTON] button TASK: Target-Acquire     ACTION: SingleClick     ARGS: TARGET=$tag$, BUTTON=$b$
PO: Cursor to middle of [TARGET]
PO: Single click [BUTTON] button TASK: Target-Acquire     ACTION: Press     ARGS: TARGET=$tag$, BUTTON=$b$
PO: Cursor to middle of [TARGET]
PO: Press [BUTTON] button TASK: Edge-Acquire     ACTION: Press     ARGS: TARGET=$tag$, EDGE=$id$, BUTTON=$b$
PO: Cursor to [EDGE] edge of [TARGET]
PO: Press [BUTTON] button TASK: Corner-Acquire     ACTION: Press     ARGS: TARGET=$tag$, CORNER=$id$, BUTTON=$b$
PO: Cursor to [CORNER] corner of [TARGET]
PO: Press [BUTTON] button TASK: Artifact-AbsMove     ACTION: Drag     ARGS: ABSCOORD=$(x,y)$, PRECISION=$\varepsilon$, BUTTON=$b$
PO: Cursor to [ABSCOORD] $\pm$ [PRECISION]
PO: Release [BUTTON] button TASK: Artifact-RelMove     ACTION: Drag     ARGS: RELCOORD=$(\{+|-\}x, \{+|-\}y)$, PRECISION=$\varepsilon$, BUTTON=$b$
PO: Displace cursor by [RELCOORD] $\pm$ [PRECISION] units
PO: Release [BUTTON] button

FIGURE 9F

Exemplar Task Templates (continued)

TASK: Text-Acquire    ACTION: Drag    ARGS: TARGET=tag, STARTTXT=$(x_S,y_S)$, ENDTXT=$(x_E,y_E)$, BUTTON=b
PO: Cursor to [STARTTXT] of [TARGET]
PO: Press [BUTTON] button
PO: Cursor to [ENDTXT] of [TARGET]
PO: Release [BUTTON] button TASK: Icon-Acquire    ACTION: SingleClick    ARGS: ICON=id, BUTTON=b
PO: Cursor to middle of [ICON]
PO: Single click of [BUTTON] button TASK: Lev$_2$Menu-Acquire    ACTION: SingleClick    ARGS: MENU$_1$=lev1-optn, MENU$_2$=lev2-optn, BUTTON=b
PO: Cursor to middle of [MENU$_1$]
PO: Single click of [BUTTON] button
PO: Cursor to middle of [MENU$_2$]
PO: Single click of [BUTTON] button TASK: Menu-Activate    ACTION: SimulButton    ARGS: BUTTON$_1$=i, BUTTON$_2$=j
PO: Simultaneous single click of [BUTTON$_1$] and [BUTTON$_2$] buttons TASK: OneKey-Stroke    ACTION: KeyStroke    ARGS: KEY=k
PO: Stroke [KEY] key TASK: TwoKey-Stroke    ACTION: SumulStroke    ARGS: KEY$_1$=func, KEY$_2$=alpha
PO: Simultaneous Stroke of [KEY$_1$] and [KEY$_2$] keys

FIGURE 9G

Exemplar Method Templates

METHOD: Target-Delete
  TASK: Target-Acquire    TECH:    FuncKey        ARGS: TARGET=*tag*, KEY=delete, BUTTON=left
                                ACTION: SingleClick    ARGS: TARGET=*tag*, BUTTON=left
  TASK: OneKey-Stroke           ACTION: KeyStroke     ARGS: KEY=delete METHOD: Target-Delete
  TASK: Target-Acquire    TECH:    IconSelect     ARGS: TARGET=*tag*, ICON=cut, BUTTON=left
                                ACTION: SingleClick    ARGS: TARGET=*tag*, BUTTON=left
  TASK: Icon-Acquire            ACTION: SingleClick    ARGS: ICON=cut, BUTTON=left METHOD: Target-Delete
  TASK: Target-Acquire    TECH:    MenuBarSel  ARGS: TARGET=*tag*, MENU$_1$=edit, MENU$_2$=cut, BUTTON=left
                                ACTION: SingleClick    ARGS: TARGET=*tag*, BUTTON=left
  TASK: Lev$_2$Menu-Acquire  ACTION: SingleClick    ARGS: MENU$_1$=edit, MENU$_2$=cut, BUTTON=left METHOD: Target-Delete
  TASK: Target-Acquire    TECH:    SpiderMenu ARGS: TARGET=*tag*, MENU$_1$=edit, MENU$_2$=cut,
                                                                MENUACTIVATE=(left,right), BUTTON=left
  TASK: Target-Acquire          ACTION: SingleClick    ARGS: TARGET=*tag*, BUTTON=left
  TASK: Menu-Activate         ACTION: SimulButton    ARGS: MENUACTIVATE=(left,right)
  TASK: Lev$_2$Menu-Acquire  ACTION: SingleClick    ARGS: MENU$_1$=edit, MENU$_2$=cut, BUTTON=left METHOD: Target-RelMove  TECH: TargetDrag  ARGS: TARGET=*tag*, RELCOORD=({+|-}*x*,{+|-}*y*), PRECISION=$\epsilon$, BUTTON=left
  TASK: Target-Acquire          ACTION: Press          ARGS: TARGET=*tag*, BUTTON=left
  TASK: Artifact-RelMove      ACTION: Drag           ARGS: RELCOORDS=({+|-}*x*,{+|-}*y*), PRECISION=$\epsilon$, BUTTON=left METHOD: Target-AbsMove  TECH: TargetDrag  ARGS: TARGET=*tag*, ABSCOORD=(*x,y*), PRECISION=$\epsilon$, BUTTON=left
  TASK: Target-Acquire          ACTION: Press          ARGS: TARGET=*tag*, BUTTON=left
  TASK: Artifact-AbsMove     ACTION: Drag           ARGS: ABSCOORDS=(*x,y*), PRECISION=$\epsilon$, BUTTON=left METHOD: Target-RelScale  TECH:    EdgeDrag    ARGS: TARGET=*tag*, EDGE=*id*, RELCOORD=({+|-}*x*,{+|-}*y*), PRECISION=$\epsilon$,
                                                                 BUTTON=left
  TASK: Edge-Acquire           ACTION: Press          ARGS: TARGET=*tag*, EDGE=*id*, BUTTON=left
  TASK: Artifact-RelMove      ACTION: Drag           ARGS: RELCOORDS=({+|-}*x*,{+|-}*y*), PRECISION=$\epsilon$, BUTTON=left

FIGURE 9H

Exemplar Method Templates (continued)

METHOD: Target-AbsScale  TECH: EdgeDrag  ARGS: TARGET=*tag*, EDGE=*id*, ABSCOORD=(x,y), PRECISION=ε, BUTTON=left
  TASK: Edge-Acquire  ACTION: Press  ARGS: TARGET=*tag*, EDGE=*id*, BUTTON=left
  TASK: Artifact-AbsMove  ACTION: Drag  ARGS: ABSCOORDS=(x,y), PRECISION=ε, BUTTON=left

METHOD: Target-AbsScale  TECH: CornerDrag  ARGS: TARGET=*tag*,CORNER=*id*, ABSCOORD=(x,y), PRECISION=ε, BUTTON=left
  TASK: Corner-Acquire  ACTION: Press  ARGS: TARGET=*tag*, CORNER=*id*, BUTTON=left
  TASK: Artifact-AbsMove  ACTION: Drag  ARGS: ABSCOORDS=(x,y), PRECISION=ε, BUTTON=left

METHOD: Text Cut-Paste  TECH: KeyEquiv  ARGS: $tgt_1=tag_1$, $stxt_1=(x_{ST1}, y_{ST1})$, $etxt_1=(x_{ET1}, y_{ET1})$,
    $tgt_2=tag_2$, $stxt_2=(x_{ST2}, y_{ST2})$, $etxt_2=(x_{ET2}, y_{ET2})$,
    $KEY_1$=ctrl, cut=x, paste=v, BUTTON=left
  TASK: Text-Acquire  ACTION: Drag  ARGS: TARGET$_1$=$tag_1$, STARTTXT=$stxt_1$=$(x_{ST1}, y_{ST1})$, ENDTXT=$etxt_1$=$(x_{ET1}, y_{ET1})$, BUTTON=left
  TASK: TwoKey-Stroke  ACTION: SimulStroke  ARGS: $KEY_1$=ctrl, $KEY_2$=cut=x
  TASK: Text-Acquire  ACTION: Drag  ARGS: TARGET$_2$=$tag_2$, STARTTXT=$stxt_2$=$(x_{ST2}, y_{ST2})$, ENDTXT=$etxt_2$=$(x_{ET2}, y_{ET2})$, BUTTON=left
  TASK: TwoKey-Stroke  ACTION: SimulStroke  ARGS: $KEY_1$=ctrl, $KEY_2$=paste=v

METHOD: Text-CutPaste  TECH: IconSelect  ARGS: $tgt_1=tag_1$, $stxt_1=(x_{ST1}, y_{ST1})$, $etxt_1=(x_{ET1}, y_{ET1})$,
    $tgt_2=tag_2$, $stxt_2=(x_{ST2}, y_{ST2})$, $etxt_2=(x_{ET2}, y_{ET2})$,
    cut=cut, paste=paste, BUTTON=left
  TASK: Text-Acquire  ACTION: Drag  ARGS: TARGET=$tag_1$, STARTTXT=$stxt_1$=$(x_{ST1}, y_{ST1})$, ENDTXT=$etxt_1$=$(x_{ET1}, y_{ET1})$, BUTTON=left
  TASK: Icon-Select  ACTION: Icon  ARGS: ICON=cut=cut, BUTTON=left
  TASK: Text-Acquire  ACTION: Drag  ARGS: TARGET=$tag_2$, STARTTXT=$stxt_2$=$(x_{ST2}, y_{ST2})$, ENDTXT=$etxt_2$=$(x_{ET2}, y_{ET2})$, BUTTON=left
  TASK: Icon-Select  ACTION: Icon  ARGS: ICON=paste=paste, BUTTON=left

FIGURE 9I

Exemplar Method Templates (continued)

METHOD: Text-CutPaste

TECH: MenuBarSel ARGS: $tgt_1=tag_1$, $stxt_1=(x_{ST1}, y_{ST1})$, $etxt_1=(x_{ET1}, y_{ET1})$,
$tgt_2=tag_2$, $stxt_2=(x_{ST2}, y_{ST2})$, $etxt_2=(x_{ET2}, y_{ET2})$,
$MENU_1$=edit, cut=cut, paste=paste, BUTTON=left TASK: Text-Acquire ACTION: Drag ARGS: TARGET=$tgt_1$, STARTTXT=$stxt_1=(x_{ST1}, y_{ST1})$, ENDTXT=$etxt_1=(x_{ET1}, y_{ET1})$, BUTTON=left
TASK: Lev$_2$Menu-Acquire ACTION: SingleClick ARGS: $MENU_1$=edit, $MENU_2$=cut=cut, BUTTON=left
TASK: Text-Acquire ACTION: Drag ARGS: TARGET=$tgt_2$, STARTTXT=$stxt_2=(x_{ST2}, y_{ST2})$, ENDTXT=$etxe_2=(x_{ET2}, y_{ET2})$, BUTTON=left
TASK: Lev$_2$Menu-Acquire ACTION: SingleClick ARGS: $MENU_1$=edit, $MENU_2$=paste=paste, BUTTON=left

METHOD: Text-CutPaste

TECH: SpiderMenu ARGS: $tgt_1=tag_1$, $stxt_1=(x_{ST1}, y_{ST1})$, $etxt_1=(x_{ET1}, y_{ET1})$,
$tgt_2=tag_2$, $stxt_2=(x_{ST2}, y_{ST2})$, $etxt_2=(x_{ET2}, y_{ET2})$,
$MENU_1$=edit, cut=cut, paste=paste, MENUACTIVATE=(left,right), BUTTON=left TASK: Text-Acquire ACTION: Drag ARGS: TARGET=$tgt_1=tag_1$, STARTTXT=$stxt_1=(x_{ST1}, y_{ST1})$, ENDTXT=$etxt_1=(x_{ET1}, y_{ET1})$, BUTTON=left
TASK: Menu-Activate ACTION: SimulButton ARGS: MENUACTIVATE=(left,right)
TASK: Lev$_2$Menu-Acquire ACTION: SingleClick ARGS: $MENU_1$=edit, $MENU_2$=cut=cut, BUTTON=left
TASK: Text-Acquire ACTION: Drag ARGS: TARGET=$tgt_2=tag_2$, STARTTXT=$stxt_2=(x_{ST2}, y_{ST2})$, ENDTXT=$etxt_2=(x_{ET2}, y_{ET2})$, BUTTON=left
TASK: Menu-Activate ACTION: SimulButton ARGS: MENUACTIVATE=(left,right)
TASK: Lev$_2$Menu-Acquire ACTION: SingleClick ARGS: $MENU_1$=edit, $MENU_2$=paste=paste, BUTTON=left

METHOD: Text-Bold

TECH: KeyEquiv ARGS: TARGET=tag, STARTTXT=$(x_S, y_S)$, ENDTXT=$(x_E, y_E)$, $KEY_1$=ctrl, $KEY_2$=b, BUTTON=left TASK: Text-Acquire ACTION: Drag ARGS: TARGET=tag, STARTTXT=$(x_S, y_S)$, ENDTXT=$(x_E, y_E)$, BUTTON=left
TASK: TwoKey-Stroke ACTION: SimulStroke ARGS: $KEY_1$=ctrl, $KEY_2$=b

FIGURE 9J

Exemplar Method Templates (continued)

METHOD: Text-Bold  TECH: IconSelect  ARGS: TARGET=*tag*, STARTTXT=$(x_S, y_S)$, ENDTXT=$(x_E, y_E)$, ICON=bold, BUTTON=left

TASK: Text-Acquire  ACTION: Drag  ARGS: TARGET=*tag*, STARTTXT=$(x_S, y_S)$, ENDTXT=$(x_E, y_E)$, BUTTON=left
TASK: Icon-Acquire  ACTION: Icon  ARGS: ICON=bold, BUTTON=left

METHOD: Text-Bold  TECH: MenuBarSel  ARGS: TARGET=*tag*, STARTTXT=$(x_S, y_S)$, ENDTXT=$(x_E, y_E)$, MENU$_1$=font, MENU$_2$=bold, BUTTON=left

TASK: Text-Acquire  ACTION: Drag  ARGS: TARGET=*tag*, STARTTXT=$(x_S, y_S)$, ENDTXT=$(x_E, y_E)$, BUTTON=left
TASK: Lev$_2$Menu-Acquire  ACTION: SingleClick  ARGS: MENU$_1$=font, MENU$_2$=bold, BUTTON=left

METHOD: Text-Bold  TECH: SpiderMenu  ARGS: TARGET=*tag*, STARTTXT=$(x_S, y_S)$, ENDTXT=$(x_E, y_E)$, MENU$_2$=font, MENU$_2$=bold, MENUACTIVATE=(left,right), BUTTON=left

TASK: Text-Acquire  ACTION: Drag  ARGS: TARGET=*tag*, STARTTXT=$(x_S, y_S)$, ENDTXT=$(x_E, y_E)$, BUTTON=left
TASK: Menu-Activate  ACTION: SimulButton  ARGS: MENUACTIVATE=(left,right)
TASK: Lev$_2$Menu-Acquire  ACTION: SingleClick  ARGS: MENU$_1$=font, MENU$_2$=bold, BUTTON=left

FIGURE 9K

Detailed Method Expansion for Attainment of Sub-Goal 3 Using Spider Menu

METHOD: Text-CutPaste   TECH: SpiderMenu   ARGS: $tgt_1$=$Panel_1$, $stxt_1$=(2.12,0.26), $etxt_1$=(0.06,0.06), $tgt_2$=$Panel_2$, $stxt_2$=(1.97,0.06), $etxt_2$=(0.96,0.06), $MENU_1$=edit, cut=cut, paste=paste, MENUACTIVATE=(left,right), BUTTON=left TASK: Text-Acquire   ACTION: Drag   ARGS: TARGET=$tgt_1$=$Panel_1$, STARTTXT=$stxt_1$=(2.12,0.26), ENDTXT=$etxt_1$=(0.06,0.06), BUTTON=left
   PO: Cursor to (2.12,0.26) of $Panel_1$
   PO: Press left button
   PO: Cursor to (0.06,0.06) of $Panel_1$
   PO: Release left button TASK: Menu-Activate   ACTION: SimulButton   ARGS: MENUACTIVATE=(left,right)
   PO: Simultaneous single click of left and right buttons TASK: $Lev_2$Menu-Acquire   ACTION: SingleClick   ARGS: $MENU_1$=edit, cut=cut, BUTTON=left
   PO: Cursor to middle of menu.edit
   PO: Single click of left button
   PO: Cursor to middle of menu.edit.cut
   PO: Single click of left button TASK: Text-Acquire ACTION: Drag ARGS: TARGET=$tgt_2$=$Panel_2$, STARTTXT=$stxt_2$=(1.97,0.06), ENDTXT=$etxt_2$=(0.96,0.06), BUTTON=left
   PO: Cursor to (1.97,0.06) of $Panel_2$
   PO: Press left button
   PO: Cursor to (0.96,0.06) of $Panel_2$
   PO: Release left button TASK: Menu-Activate   ACTION: SimulButton   ARGS: MENUACTIVATE=(left,right)
   PO: Simultaneous single click of left and right buttons TASK: $Lev_2$Menu-Acquire   ACTION: SingleClick   ARGS: $MENU_1$=edit, $MENU_3$=paste, BUTTON=left
   PO: Cursor to middle of menu.edit
   PO: Single click of left button
   PO: Cursor to middle of menu.edit.paste
   PO: Single click of left button

FIGURE 9L

TERMINAL SESSION HISTORY: DROP-DOWN MENU-BAR FOCUS

Sub-Goal 1: Delete Trap
Method: Target-Delete    TECH: MenuBarSel    Approach: Menu Bar activation
IFG: |C[VP<Trap>]1C(L)|C[VP.menu<edit>]1C(L)|C[VP.menu.edit<cut>]1C(L)    ARGS: TARGET=Trap
Effort: E[TASK→TrapAcquire]=3.91   E[TASK→EditCut]=5.93   E[METHOD→Total]=9.84

Sub-Goal 2: Set text to bold
Method: Text-Bold    TECH: MenuBarSel    Approach: Menu Bar activation
IFG: |C[VP<Panel1>(CHAR=(1.17,0.26))]|CP(L)[VP<Panel1>(CHAR=(2.49,0.06))]R    ARGS: TARGET=Panel1, STARTTEXT=(1.17,0.26), ENDTEXT=(2.49,0.06)
|C[VP.menu<font>]1C(L)|C[VP.menu.font<bold>]1C(L)
Effort: E[TASK→TextSel]=8.82   E[TASK→FontBold]=6.41   E[METHOD→Total]=15.23

Sub-Goal 3: Replace quoted text
Method: Text-CutPaste    TECH: MenuBarSel    Approach: Menu Bar activation
ARGS: $tgt_1$=Panel1, $stxt_1$=(2.12,0.26), $etxt_1$=(0.06,0.06),
$tgt_2$=Panel2, $stxt_2$=(0.96,0.06), $etxt_2$=(1.97,0.06),
IFG |C[VP<Panel1>(CHAR=(2.12,0.26))]|CP(L)[VP<Panel1>(CHAR=(0.06,0.06))]R|C[VP.menu<edit>]1C(L)|C[VP.menu.edit<cut>]1C(L)
|C[VP<Panel2>(CHAR=(0.96,0.06))]|CP(L)[VP<Panel2>(CHAR=(1.97,0.06))]R|C[VP.menu<edit>]1C(L)|C[VP.menu.edit<paste>]1C(L)
Effort: E[TASK→TextSel]=9.21   E[TASK→EditCut]=6.42   E[TASK→TextSel]=8.95   E[TASK→EditPaste]=7.20   E[METHOD→Total]=31.78

Sub-Goal 4: 1-Dim relative scale of Rec
Method: Target-RelScale    TECH: EdgeDrag    Approach: Relative drag
IFG: |C[VP<Rect>(EDGE=L)]|CP(L)|VP<WS>(WHITESPACE=(0.05),(CURSOR(-0.92,0.0)))R    ARGS: TARGET=Rect, EDGE=L, RELCOORD=(-0.9,0.0)   PRECISION=0.05
Effort: E[TASK→EdgeAcquire]=7.87   E[TASK→EdgeDrag]=3.35   E[METHOD→Total]=11.22

Sub-Goal 5: Relative move of Triangle
Method: Target-RelMove    TECH: TargetDrag    Approach: Relative drag
IFG: |C[VP<Trian>]|CP(L)|VP<WS>(WHITESPACE=(0.20),(CURSOR(+1.36,-0.78)))R    ARGS: TARGET=Trian, RELCOORD=(+1.36,-0.78),   PRECISION=0.20
Effort: E[TASK→TriangleAcquire]=1.13   E[TASK→TriangleDrag]=2.86   E[METHOD→Total]=3.99

Sub-Goal 6: 2-Dim absolute scale of Circle
Method: Target-AbsScale    TECH: CornerDrag    Approach: Absolute drag
IFG: |C[VP<Circle>(CORNER=BL)]|CP(L)|VP<WS>(COORD=(0.014),(7.60,5.50))R    ARGS: TARGET=Circle, CORNER=BL, ABSCOORD=(7.60,5.50), PRECISION=0.014
Effort: E[TASK→CircleCornerAcquire]=7.26   E[TASK→CornerDrag]=4.21   E[METHOD→Total]=11.47

FIGURE 9M

TERMINAL SESSION HISTORY: ICON FOCUS

Sub-Goal 1: Delete Trap
Method: Target-Delete   TECH: IconSel   Approach: Icon activation   ARGS: TARGET=Trap
IFG: \C[VP<Trap>]\C(L)\C[VP.Icon<cut>]\C(L)
Effort: E[TASK→TrapAcquire]=3.91   E[TASK→CutIcon]=3.44   E[METHOD→Total]=7.35

Sub-Goal 2: Set text to bold
Method: Text-Bold   TECH: IconSel   Approach: Icon activation   ARGS: TARGET=Panel1, STARTTEXT=(1.17,0.26), ENDTEXT=(2.49,0.06)
IFG: \C[VP<Panel1>(CHAR=(1.17,0.26))]\CP(L)[VP<Panel1>(CHAR=(2.49,0.06))]R\C[Icon<bold>]\C(L)
Effort: E[TASK→TextSel]=9.03   E[TASK→BoldIcon]=3.99   E[METHOD→Total]=13.02

Sub-Goal 3: Replace quoted text
Method: Text-CutPaste   TECH: IconSel   Approach: Icon activation   ARGS: tgt$_1$=Panel1, stxt$_1$=(2.12,0.26), etxt$_1$=(0.06,0.06),
       tgt$_2$=Panel2, stxt$_2$=(0.96,0.06), etxt$_2$=(1.97,0.06),
IFG: \C[VP<Panel1>(CHAR=(2.12,0.26))]\CP(L)[VP<Panel1>(CHAR=(0.06,0.06))]R\C[Icon.cut]\C(L)
     \C[VP<Panel2>(CHAR=(0.96,0.06))]\CP(L)[VP<Panel2>(CHAR=(1.97,0.06))]R\C[Icon.paste]\C(L)
Effort: E[TASK→TextSel]=9.52   E[TASK→CutIcon]=4.02   E[TASK→TextSel]=8.13   E[TASK→PasteIcon]=4.30   E[METHOD→Total]=25.97

Sub-Goal 4: 1-Dim relative scale of Rec
Method: Target-RelScale   TECH: EdgeDrag   Approach: Relative drag   ARGS: TARGET=Rect, EDGE=L, RELCOORD=(-0.9,0.0)   PRECISION=0.005
IFG: \C[VP<Rec>(EDGE=L)]\CP(L)[VP<WS>(WHITESPACE=(0.05),(CURSOR=(-0.92,0.0))]R
Effort: E[TASK→EdgeAcquire]=7.90   E[TASK→EdgeDrag]=3.35   E[METHOD→Total]=11.25

Sub-Goal 5: Relative move of Triangle
Method: Target-RelMove   TECH: TargetDrag   Approach: Relative drag   ARGS: TARGET=Trian, RELCOORD=(+1.36,-0.78), PRECISION=0.20
IFG: \C[VP<Trian>]\CP(L)[VP<WS>(WHITESPACE=(0.20),(CURSOR(+1.36,-0.78))]R
Effort: E[TASK→TriangleAcquire]=1.13   E[TASK→TriangleDrag]=2.86   E[METHOD→Total]=3.99

Sub-Goal 6: 2-Dim absolute scale of Circle
Method: Target-AbsScale   TECH: CornerDrag   Approach: Absolute drag   ARGS: TARGET=Circle, CORNER=BL, ABSCOORD=(7.60,5.50), PRECISION=0.014
IFG: \C[VP<Circle>(CORNER=BL)]\CP(L)[VP<WS>(COORD=(0.014),(7.60,5.50))]R
Effort: E[TASK→CircleCornerAcquire]=7.26   E[TASK→CornerDrag]=4.21   E[METHOD→Total]=11.47

FIGURE 9O

TERMINAL SESSION HISTORY: SPIDER MENU FOCUS

Sub-Goal 1: Delete Trap
Method: Target-Delete    Approach: Spider menu activation
IFG: \C[VP<Trap>]1C(L)\C1C(L,R)[VP.menu.edit<cut>]1C(L)    TECH: SpiderMenuSel    ARGS: TARGET=Trap
Effort: E[TASK→TrapAcquire]=3.91   E[TASK→EditCut]=1.43   E[METHOD→Total]=5.34

Sub-Goal 2: Set text to bold
Method: Text-Bold    TECH: SpiderMenuSel    ARGS: TARGET=Panel1, STARTTEXT=(1.17,0.26), ENDTEXT=(2.49,0.06)    Approach: Spider menu activation
IFG: \C[VP<Panel1>(CHAR=(1.17,0.26))]\CP(L)[VP<Panel1>(CHAR=(2.49,0.06))]R1C1C(L,R)[VP.menu<font>]1C(L)[VP.menu.edit.bold]1C(L)
Effort: E[TASK→TextSel]=8.36   E[TASK→FontBold]=1.43   E[METHOD→Total]=9.79

Sub-Goal 3: Replace quoted text
Method: Text-CutPaste    TECH: SpiderMenuSel    ARGS: $tgt_1$=Panel1, $stxt_1$=(2.12,0.26), $etxt_1$=(0.06,0.06),    Approach: Spider menu activation
                                                                 $tgt_2$=Panel2, $stxt_2$=(1.97,0.06), $etxt_2$=(0.96,0.06),
IFG:
\C[VP<Panel1>(CHAR=(2.12,0.26))]\CP(L)[VP<Panel1>(CHAR=(0.06,0.06))]R1C1C(L,R)[VP.menu<edit>]1C(L)[VP.menu.edit<cut>]1C(L)
\C[VP<Panel2>(CHAR=(1.97,0.06))]\CP(L)[VP<Panel2>(CHAR=(0.96,0.06))]R1C1C(L,R)[VP.menu<edit>]1C(L)[VP.menu.edit<paste>]1C(L)
Effort: E[TASK→TextSel]=6.53   E[TASK→EditCut]=1.43   E[TASK→TextSel]=6.47   E[TASK→EditPaste]=1.43   E[METHOD→Total]=15.86

Sub-Goal 4: 1-Dim relative scale of Rec
Method: Target-RelScale    TECH: EdgeDrag    ARGS: TARGET=Rect, EDGE=L, RELCOORD=(-0.9,0.0)   PRECISION=0.05    Approach: Relative drag
IFG: \C[VP<Rect>(EDGE=L)]\CP(L)[VP<WS>(WHITESPACE=(0.05),(CURSOR(-0.92,0.0))]R
Effort: E[TASK→EdgeAcquire]=8.03   E[TASK→EdgeDrag]=3.35   E[METHOD→Total]=11.38

Sub-Goal 5: Relative move of Triangle
Method: Target-RelMove    TECH: TargetDrag    ARGS: TARGET=Trian, RELCOORD=(+1.36,-0.78), PRECISION=0.20    Approach: Relative drag
IFG: \C[VP<Trian>]\CP(L)[VP<WS>(WHITESPACE=(0.20),(CURSOR(+1.36,-0.78))]R
Effort: E[TASK→TriangleAcquire]=1.13   E[TASK→TriangleDrag]=2.86   E[METHOD→Total]=3.99

Sub-Goal 6: 2-Dim absolute scale of Circle
Method: Target-AbsScale    TECH: CornerDrag    ARGS: TARGET=Circle, CORNER=BL, ABSCOORD=(7.60,5.50), PRECISION=0.014    Approach: Absolute drag
IFG: \C[VP<Circle>(CORNER=BL)]\CP(L)[VP<WS>(COORD=(0.014),(7.60,5.50))]R
Effort: E[TASK→CircleCornerAcquire]=7.26   E[TASK→CornerDrag]=4.21   E[METHOD→Total]=11.47

FIGURE 9Q

TERMINAL SESSION HISTORY: KEY-EQUIVALENT FOCUS

Sub-Goal 1: Delete Trap
Method: Target-Delete  TECH: KeyEquiv  Approach: Key-Equivalent Stroke
IFG: \C[VP<Trap>]1C(L)SCAx  ARGS: TARGET=Trap
Effort: E[TASK→TrapAcquire]=3.91  E[TASK→StrokeDelete]=3.13  E[METHOD→Total]=7.04

Sub-Goal 2: Set text to bold
Method: Text-Bold  TECH: KeyEquiv  Approach: Key-Equivalent Stroke
IFG: \C[VP<Panel1>(CHAR=(1.17,0.26))]CP(L)[VP<Panel1>(CHAR=(2.49,0.06))]R\SCAb  ARGS: TARGET=Panel1, STARTTEXT=(1.17,0.26), ENDTEXT=(2.49,0.06)
Effort: E[TASK→TextSel]=8.36  E[TASK→StrokeCtrl-b]=3.68  E[METHOD→Total]=12.04

Sub-Goal 3: Replace quoted text
Method: Text-CutPaste  TECH: KeyEquiv  Approach: Key-Equivalent Stroke
IFG: \C[VP<Panel1>(CHAR=(2.12,0.26))]CP(L)[VP<Panel1>(CHAR=(0.06,0.06))]R\SCAx
\C[VP<Panel2>(CHAR=(1.97,0.06))]CP(L)[VP<Panel2>(CHAR=(0.96,0.06))]R\SCAv
ARGS: tgt$_1$=Panel1, stxt$_1$=(2.12,0.26), etxt$_1$=(0.06,0.06),
tgt$_2$=Panel2, stxt$_2$=(1.97,0.06), etxt$_2$=(0.96,0.06),
Effort: E[TASK→TextSel]=6.53  E[TASK→Ctrl-x]=3.27  E[TASK→TextSel]=7.14  E[TASK→Ctrl-v]=3.27  E[METHOD→Total]=20.21

Sub-Goal 4: 1-Dim relative scale of Rec
Method: Target-RelScale  TECH: EdgeDrag  Approach: Relative drag
IFG: \C[VP<Rec>(EDGE=L)]CP(L)[VP<WS>(WHITESPACE=(0.05),(CURSOR(-0.92,0.0))]R  ARGS: TARGET=Rect, EDGE=L, RELCOORD=(-0.9,0.0) PRECISION=0.05
Effort: E[TASK→EdgeAcquire]=8.03  E[TASK→EdgeDrag]=3.35  E[METHOD→Total]=11.38

Sub-Goal 5: Relative move of Triangle
Method: Target-RelMove  TECH: TargetDrag  Approach: Relative drag
IFG: \C[VP<Trian>]CP(L)[VP<WS>(WHITESPACE=(0.20),(CURSOR(+1.36,-0.78))]R  ARGS: TARGET=Trian, RELCOORD=(+1.36,-0.78), PRECISION=0.20
Effort: E[TASK→TriangleAcquire]=1.13  E[TASK→TriangleDrag]=2.86  E[METHOD→Total]=3.99

Sub-Goal 6: 2-Dim absolute scale of Circle
Method: Target-AbsScale  TECH: CornerDrag  Approach: Absolute drag
IFG: \C[VP<Circle>(CORNER=BL)]CP(L)[VP<WS>(COORD=(0.014),(7.60,5.50))]R  ARGS: TARGET=Circle, CORNER=BL, ABSCOORD=(7.60,5.50), PRECISION=0.014
Effort: E[TASK→CircleCornerAcquire]=7.26  E[TASK→CornerDrag]=4.21  E[METHOD→Total]=11.47

FIGURE 9S

METHOD TO ASSESS THE PHYSICAL EFFORT TO ACQUIRE PHYSICAL TARGETS

This is a division of U.S. patent application Ser. No. 08/641,230, filed Apr. 30, 1996.

BACKGROUND OF THE INVENTION

1. Field of the Invention

The invention relates generally to computer software metrics and, more specifically, to defining and utilizing a metric that provides an objective, quantitative method of evaluating the physical effort required to manipulate a computer-human-interface.

2. DESCRIPTION OF THE PRIOR ART

The prior art employs various techniques to design a computer-human interface. Among these are subjective techniques which utilize experience and intuition to appraise existing or proposed interface designs and generally result in lists of specific recommendations that have historically been found integral to good interface design (Mayhew, Deborah, *Principles and Guidelines in Software User Interface Design*, 1992), (Smith, S. L. and Mosier, J. M., *Design Guidelines for User Interface Software*, 1986). However, it is not always apparent that resulting recommendations are applicable to new technologies since, being based on phenomenologic observation, the scope of their applicability is uncertain.

Less subjective approaches to interface design comprise such procedures as prototyping, focus groups, cognitive walk-throughs, and alpha tests. A review of writings of those skilled in these arts (Dix, A., Finley, J., Aboud, G., Beale, R., *Human-Computer Interaction*, 1993), (Shneiderman, B., *Designing the User Interface: Strategies for Effective Human-Computer Interaction*, 1992); (Dumas, J., *Designing User Interfaces for Software*, 1988) convey that similarities exist between different practitioners. In general, these experts advocate: (1) employ practical experience, (2) use applicable experimental findings, (3) use rules-of-thumb, (4) promote consistency. Attempts to apply practical experience and rules-of-thumb confront the analyst with the same quandaries of observed with the subjective approaches. Although experimental results can be of significant worth, implications of the artificial setting under which experiments are typically conducted must be appraised for applicability to the production environment anticipated. Finally, the provision of consistency, while widely advocated, has proved difficult to achieve since an objective, quantitative definition of consistency has yet to be formulated. (Payne S. J. and Green, T. R. G., Task-Action Grammars: A model of the mental representation of task languages, *Computer-Human Interaction*, 1986, pp. 93–133)

Dumas and Redish (Dumas, J. S. and Redish, J. C. *A Practical Guide to Usability Testing*, 1993), (Hix, Deborah and Hartson, H. Rex, *Developing User Interfaces: Insuring Usability Through Product and Process*, 1993) summarizes the prior art for comparing existing interfaces: (1) provide expert review of the design, (2) perform peer walk-through, (3) prototype, and (4) monitor behavior of the production environment via one-way mirrors, logs, video tapes, and questionnaire interviews. Of these, expert review has been shown inadequate when performed by a single expert but of benefit when performed by a group of outside experts (Jeffries, R., Miller, J. R., Wharton, C., and Uyed, C. M., User Interface Evaluation in the Real World, *Proceedings of CHI '91, Human Factors in Computing Systems*, 1991, pp.119–124.). While frequently employed to advantage, peer walk-through and prototyping have the disadvantage of producing difficult to reproduce, subjective evaluations. The monitoring of production environments captures extensive data, but such data only offer the opportunity of objective quantification; there remains the need to define the methodology for converting such data into recognized, quantitative measures that accurately reflect usability.

Since it predicts the time required to acquire a target, some experts proffer Fitts' Law as the basis for an objective, quantitative metric of the effort expended during physical actions that acquire a stationary target. An expression of Fitts' Law is:

Total Time = Reaction Time + Movement Time $$TT = RT + b \times I$$

$$TT = RT + b \times \log_2\left[\frac{D_t}{W_t} + k\right]$$

where:
  TT Total time for target acquisition (seconds).
  RT Reaction time (seconds).
  b Muscle transfer rate (seconds per bit).
  I Index of Difficulty (bits).
  $W_t$ Width of target (linear units).
  $D_t$ Distance to target (linear units).

This invention relates to the implications of how users perceive the $D_t$ and $W_t$ parameters of the Index of Difficulty:

$$I = \log_2\left(\frac{D_t}{W_t} + k\right) \qquad \text{(Eq 1)}$$

Fitts (Fitts, P. M., The information capacity of the human motor system in controlling amplitude, *Journal of Applied Psychology*, 1954, pp. 381–391) implicitly set k=0 by excluding k from his original formulation. Welford (Welford, A., *The Fundamentals of Skill*, 1968) proposed k=0.5, arguing that this offers a superior fit to published empirical data. MacKenzie (MacKenzie, I., Fitts' Law as a research and design tool in human-computer interaction, *Human-Computer Interaction*, 1992, pp. 91–139) reappraised the use of Shannon's Information theory (Shannon and Weaver, *The Mathematical Theory of Communication*, 1949) as the basis of Fitts' Law and concluded that k=1 offers an even better fit to published empirical data. Analysis presented below in the section "Analysis of Arbitrary Triangular Targets" shows that k is not relevant to the user's determination of either target distance or target width.

Studies (Welford, op. cit.), (Jagacinski, R. J. and Monk, D. L., Fitts' Law in two dimensions with hand and head movements, *Journal of Motor Behavior*, 1985, pp. 77–95); (Jagcinski, R. J., Repperger, D. W., Moran, M. S., Ward, S. L., and Glass, B., Fitts' Law and the microstructure of rapid discrete movements, *Journal of Experimental Psychology*, 1980, pp. 309–320.) show that times for hand-homing in either direction between keyboard and mouse conform to Fitts' Law. It has also been shown that finger targeting between keys follows Fitts' Law when $7W_t \leq D_t$. Experimental evidence (Card, S. K., English, W. K., and Burr, B. J., Evaluation of the mouse, rate-controlled isometric joy stick, step keys, and text keys for text selection on a CRT, *Ergonomics*, 1978, pp. 601–613); (Jagacinski and Monk, op. cit.); (MacKenzie, op. cit.) also indicates that Fitts' Law can be applied to CRT environments that employ the mouse controlled cursor. Verification of the applicability of Fitts' Law to mouse movement in real world systems in general requires additional study since cursor control experiments typically employ circular or square targets rather than the more diverse target shapes found in production environments.

The present invention contends that failure of practitioners of the prior art to successfully offer a defensible definition for the $D_t$, and $W_t$ parameters of Fitts' Index of Difficulty that is applicable to arbitrary targets has rendered its general application unfeasible. Investigating implications of this failure starts by recalling that the aspect ratio (AR) of a target is defined as $$AR = \frac{\text{target length}}{\text{target height}}.$$

Since persons utilizing Fitts' Law generally define $W_t$ of circular and square targets to be the diameter and the length of a side respectively, studies which employ the prior art generally apply to physical targets for which unitary aspect ratios pertain. For such targets the prior art generally defines, $D_t$, to be the distance from the cursor to the target center although some practitioners of the prior art question the applicability of these definitions of $D_t$ and $W_t$ for targets of $0<AR<<1$ and $1<<AR<\infty$. (Gillan, D., Holden, K., Adam, S., Rudisill, M., Magee, L., How Does Fitts' Law Fit Pointing and Dragging, *Proceedings of CHI '90; Human Factors in Computing Systems*, 1990, pp. 175–182). FIG. 1 conveys implications of these definitions. Parts A through C of FIG. 1 depict rectangular targets of AR=1, AR>1, and AR<1 respectively, while Part D depicts a convex polygon of triangular shape. For these targets the prior art generally defines locations 1A08, 1B08, and 1C08 as the terminus of user traverses into respective physical targets. Under definitions prevailing in the prior art target distances, $D_t$, are depicted by $\|\overline{1A14}\|$, $\|\overline{1A14}\|$, and $\|\overline{1C14}\|$ for the said targets respectively. For the square target, 1A02, the width and distance definitions are specific, but characteristics of the remaining targets do not permit this specificity for either width or distance definitions. Location 1D08 is not so appraised as triangular targets are not generally covered by studies investigating Fitts' Law.

Defining a constrained target to be a target for which the user considers all target sides when choosing a traverse to the target, research involved with the present invention concludes on logical grounds that traditional definitions of target width and distance are valid only for constrained squares and circles. Data collected and analyzed during development of the present invention provide experimental results showing there are statistically significant differences between mean target acquisition points and centers of targets of the types depicted by FIG. 1 Parts B through D. These empirical results indicate that users confronting interface environments depicted by FIG. 1 Parts B through D with initial cursor locations at 1B18, 1C18, 1D18 will take traverses 1B16, 1C16, and 1D16 and generally have modal termination points at 1B06, 1C06, and 1D06 respectively rather than traverses 1B14, 1C14, and 1D14 with termination points at 1A08, 1B08, and 1C08 as suggested by the prior art. It is shown below tha spatial equivalence between 1A06 and 1A08 arises from the geometry of a small, square target and not from predictive ability of the prior art.

In seeking definitions which better reflect user behavior during target acquisition, MacKenzie (op. cit.) offers the following: (1) the perimeter definition: $W_t$=H+L, (2) the area definition: $W_t$=H×L, and (3) the angle-of-approach definition: $W_6$=H/sin θ. The perimeter definition implies that a square target of H=L=3 and an elongated rectangular target of H=0.5 and L=5.5 have equal $W_t$. Under the area definition, a square of H=L=3 and an elongated rectangular target of H=0.5 and L=18.0 also have equal $W_t$. MacKenzie does not offer theoretical justification or empirical evidence of why such diverse shapes have equivalent $W_t$ values nor does he indicate how to determine $D_t$.

The angle-of-approach definition specifies target width to be the length of the segment subtended by parallel sides of the target when the traverse is extended through the target, the midpoint of this segment being the traverse terminus. Employing Information Theory, research involved with the present invention shows that rational users facing a rectangular target constrained in the narrow dimension will seek an acquisition point on the axis-of-symmetry; namely, line 216 of FIG. 2. The research conducted for this invention empiracally corroborates this conclusion for constrained targets. Lines 204 and 220 of FIG. 2, represent limits to user targeting since traverses terminating to the left of 204 or to the right of 220 are to locations which entail decreasing $W_t$ and either a decreasing $D_t$ or a $D_t$ increasing less rapidly than $W_t$ decreases. For either case traverses into these areas result in an increase of the index of difficulty. It follows that under the angle-of-approach definition, the rational user will terminate a traverse to a rectangular target on line 216 between locations 218 and 240.

Given these conclusions, it is possible to compare the effort of traversing two arbitrary paths from initial cursor location 212 to the line segment defined by points 218 and 240 of FIG. 2. Thus, compare path CUMV having $D_M$=$\|\overline{CUM}\|$=$Y_c$/sin $θ_M$=$\|\overline{222}\|$, and $W_M$=$\|\overline{UMV}\|$=H/sin $θ_M$=$\|\overline{234}\|$ with path CRNS having $D_N$=$\|\overline{CRN}\|$=$Y_c$/sin $θ_N$=$\|\overline{202}\|$ and $W_N$=$\|\overline{RNS}\|$=H/sin $θ_N$=$\|\overline{228}\|$. The effort of acquiring the target using point 236 as the acquisition point is:

$$\begin{aligned}I_M &= \log_2\left[\left(\frac{D_M}{W_M}\right)+k\right] = \log_2\left[\left(\frac{Y_C \sin θ_M}{H \sin θ_M}\right)+k\right] = \log_2\left[\left(\frac{Y_C}{H}\right)+k\right] \\ &= \log_2\left[\left(\frac{Y_C \sin θ_N}{H \sin θ_N}\right)+k\right] = \log_2\left[\left(\frac{D_N}{W_N}\right)+k\right] \\ &= I_N\end{aligned}$$

It is thus logically concluded that under the angle-of-approach hypothesis traverses terminating on the line connecting points 230 and 240 will be perceived by users as requiring equal physical effort.

To determine whether users show indifference to the traverse taken to acquire a rectangular target of non-unitary aspect ratio, the research performed for the present invention included an experiment in which subjects completed repeated trials to such a target within a fixed environment. Analysis of data from this experiment investigated the footprint of hits generated to ascertain whether hits were randomly distributed along the line connecting points 218 and 240 as would be expected if all traverses entail equal physical effort. Hits were found to be non-randomly distributed along said line segment, instead having a modal location related to the initial position of the cursor. Therefore, research involved with the present invention concludes the angle-of-approach for target width can be rejected on both logical and empirical grounds.

Those experienced in the art of design and evaluation of computer-human interfaces thus recognize that the prior art is inadequate to: (1) express objectively each operation users perform on computer input devices during a terminal session, (2) identify the Distance and Width parameters of Fitt's Index of Difficulty for other than square or circular targets, and (3) specify in an objective, quantitative manner the physical effort of performing a specified set of computer tasks.

Accordingly it is an objective of the present invention to provide an InterFace Grammar capable of recording all physical operations users perform on a computer-human interface during a terminal session in a manner to permit subsequent quantitative analysis. It is another objective to provide a defensible method for determination of the distance and size of the implicit target contained within triangular and convex quadrilateral targets of arbitrary size, location, and orientation relative to a target acquiring entity. Finally, it is another objective to provide a method for aggregating the effort expended in acquiring individual targets into an index suitable for identification of that interface which requires lowest total physical effort for performance of a given task set.

SUMMARY OF THE INVENTION

Utilization of the present invention can benefit persons involved with application software in three ways. First, the invention aids design of the computer-human interface (CHI) of new software systems. During design of application software various CHI are proposed to manage its functionality and a decision made regarding the CHI to actually develop. Employment of the invention permits designers to infer the level of physical effort required to manipulate a proposed CHI prior to creation of the interface and thus objectively appraise a major component of an interface's user friendliness. Design is additionally benefited by the invention as it permits the designer to appraise syntactic consistency prior to interface coding. Since syntactic consistency greatly influences the "learnability" of a proposed interface this benefit permits enhancing a major component requisite to the commercial success of a new application software. Second, the invention enables prospective buyers to appraise currently marketed software application systems that provide the functionally sought. By applying the invention to each software system being evaluated via a standard test suite that reflects typical demands required of the application system, an objective, quantitative appraisal of the expected physical effort expended during normal use of each software system will identify the system requiring least expenditure of physical effort. Additionally, appraisal of information prepared during application of the invention permits insight into the "learnability" of the contending systems. Third, individual users may be evaluated in a non-invasive manner to appraise the physical effort each expends to accomplish an assigned task set. This permits objective identification of which workers employ the software efficiently and those which are less efficient. From these results it becomes possible to objectively defend a reward system for the former and retraining or transfer programs for the latter.

Thus, in one aspect, the present invention is a computer-implemented method for selecting from a plurality of extant or proposed different computer-human interfaces an optimum computer-human interface that provides a low level of aggregated physical effort for the human to acquire and manipulate a displayed physical target. First, the operative acquiring entity is identified. The present invention proceeds by identifying the start location of the acquiring entity. Then the present invention iterates over the steps of each task of the pre-defined standard test suite utilizing each of the computer-human interfaces. First, a first circle of maximum radius is inscribed within the physical target of one of the computer-human interface. Then the radius of the inscribed first circle is determined. The distances from each apex of the physical target to the center of the inscribed first circle is determined. For each apex a maximum equi-target locus circular arc centered at the midpoint of the line connecting the respective apex and the center of first circle with radius of one-half each respective distances is generated. If the acquiring entity is located on the border or outside of each of the maximum equi-target locus circular arc, the modal place of acquisition is determined to be the center of the inscribed first circle. If the respective maximum equi-target locus circular arc contains the acquiring entity, then the modal place of acquisition is determined to be the center of a second circle inscribed within the physical target, with the center of the inscribed second circle being a function of the horizontal displacement and vertical displacement of the acquiring entity from the apex. The level of physical effort of one of the computer-human interfaces needed to acquire the physical target is determined as a relation of the distance between the start location of the acquiring entity to the selected modal place of acquisition and the radius of the circle identified by the selected modal place. The level of physical effort so determined of one of the computer-human interface is aggregated and stored. The stored level of aggregated physical effort is compared with another computer-human interface. The optimum computer-human interface is selected that provides a low level of aggregated physical effort as determined by the comparison step.

In another aspect, the present invention is a computer-based method of representing computer-human interactions to enable a comparison of a plurality of physical operations performed in the computer-human interactions. First, a physical operator rule grammar is defined to include classes of physical operations and their instantiations of physical operations. The physical operator rule grammar is defined to include interrelationships of the classes to represent the computer-human interactions. A first computer-human interaction is stored into the memory of the computer system.

A stored first computer-human interaction is compared with the physical operator rule grammar to identify the instantiation that corresponds to the first computer-human interaction. The first instantiation that corresponds to the first computer-human interaction is stored in memory as a representation of the first computer-human interaction.

Sheet 1 is a CRT depiction of the GUI environment of the example that also shows graphic objects and text specified by the standard test suite.

Sheet 2 through Sheet 5 is InterFace Grammar code specifying artifacts of the Graphic User Interface appearing on Sheet 1.

Sheet 6 through Sheet 7 are exemplar task templates appropriate to defining method templates capable of performing sub-goals of the example.

Sheet 8 through Sheet 11 are exemplar method templates appropriate to performing sub-goals of the example.

Sheet 12 displays in expanded form the method and tasks employed to accomplish Sub-Goal #3 of the example using spider menu based selection.

Sheet 13 displays methods employed, InterFace Grammar code generated, and physical effort expended to accomplish the test suite when utilizing drop-down menu bar initiated function activation.

Sheet 14 is a CRT depiction of traverses executed to accomplish the test suite when utilizing drop-down menu bar initiated function activation.

Sheet 15 displays methods employed, InterFace Grammar code generated, and physical effort expended to accomplish the test suite when utilizing icon initiated function activation.

Sheet 16 is a CRT depiction of traverses executed to accomplish the test suite when utilizing icon initiated function activation.

Sheet 17 displays methods employed, InterFace Grammar code generated, and physical effort expended to accomplish the test suite when utilizing spider menu initiated function activation.

Sheet 18 is a CRT depiction showing traverses executed to accomplish the test suite when utilizing spider menu initiated function activation..

Sheet 19 displays methods employed, InterFace Grammar code generated, and physical effort expended to accomplish the test suite when utilizing key-equivalent initiated function activation.

Sheet 20 is a CRT depiction showing traverses executed to accomplish the test suite when utilizing key-equivalent initiated function activation.

Figure 10A:
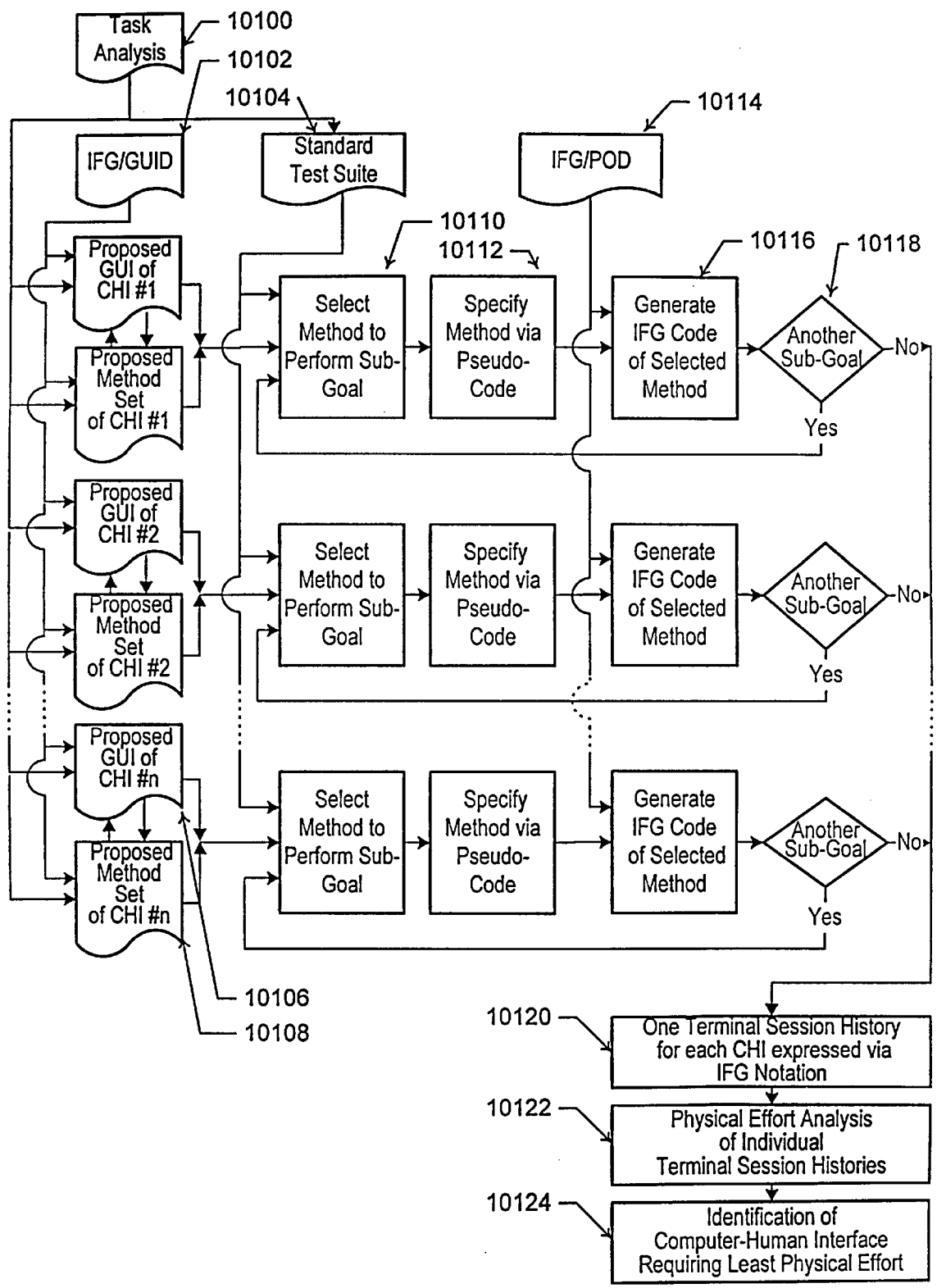
Figure 10B:
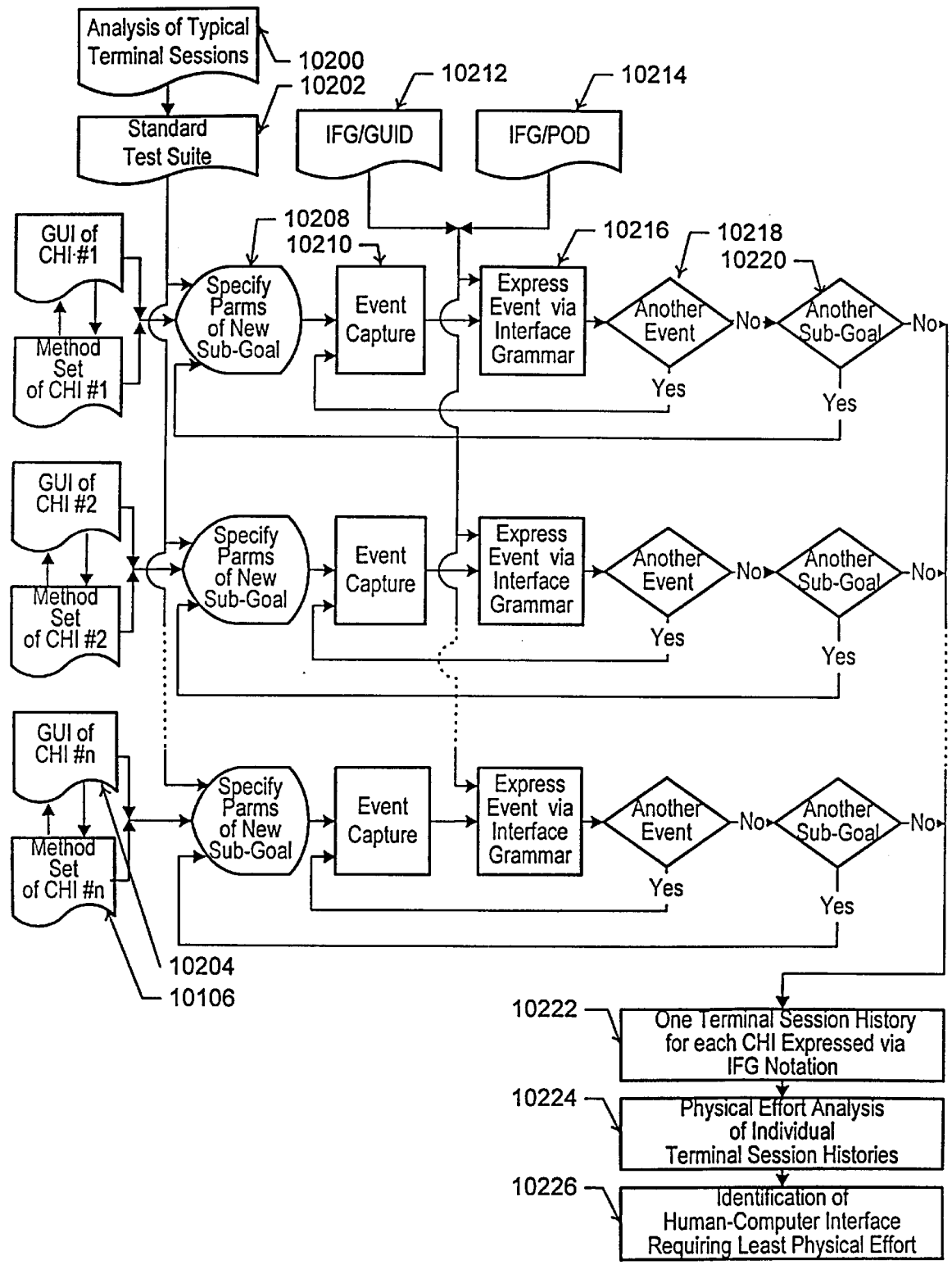
Figure 11A:
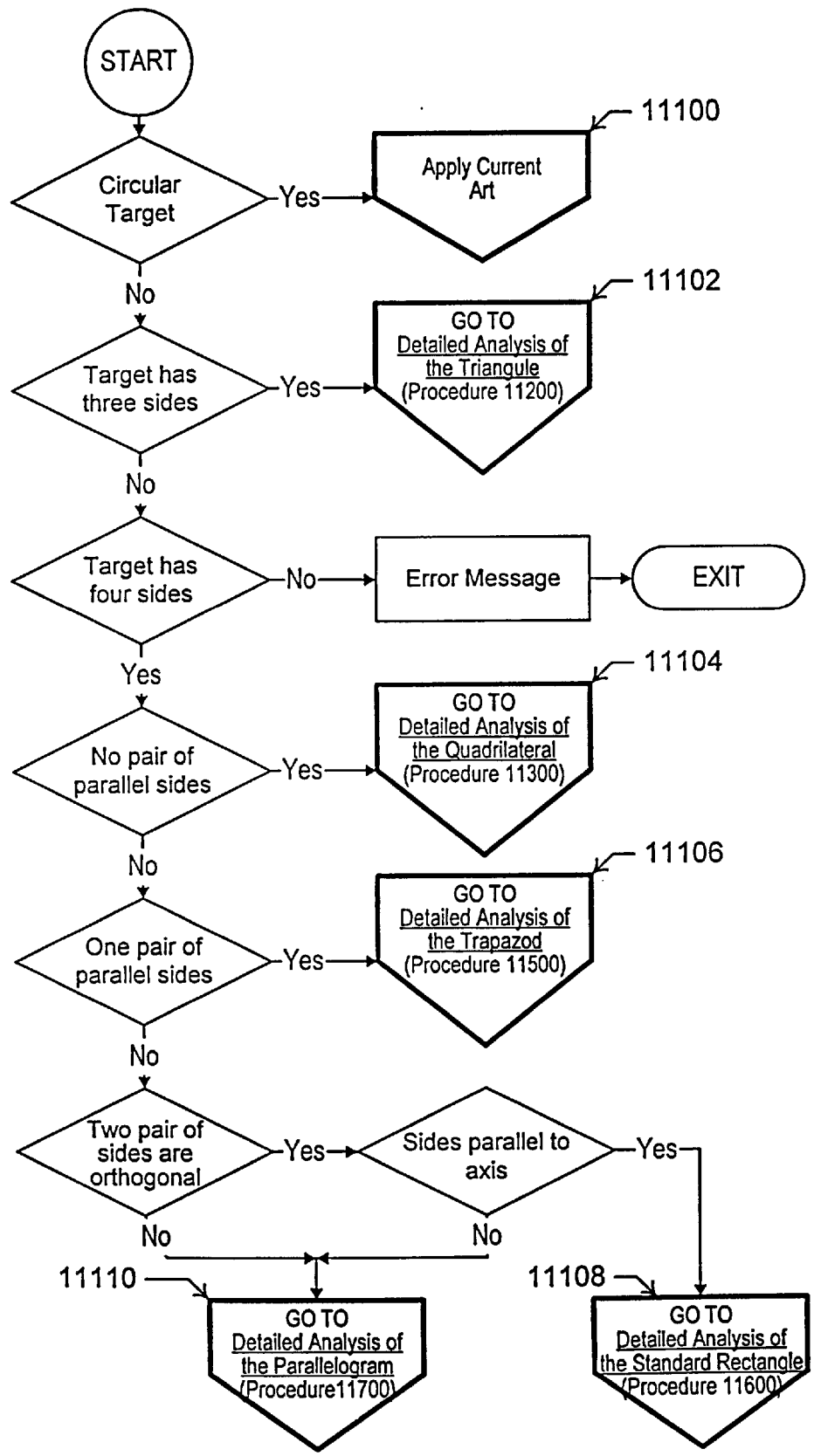
Figure 11B:
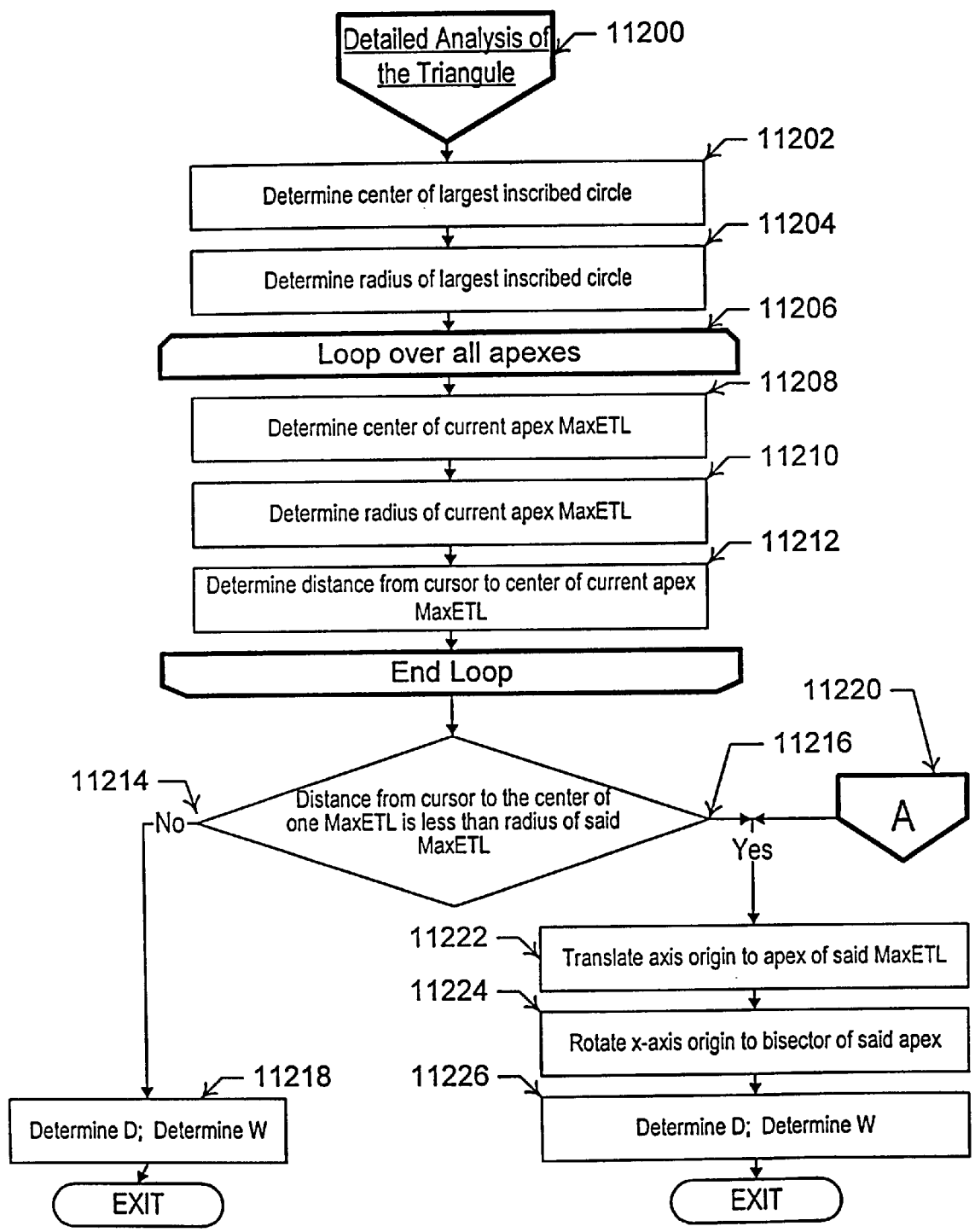
Figure 11C:
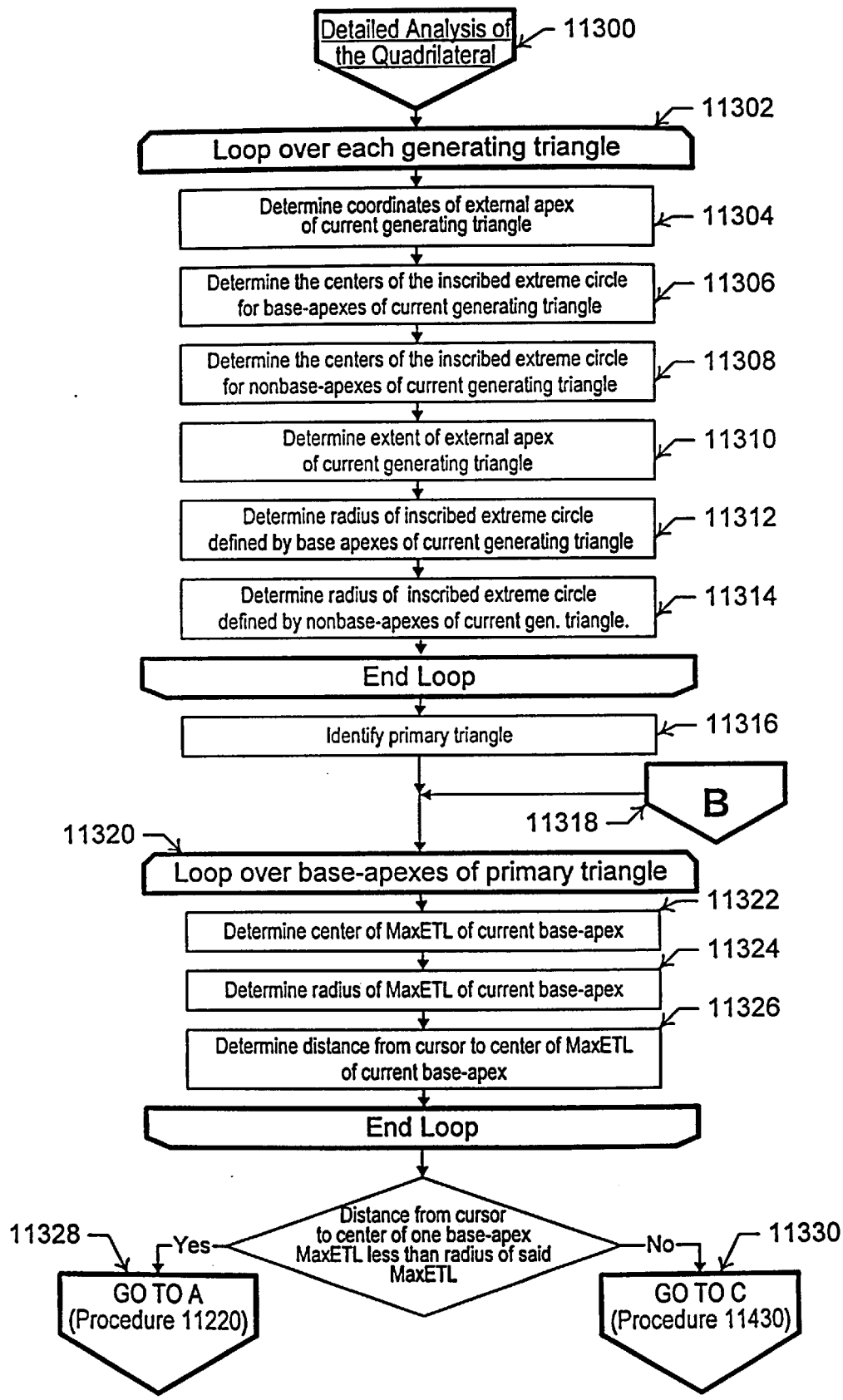
Figure 11D:
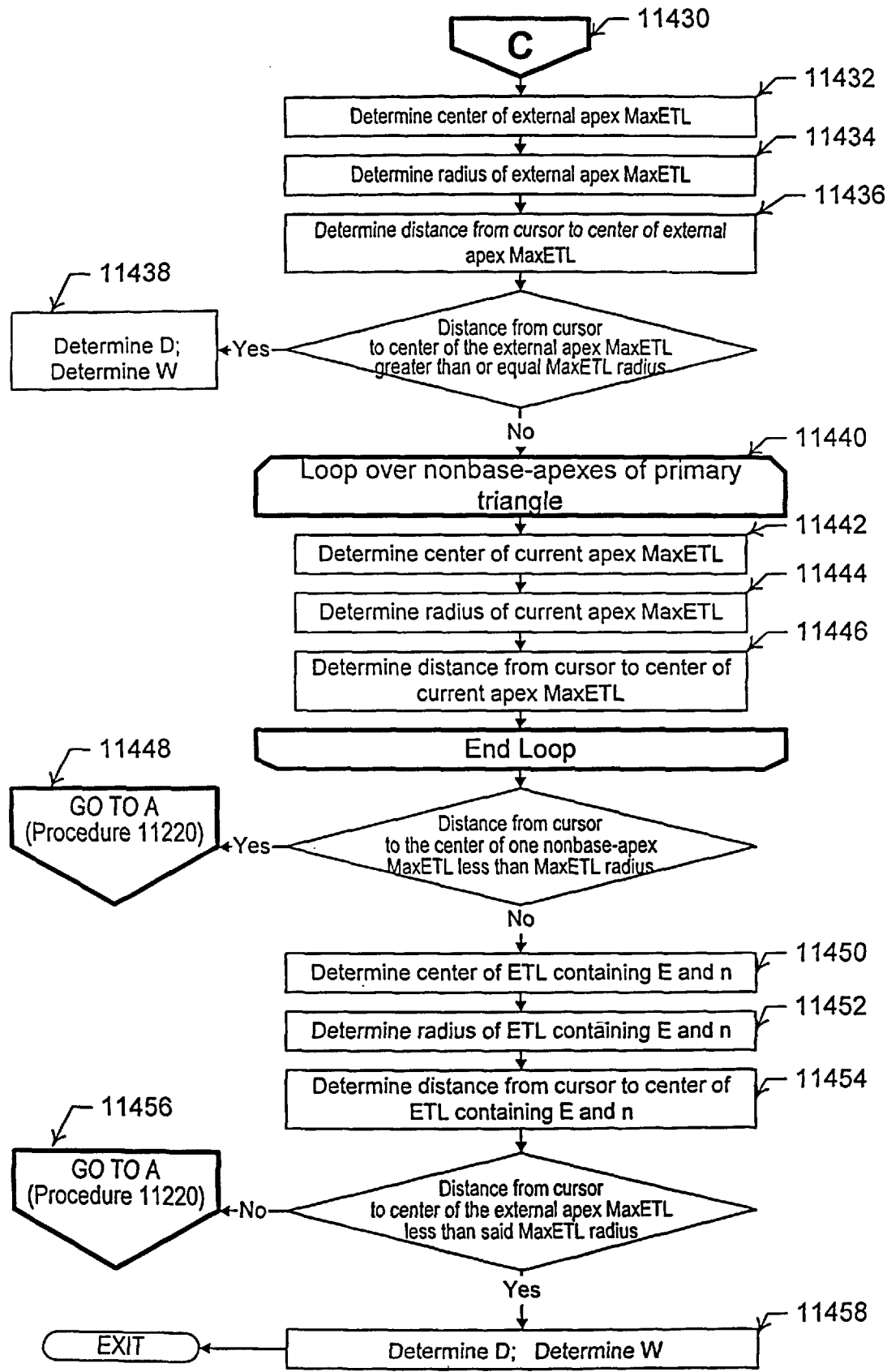
Figure 11E:
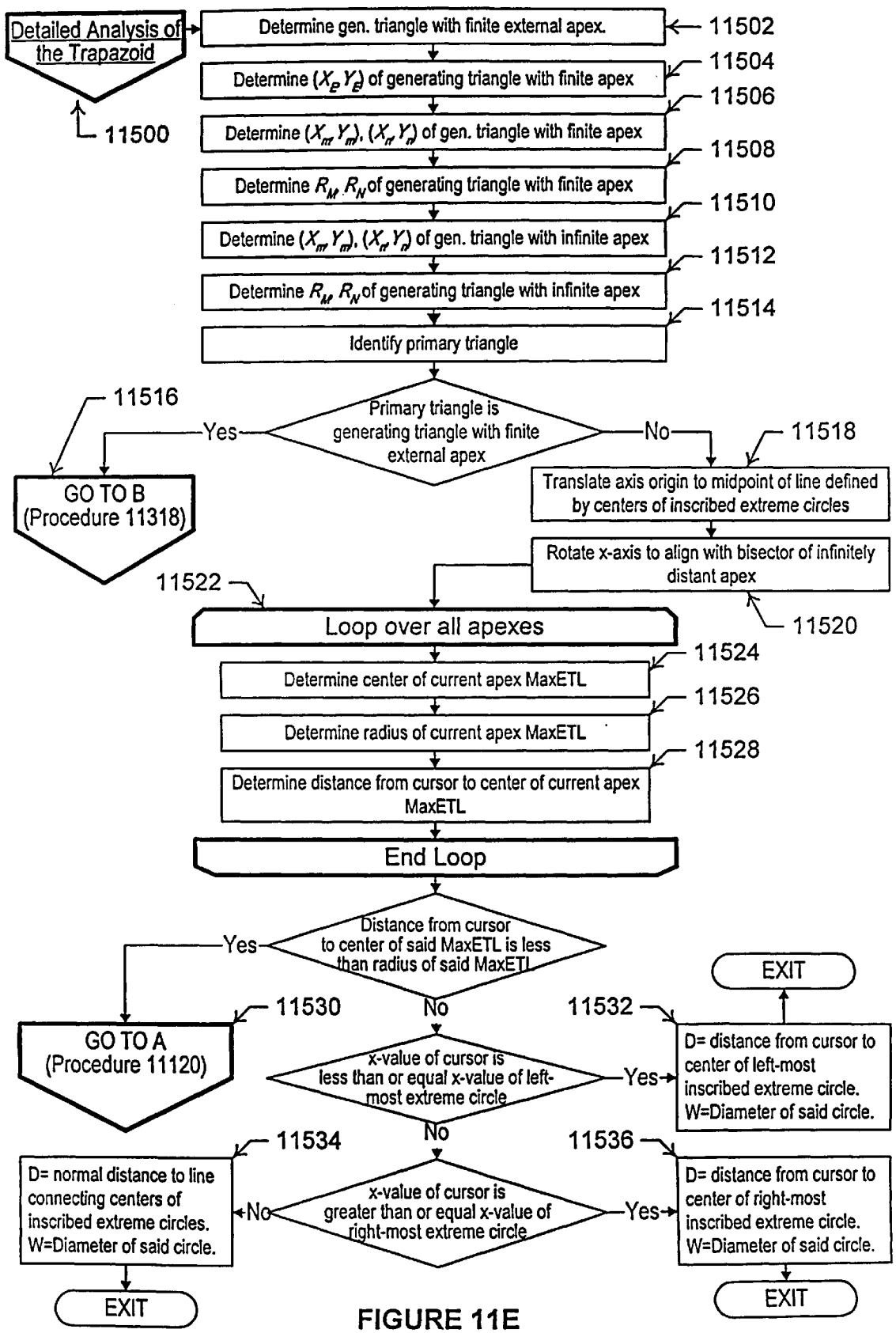
Figure 11F:
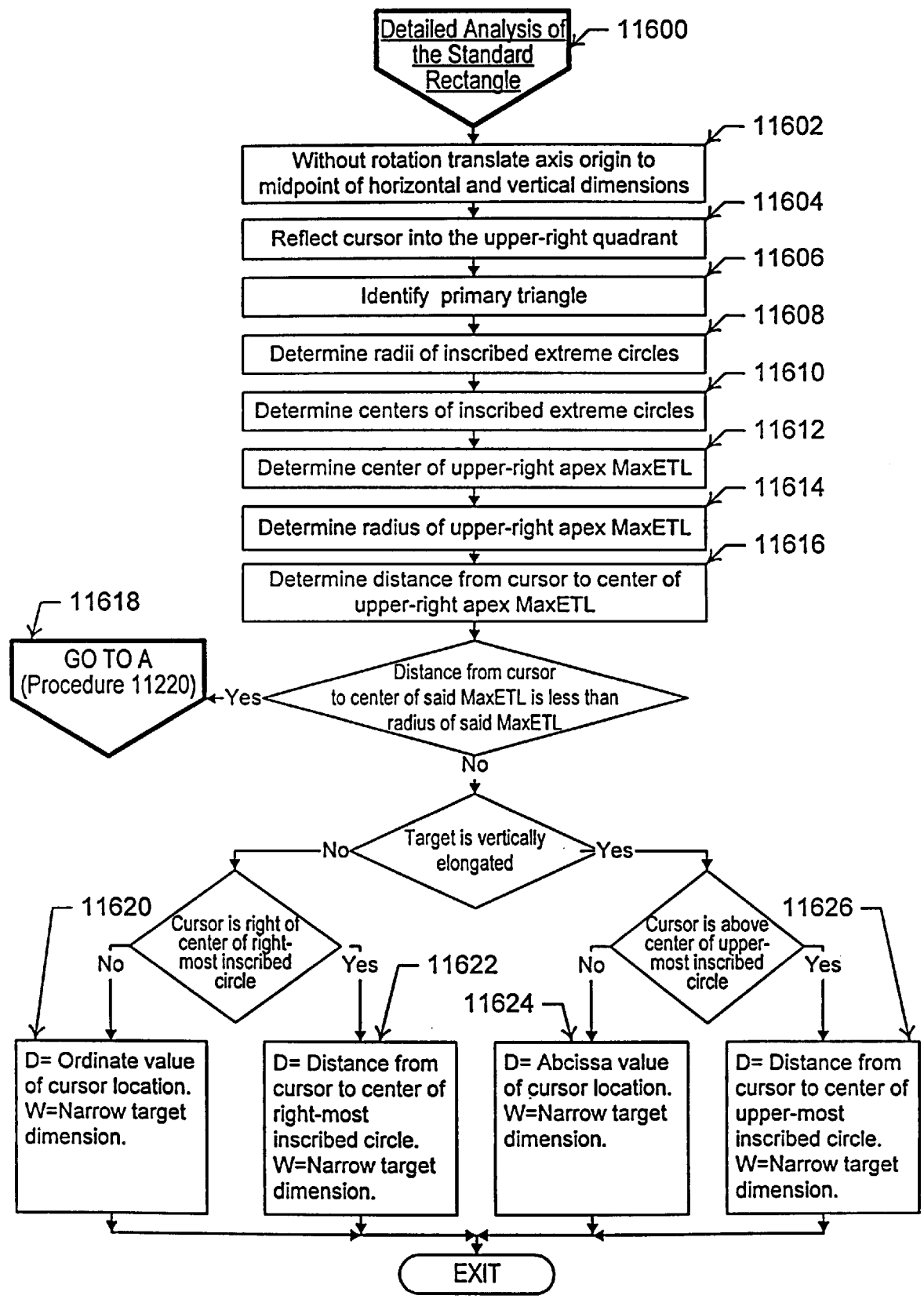
Figure 11G:
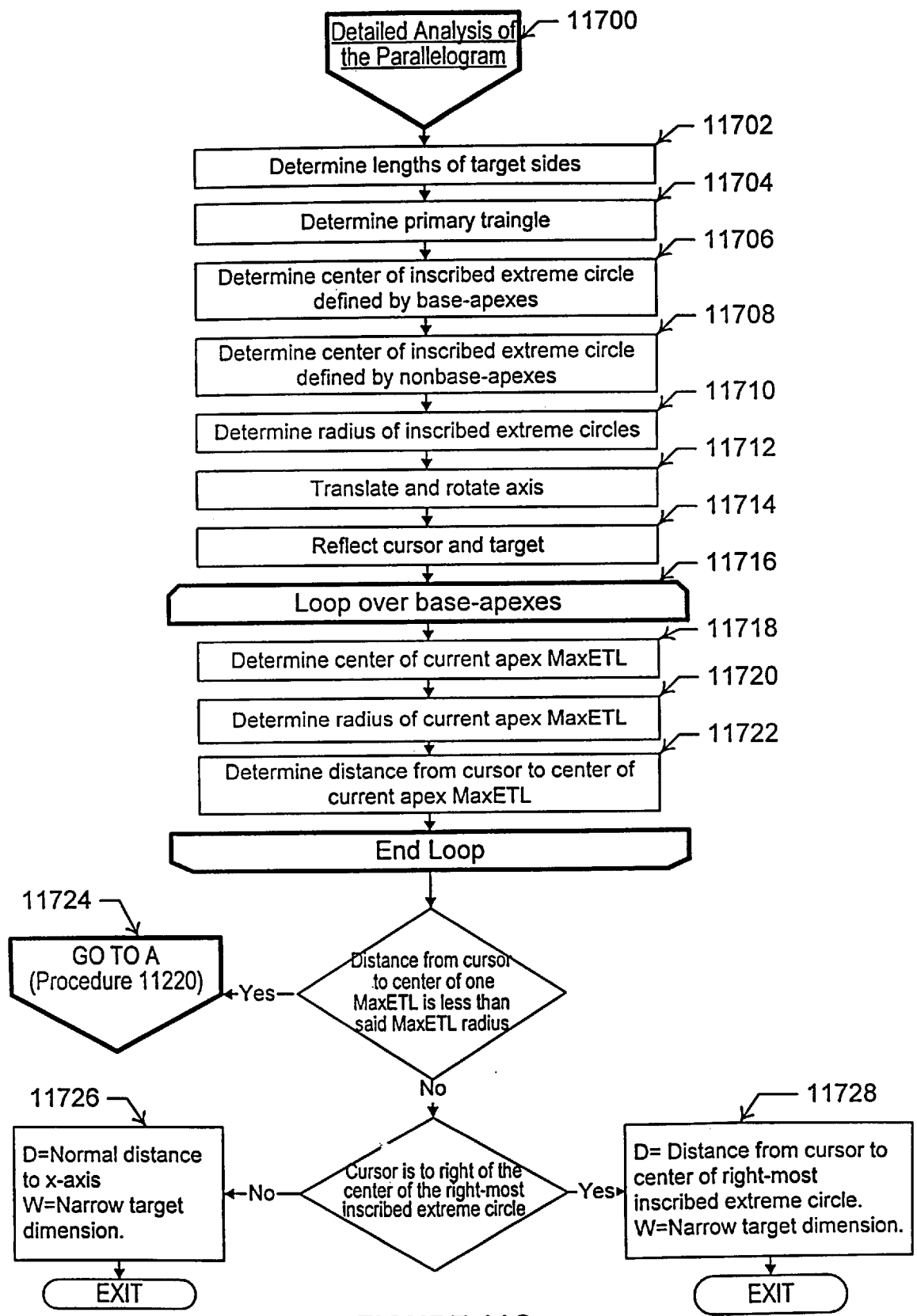
Figure 12A:
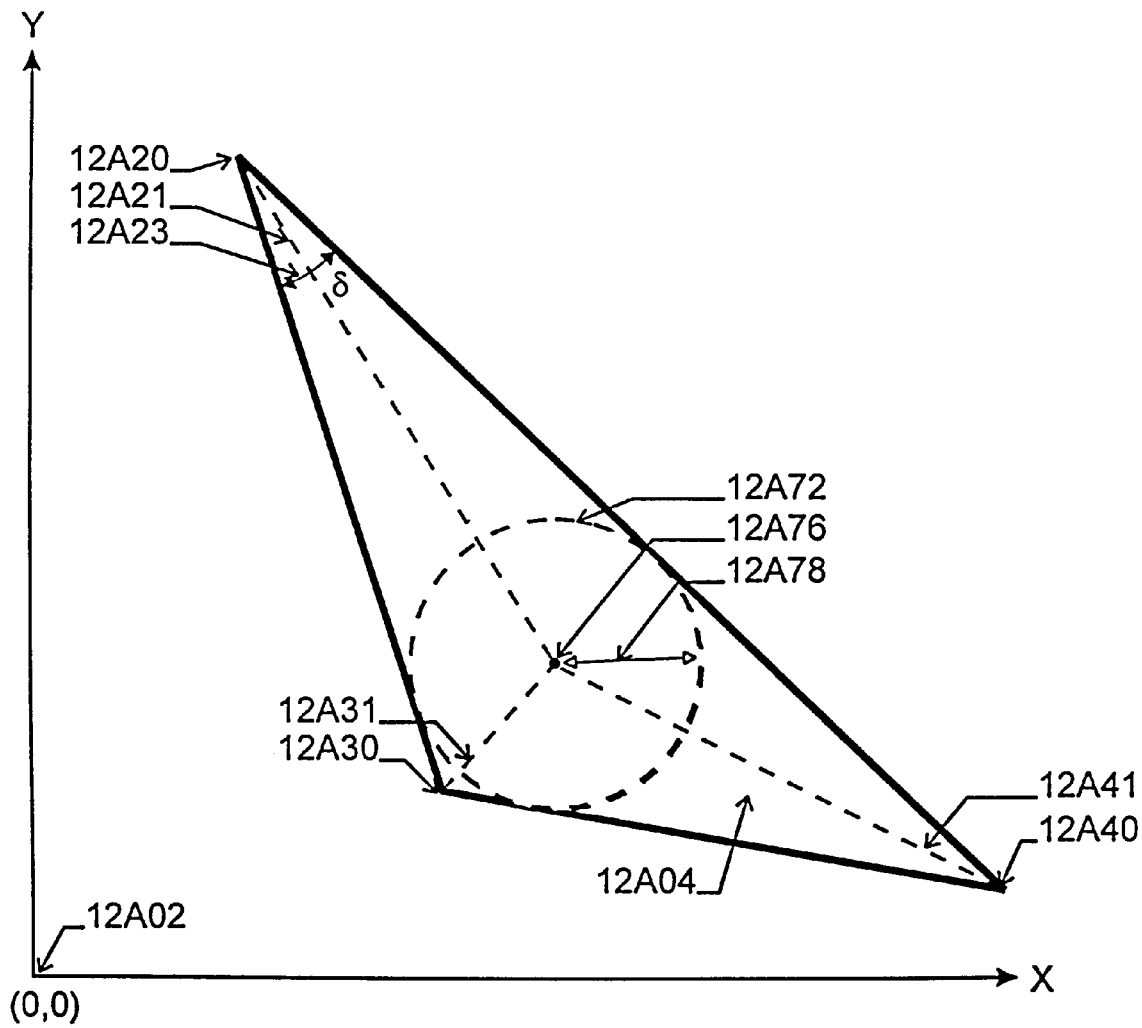
Figure 12B:
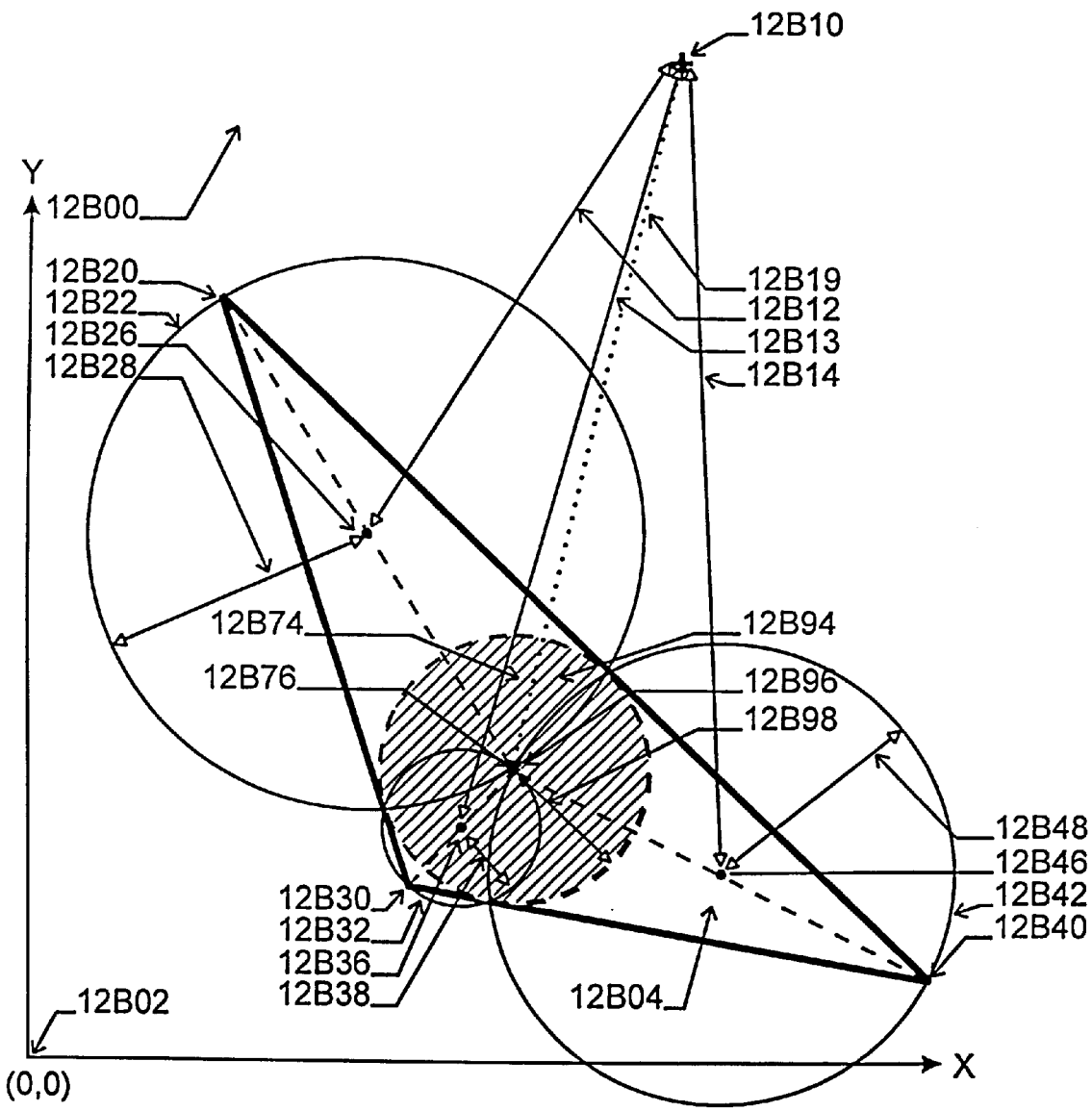
Figure 12C:
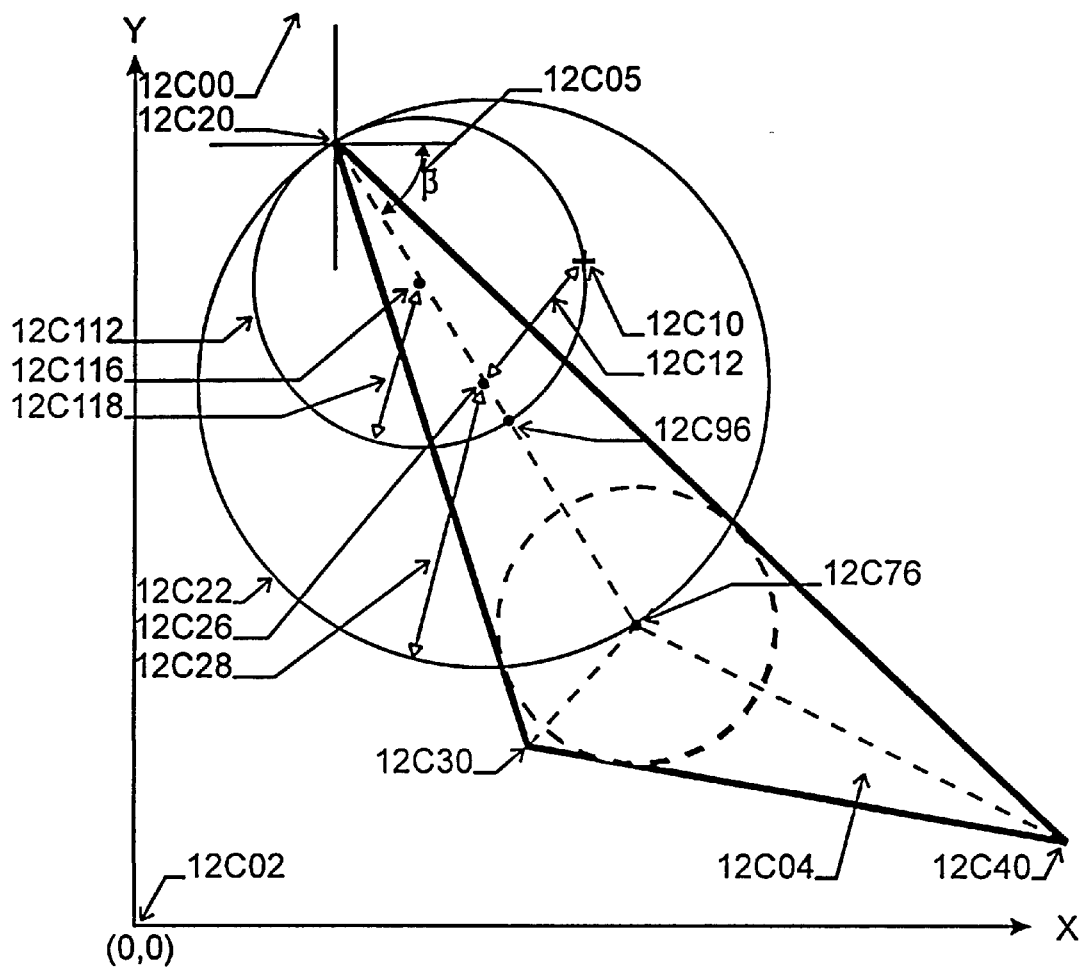
Figure 12D:
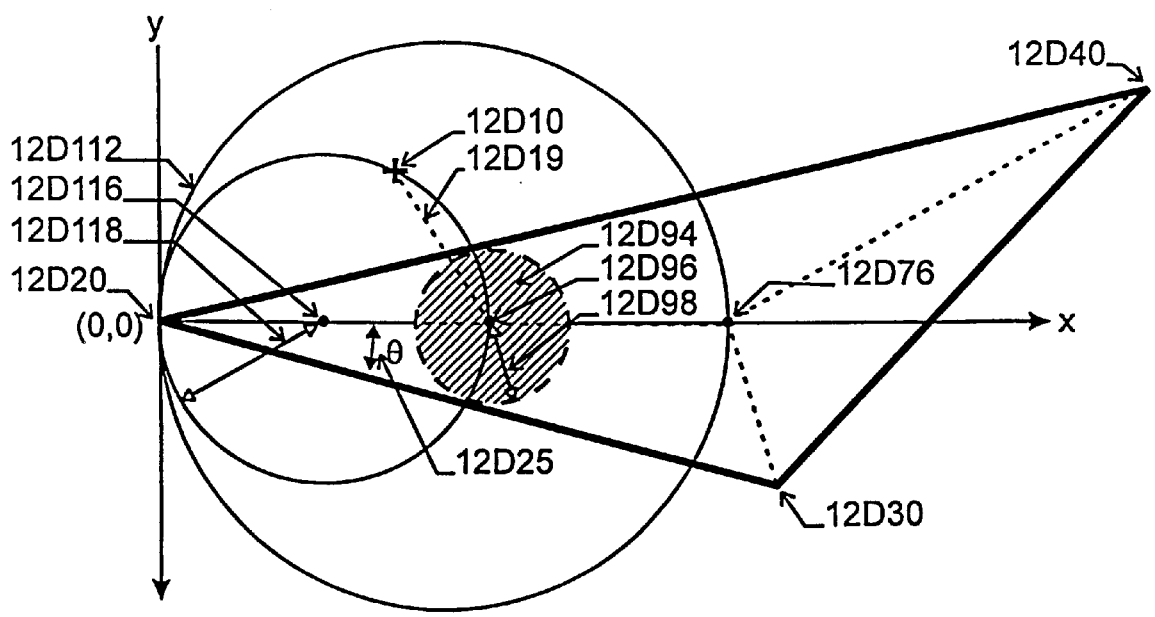
Figure 13A:
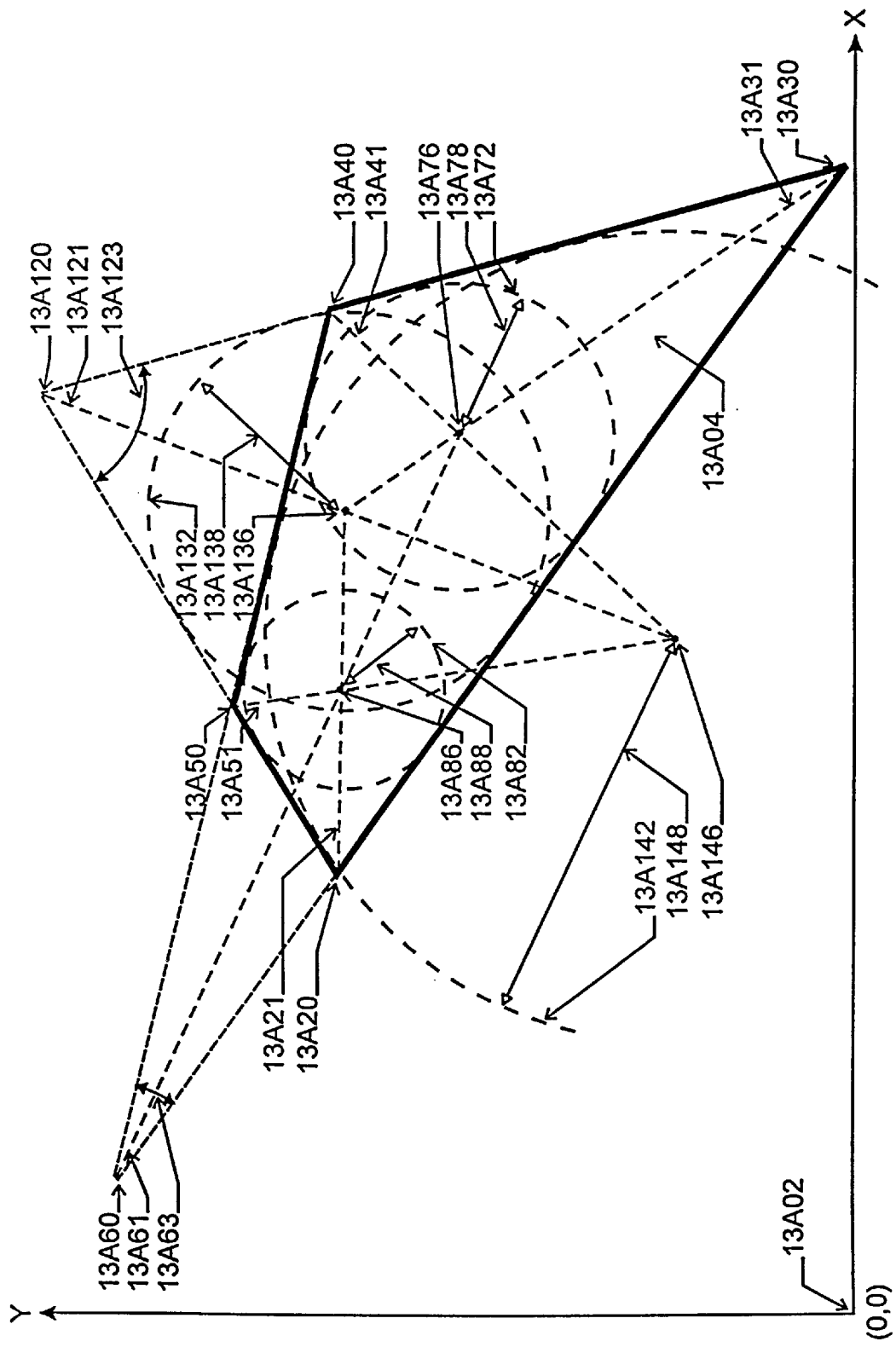
Figure 13B:
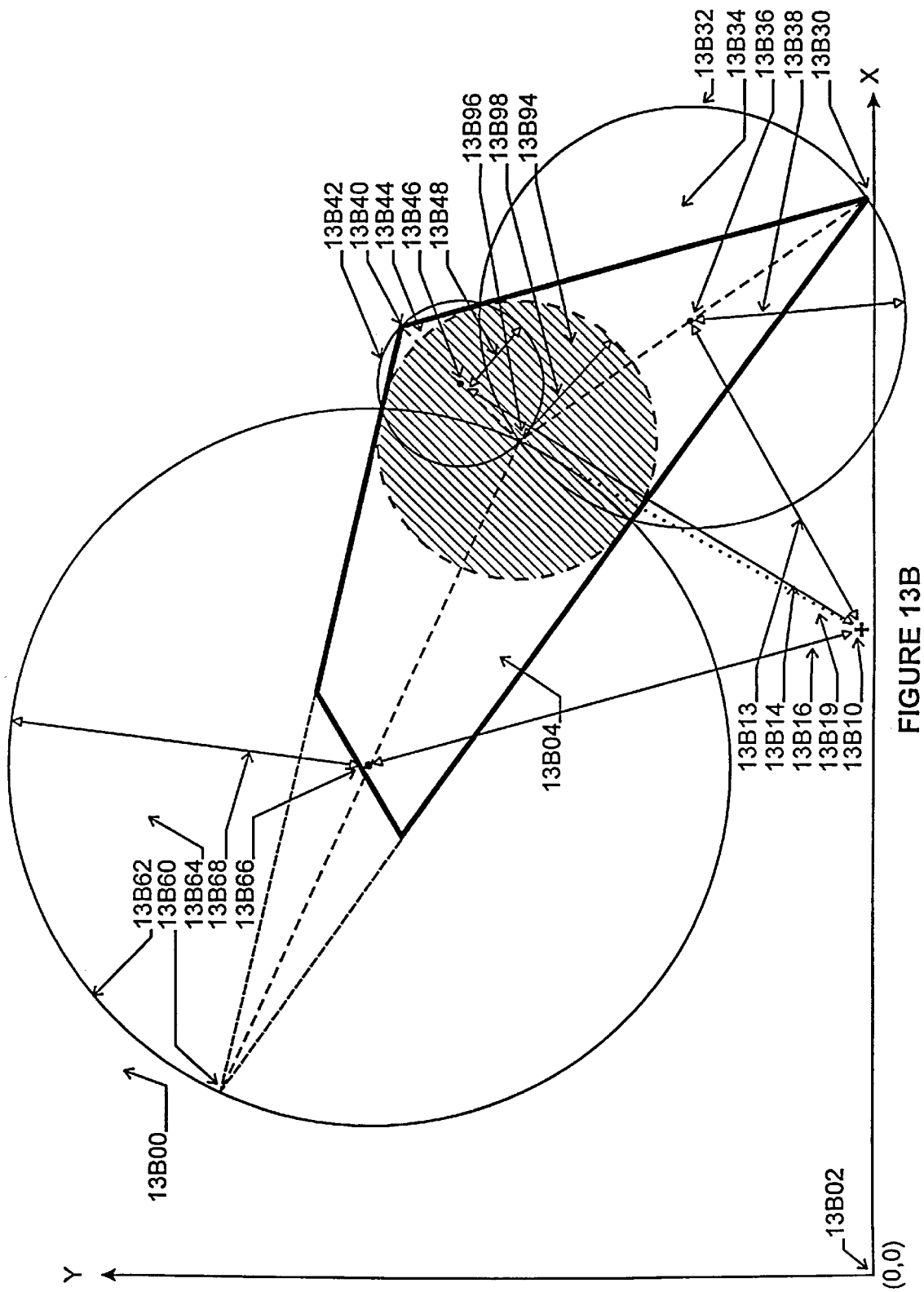
Figure 13C:
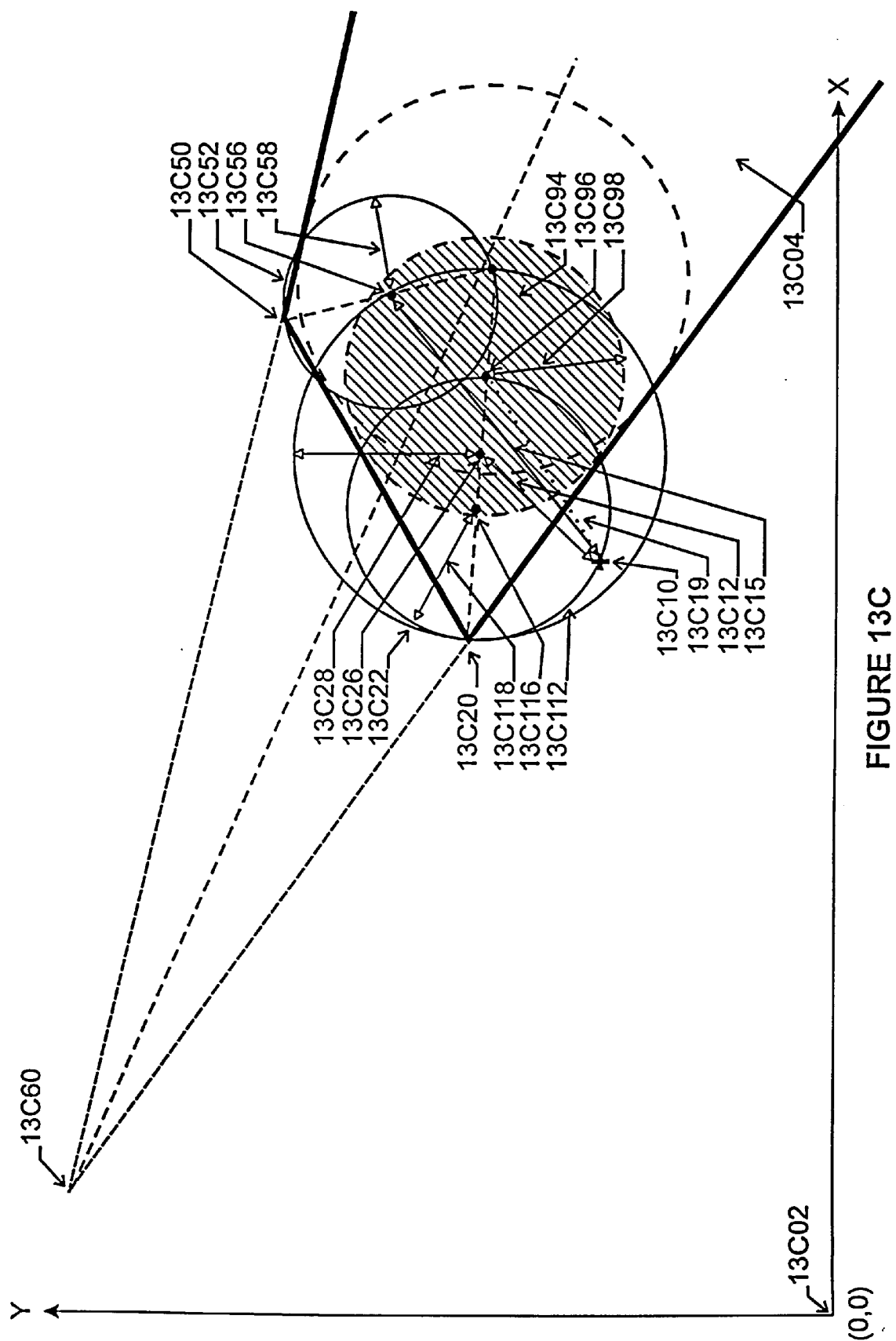
Figure 13D:
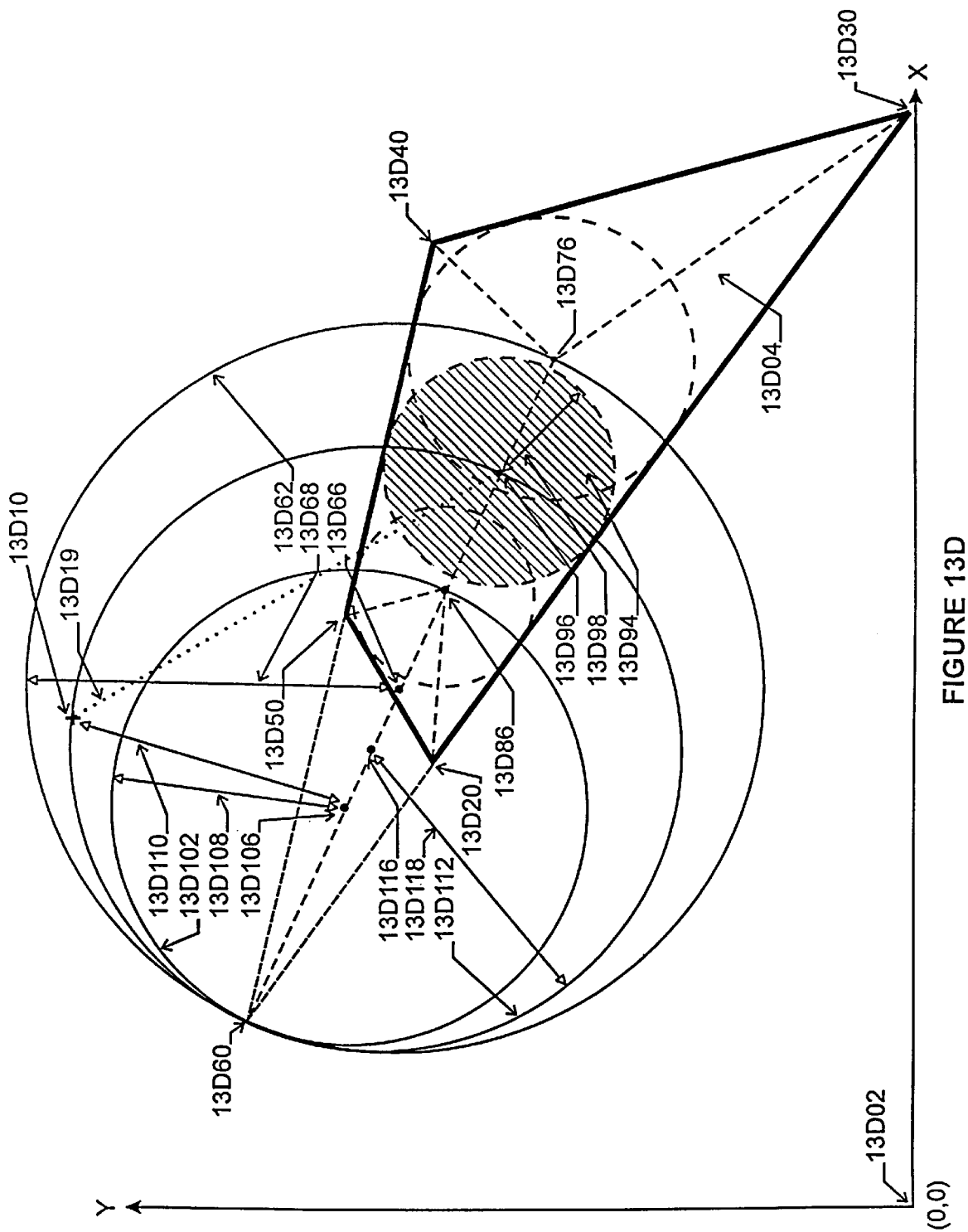
Figure 13E:
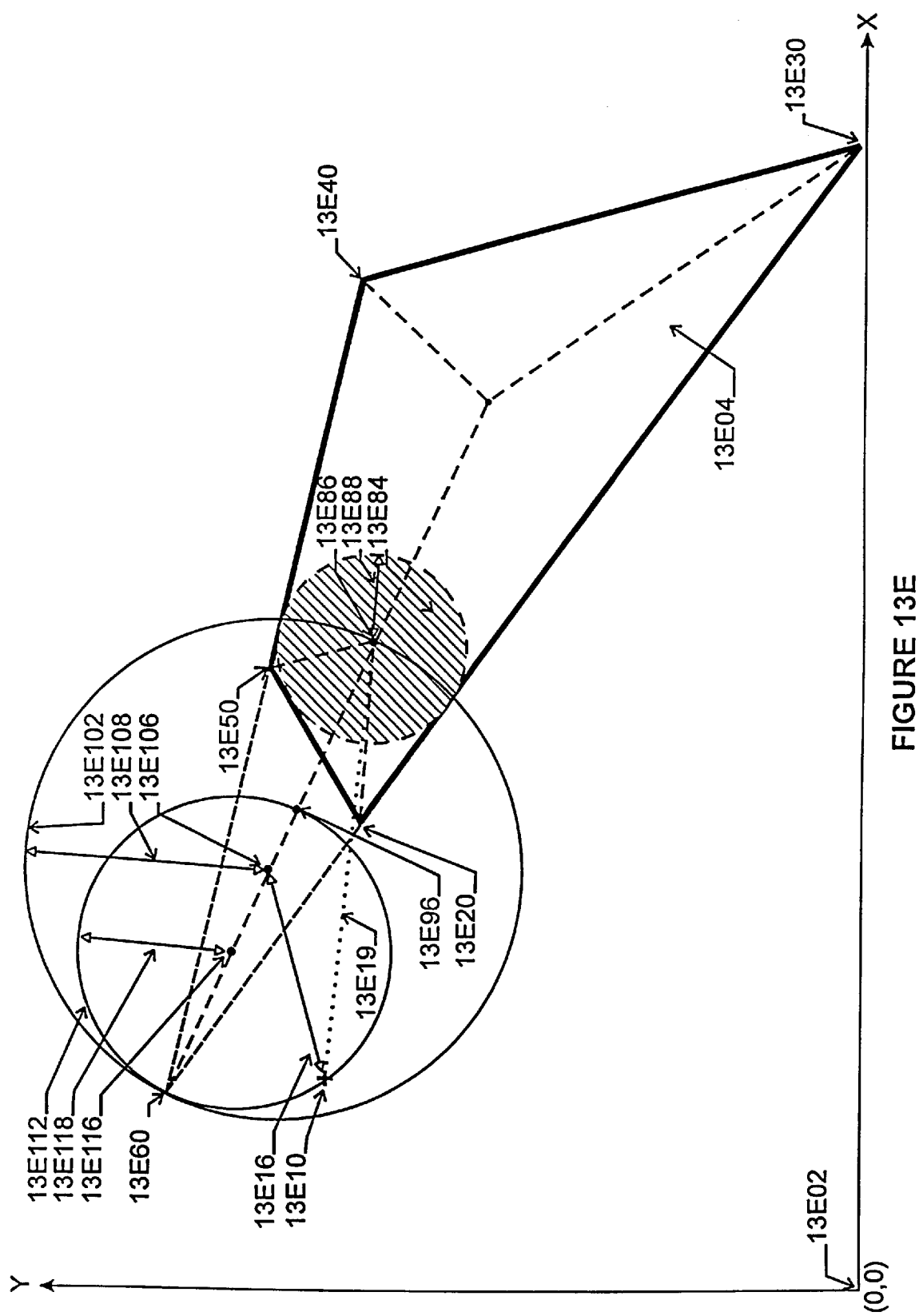
Figure 14A:
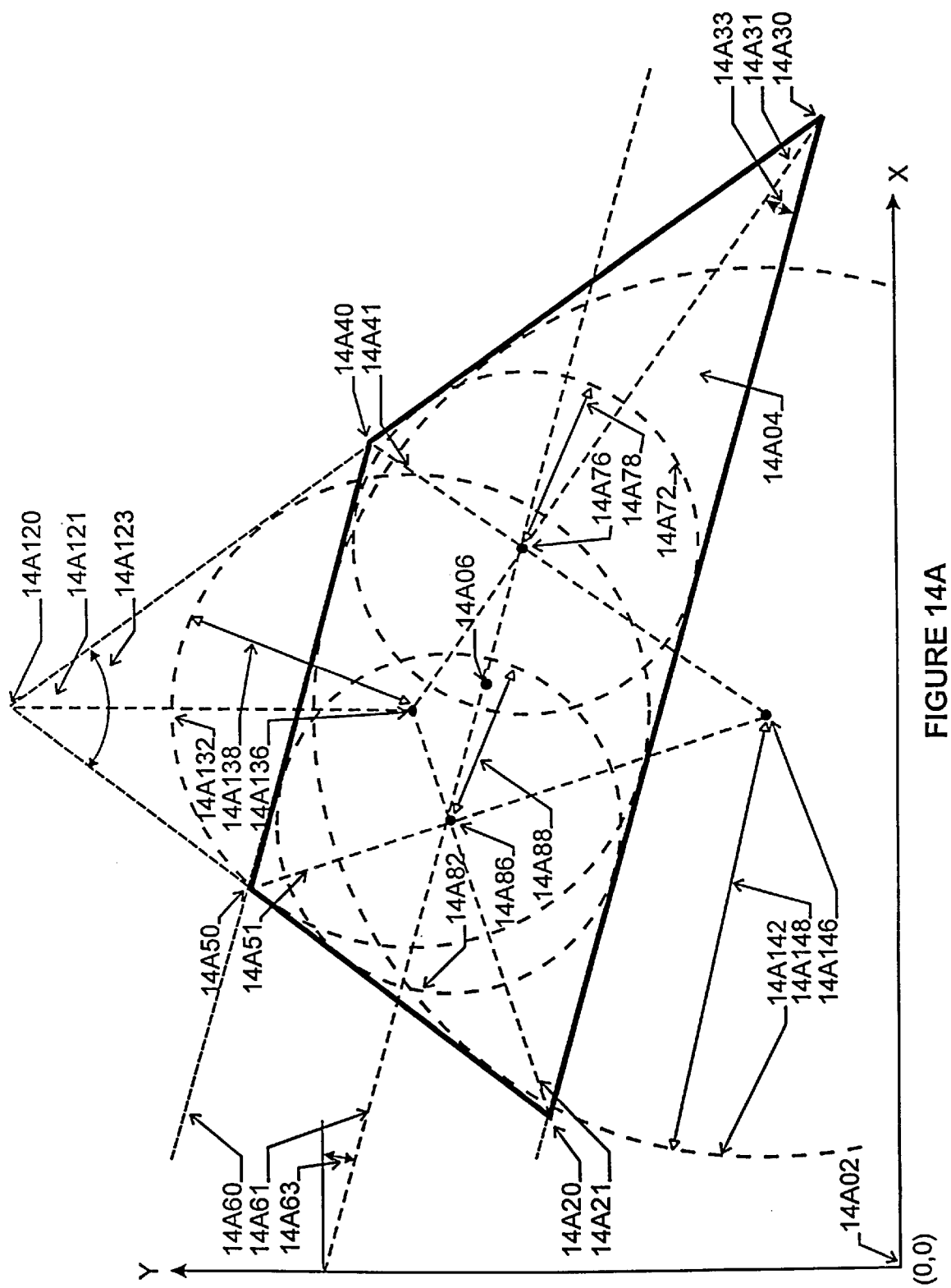
Figure 14B:
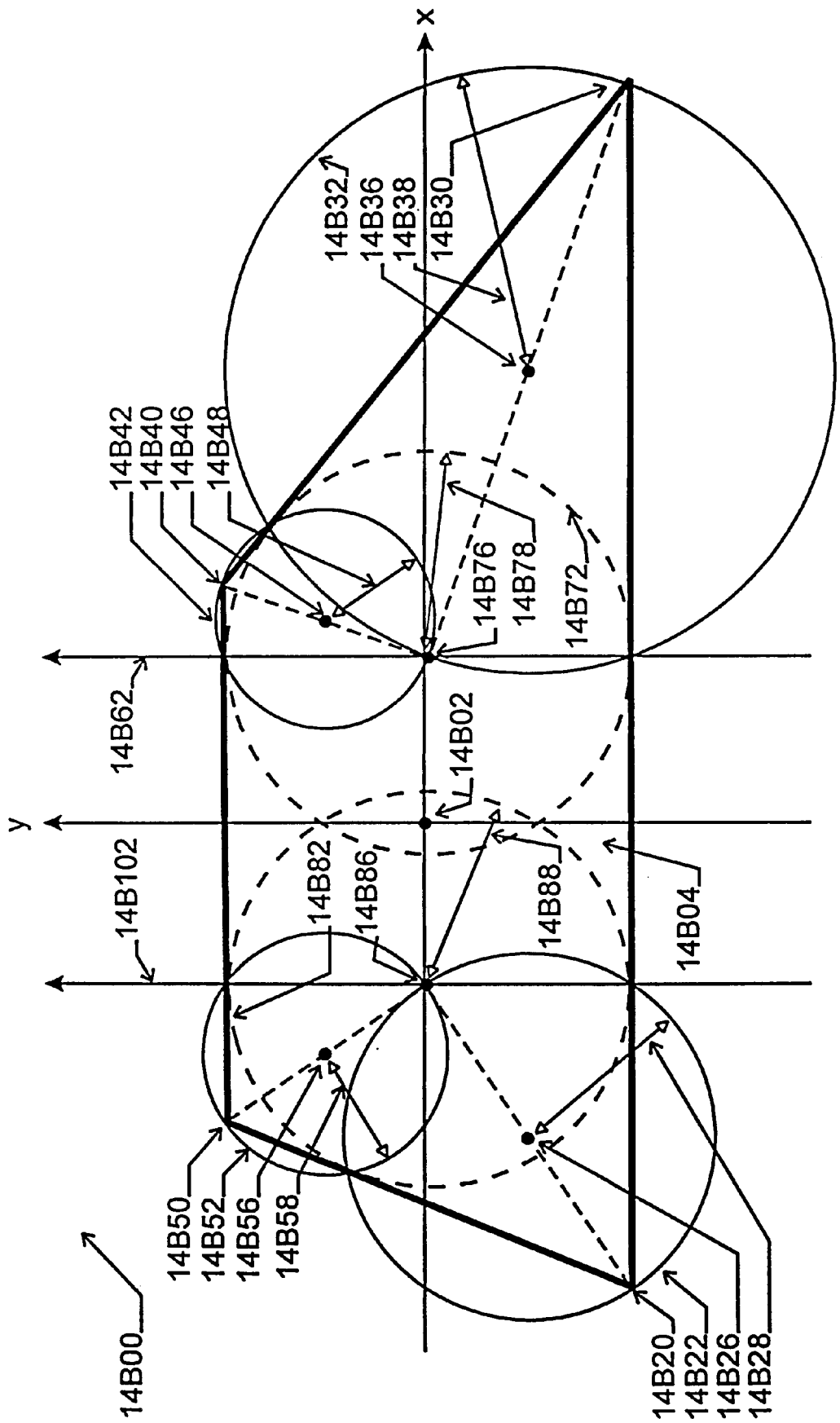
Figure 14C:
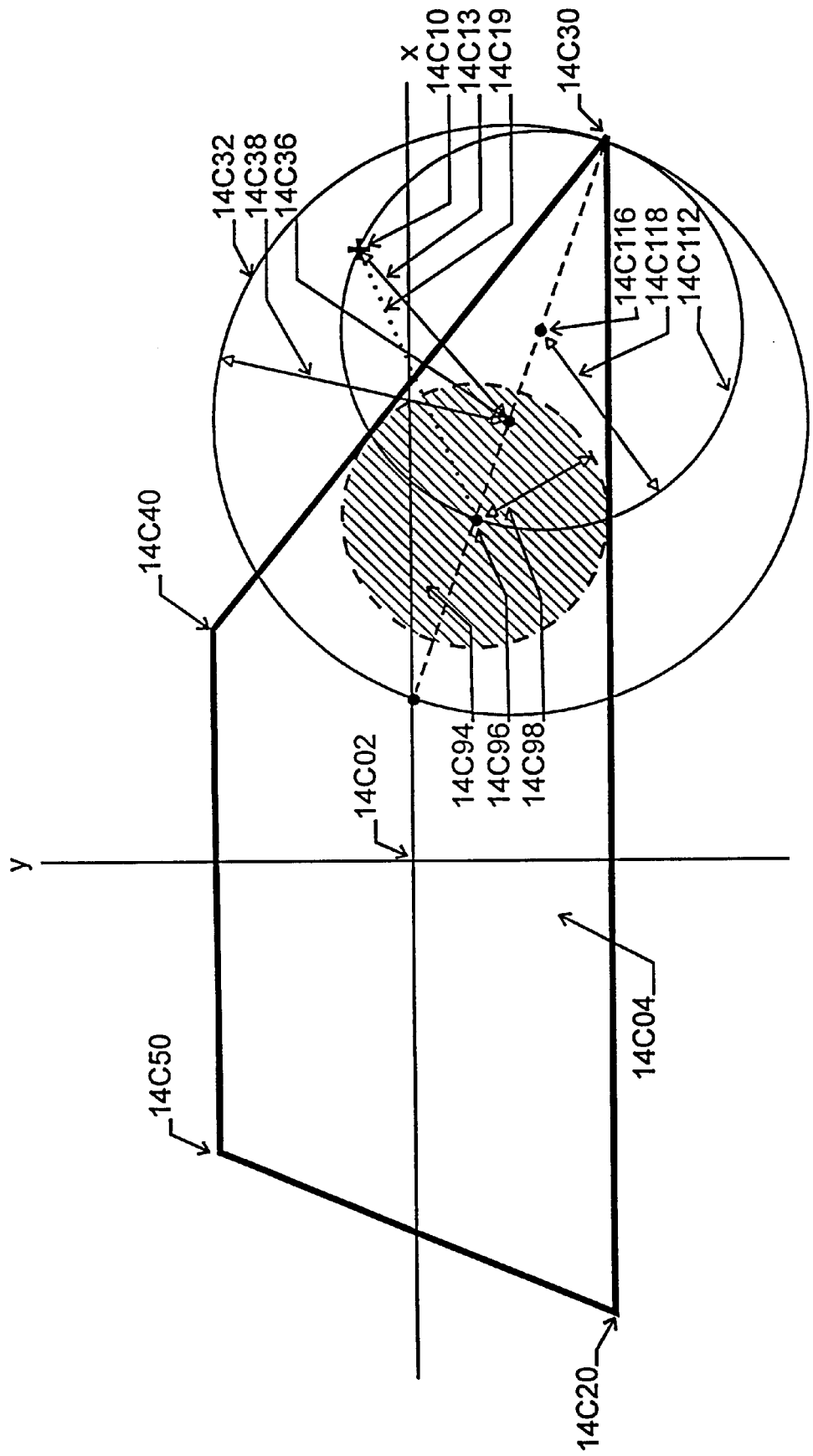
Figure 14D:
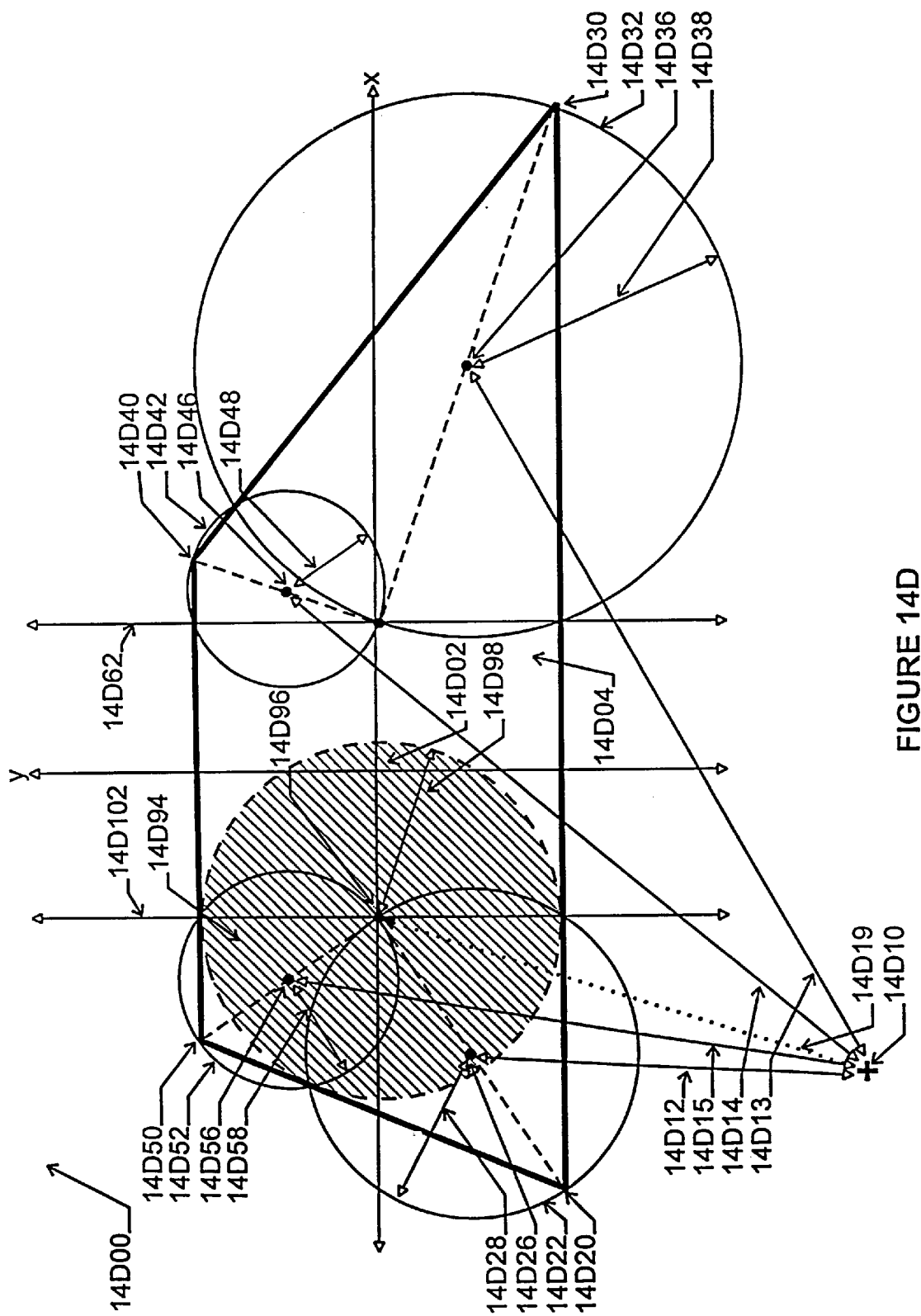
Figure 14E:
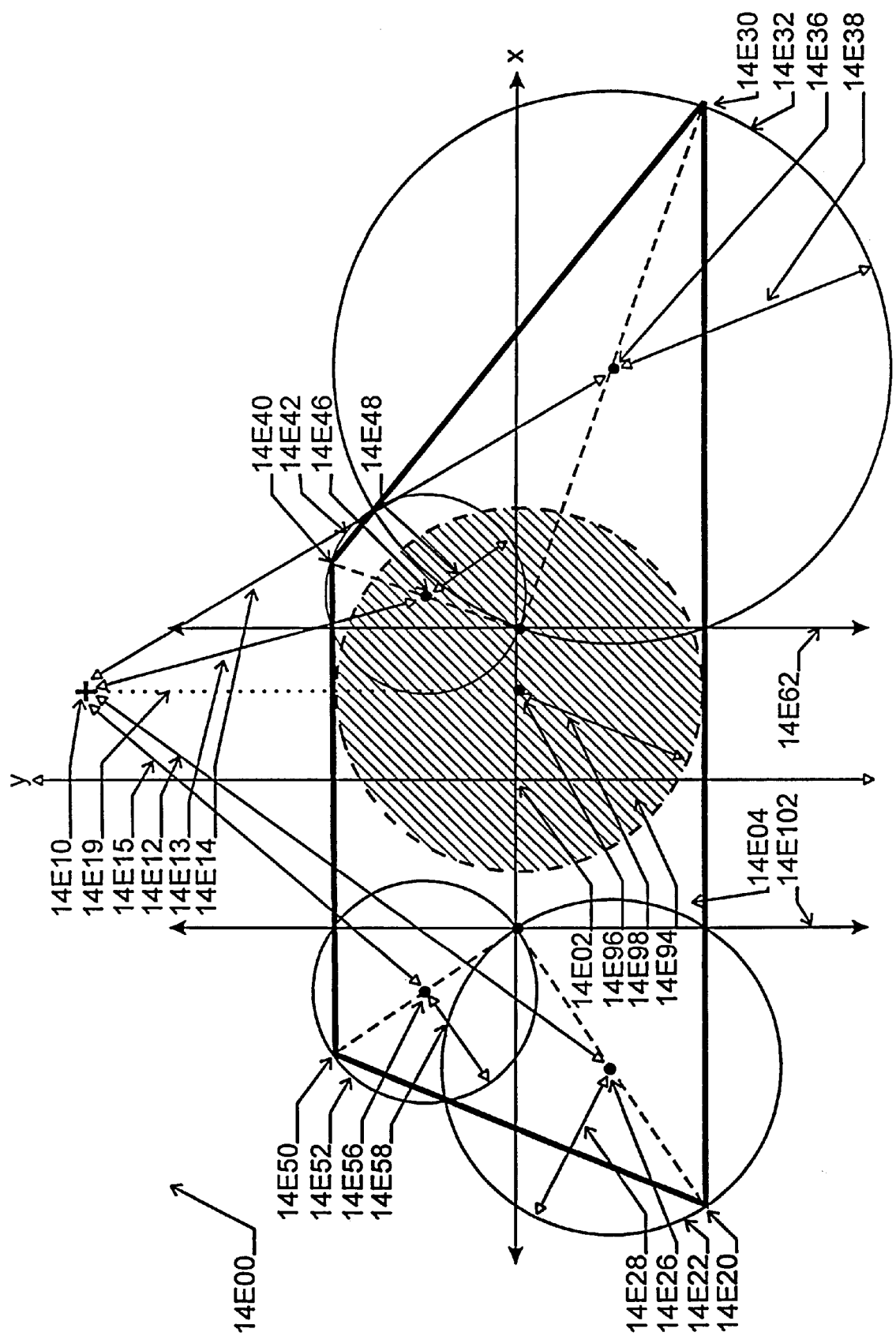
Figure 15A:
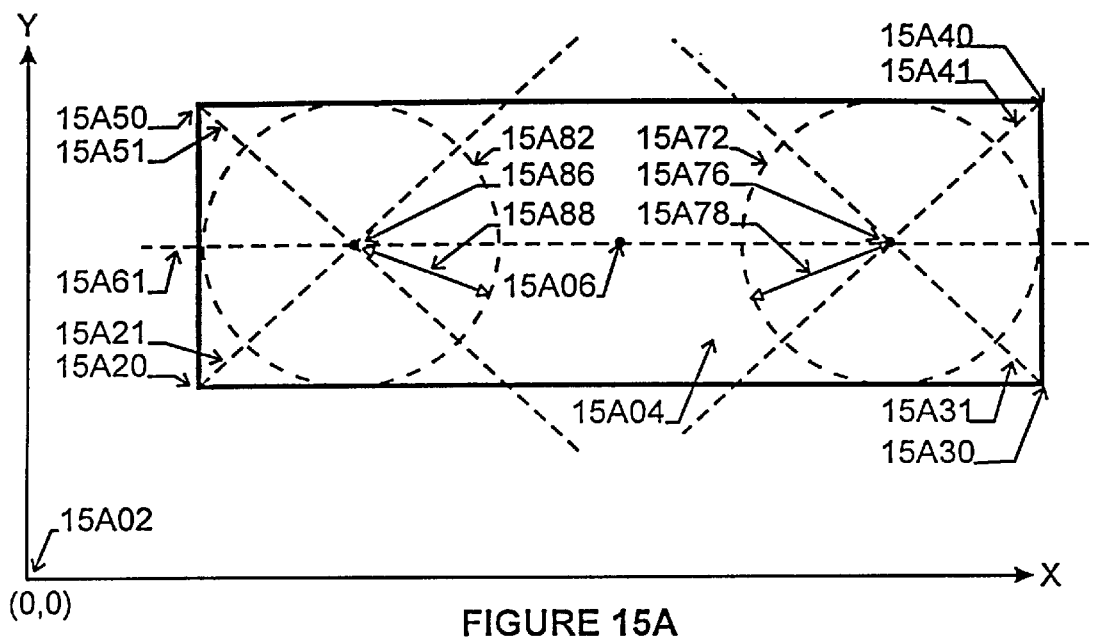
Figure 15B:
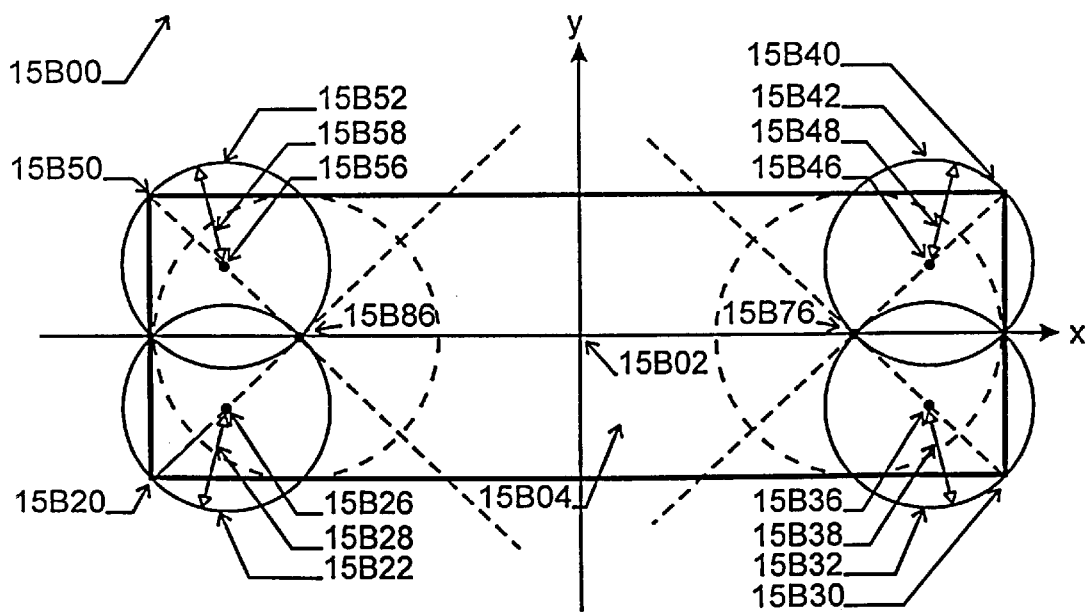
Figure 15C:
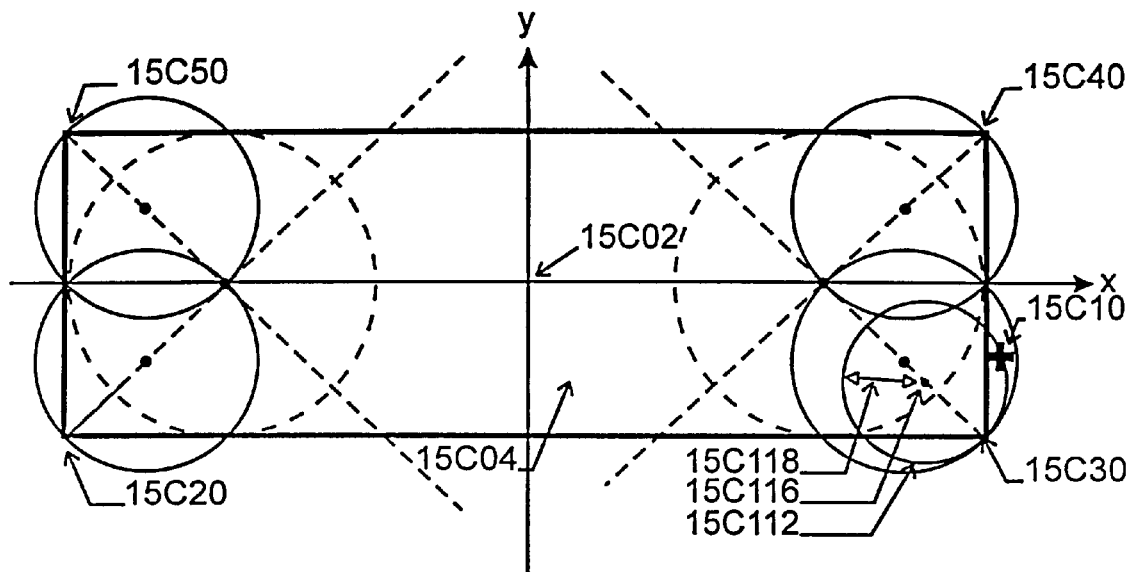
Figure 15D:
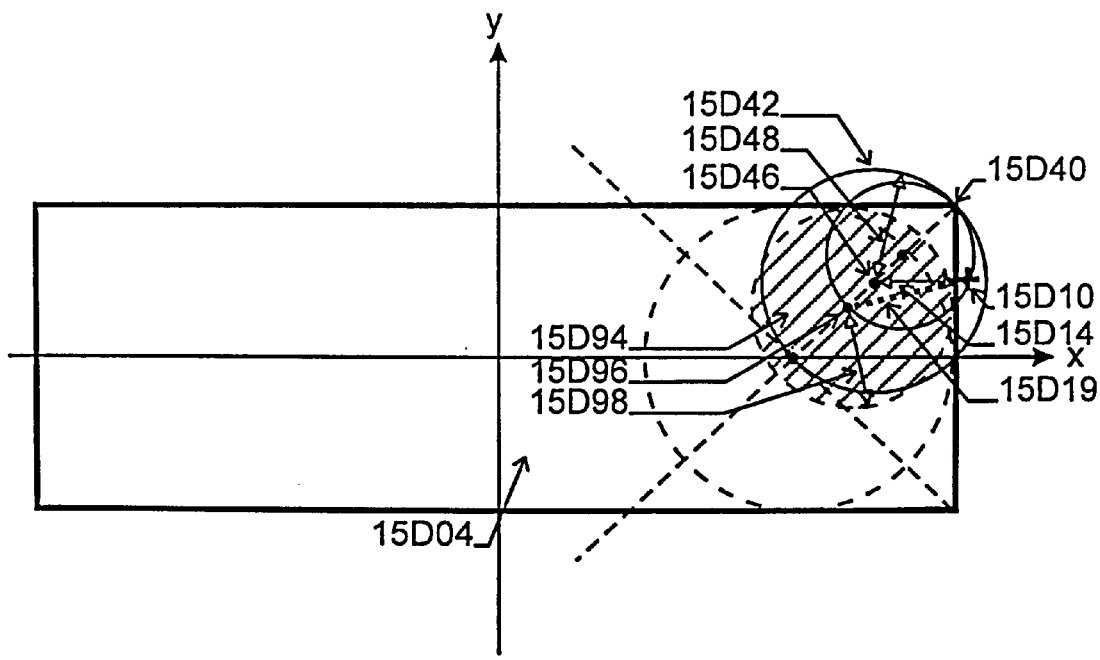
Figure 15E:
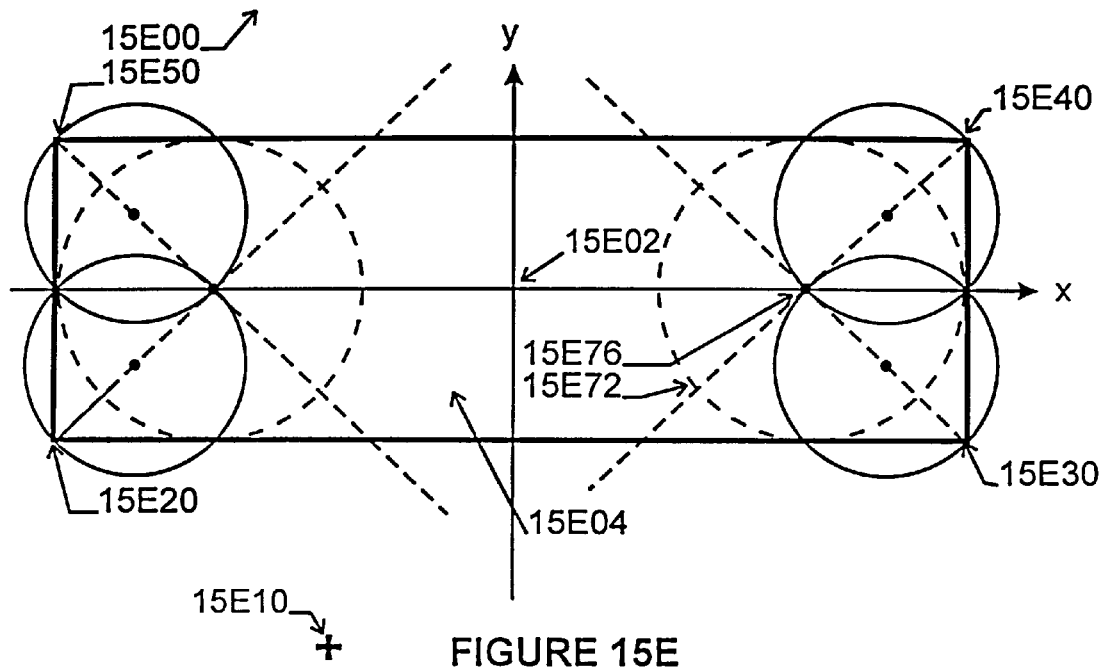
Figure 15F:
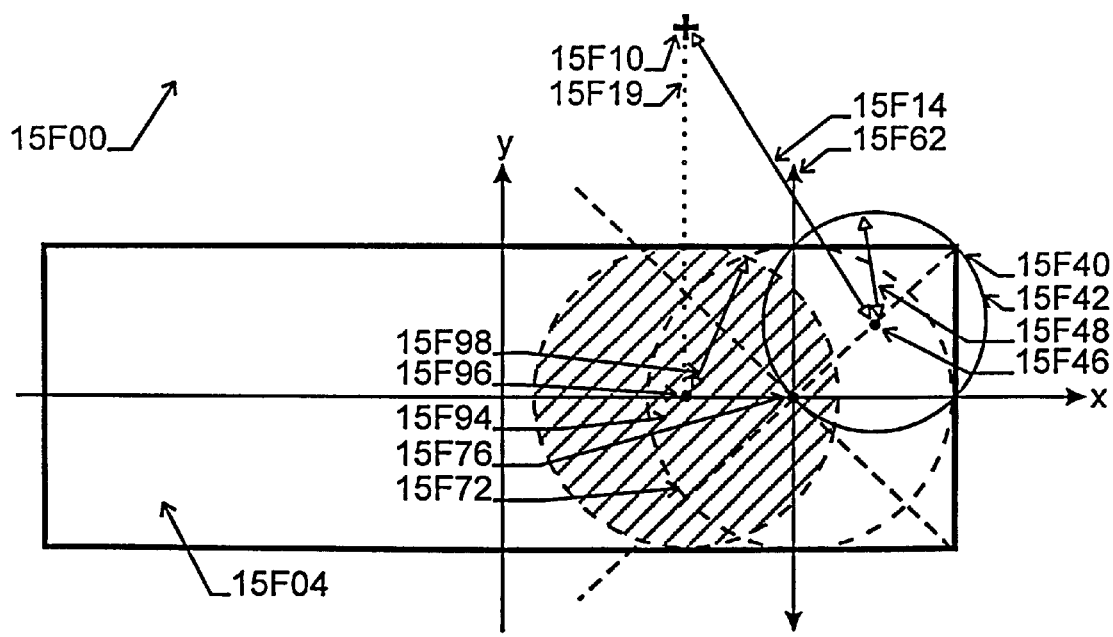
Figure 15G:
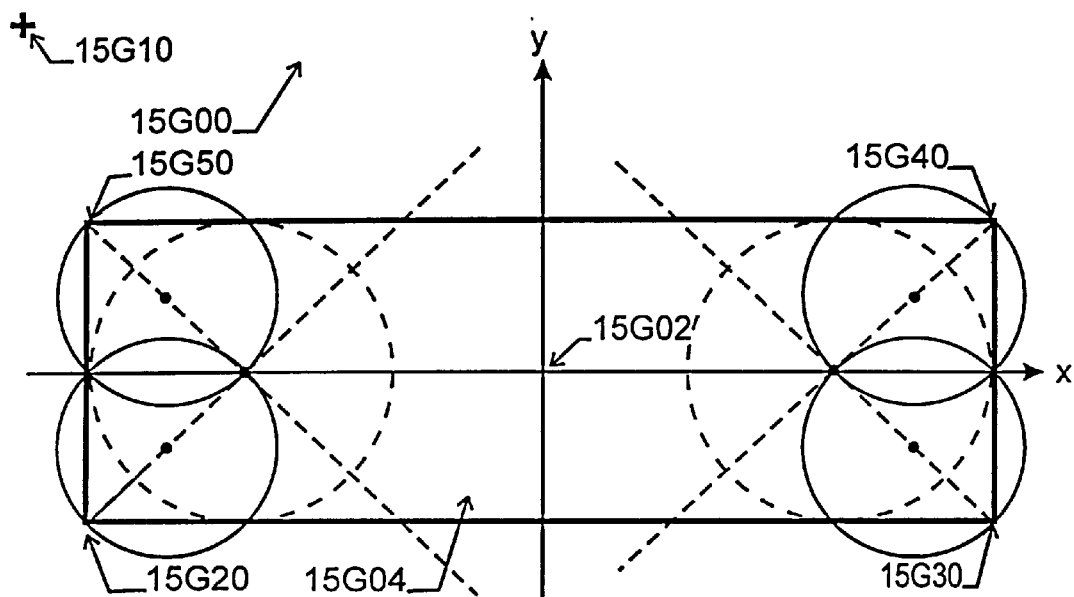
Figure 15H:
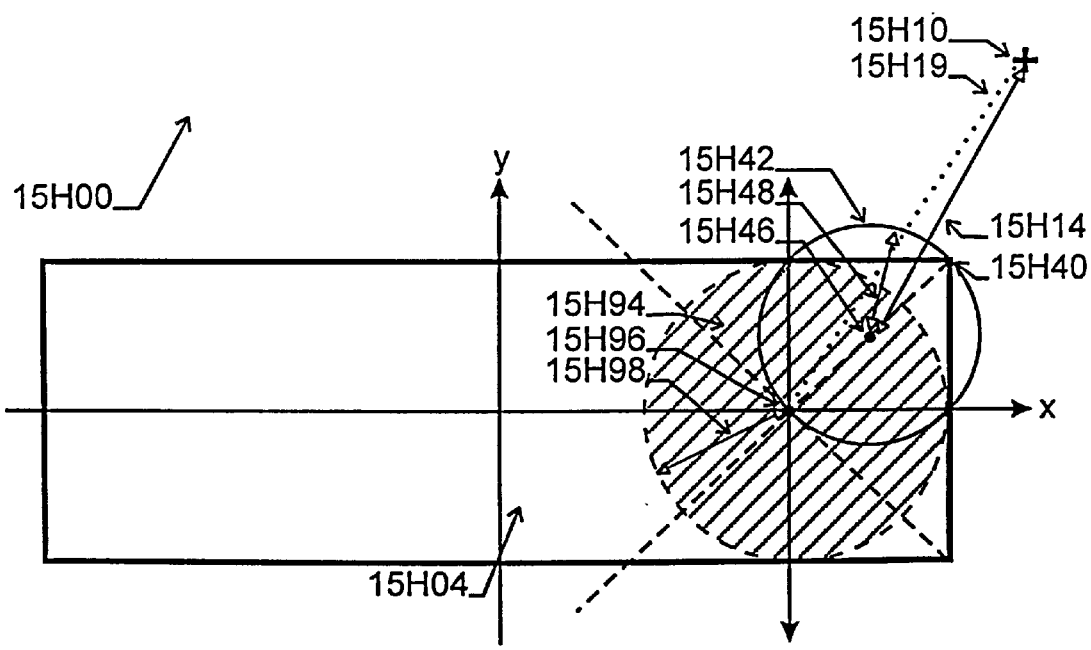
Figure 16A:
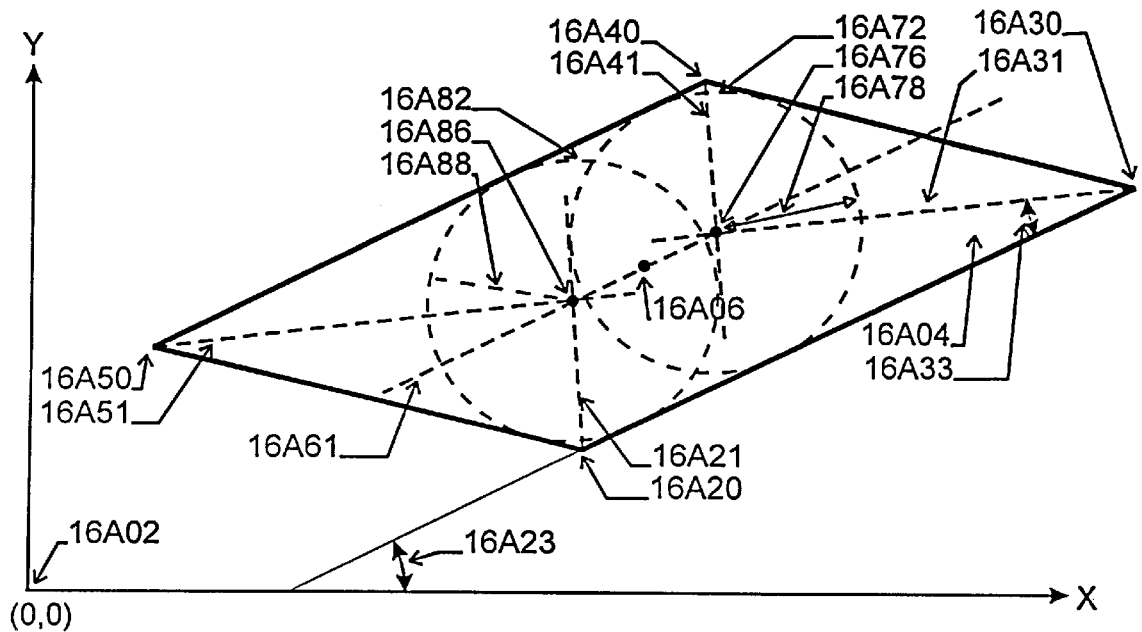
Figure 16B:
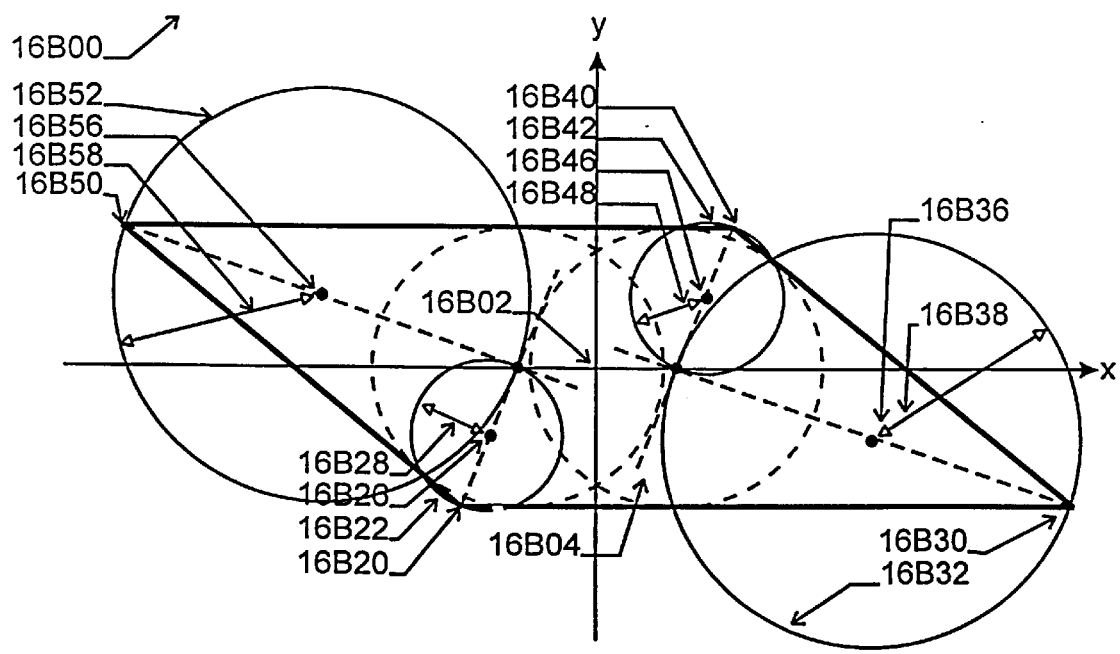
Figure 16C:
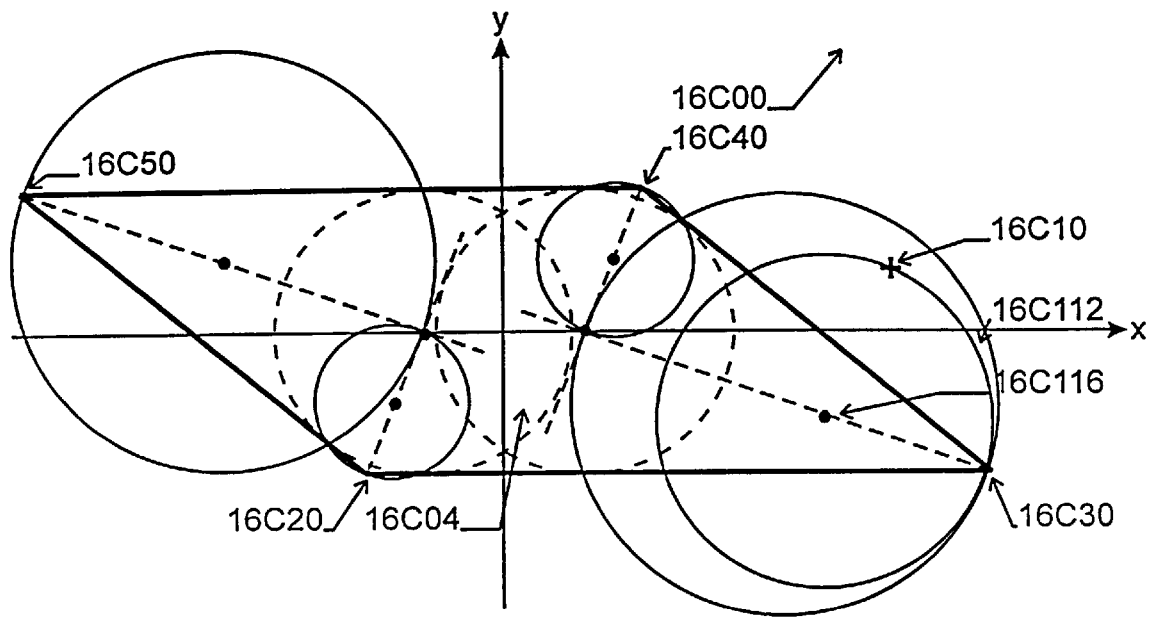
Figure 16D:
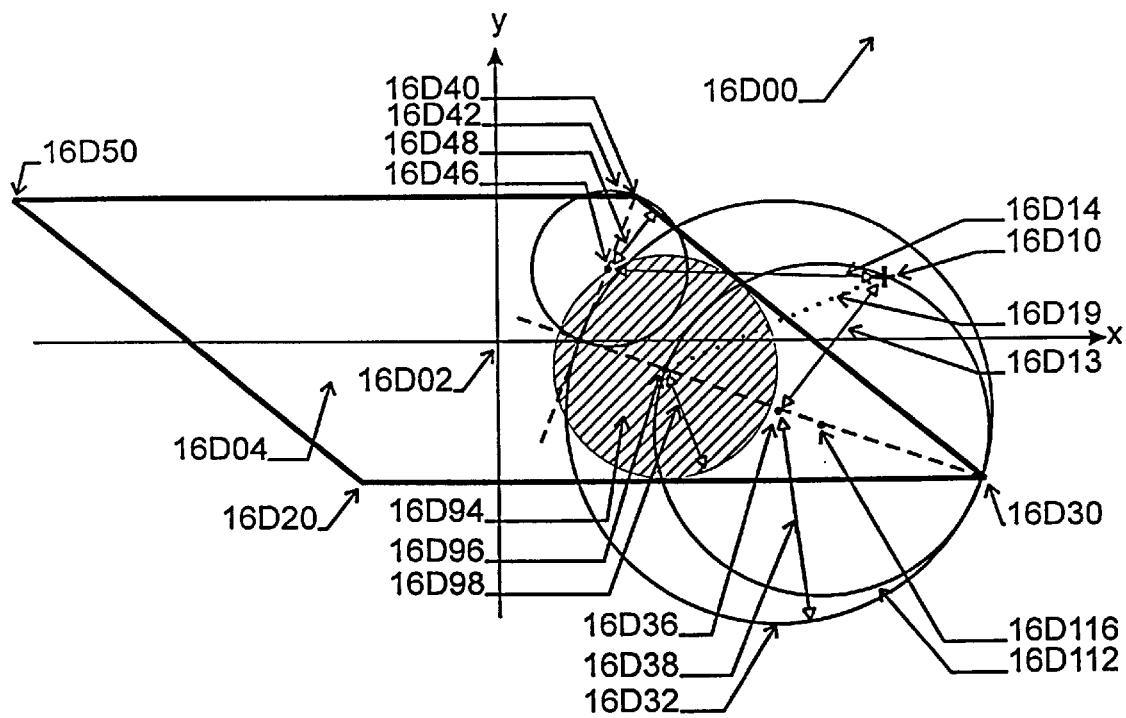
Figure 16E:
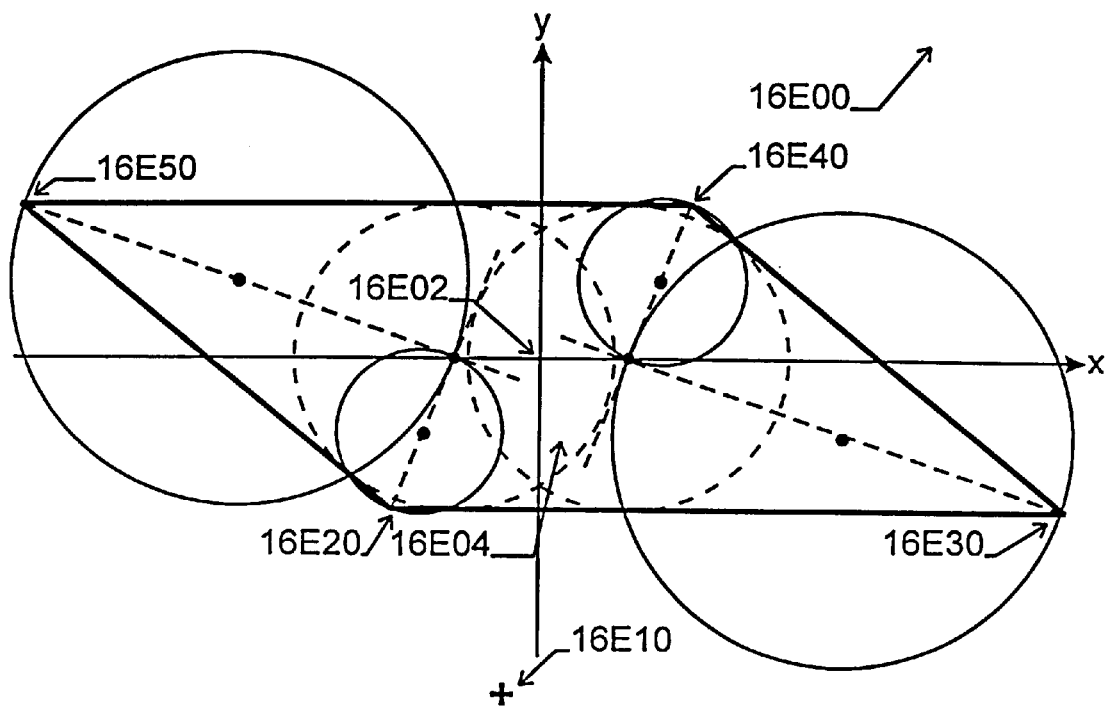
Figure 16F:
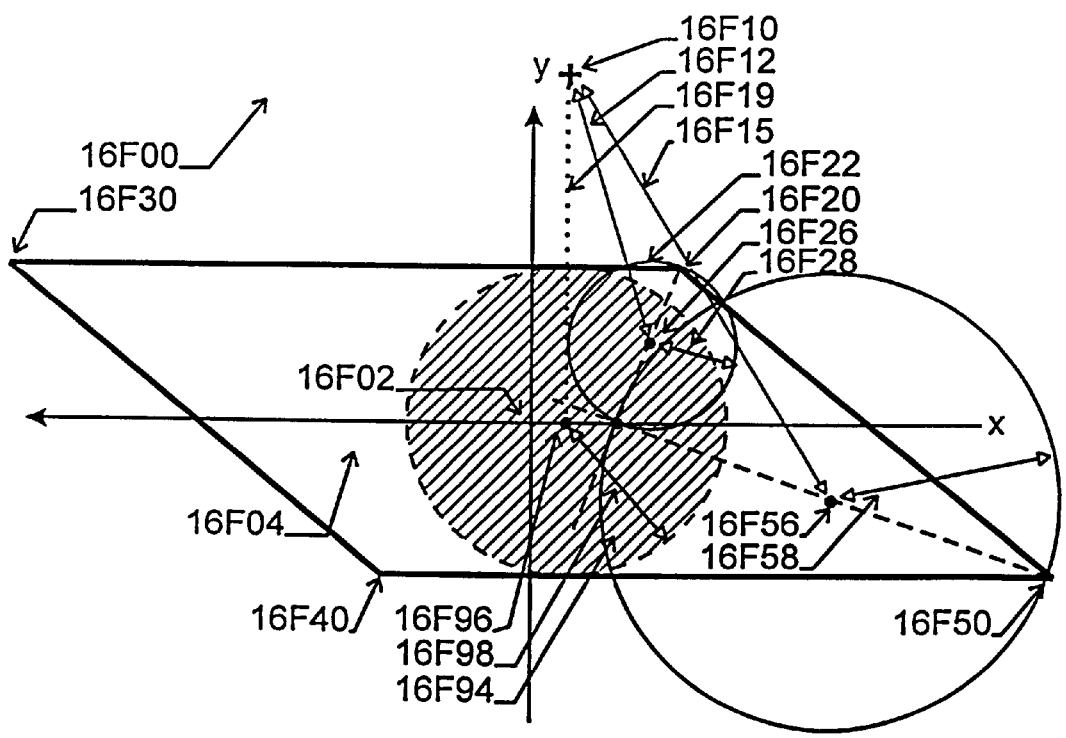
Figure 16G:
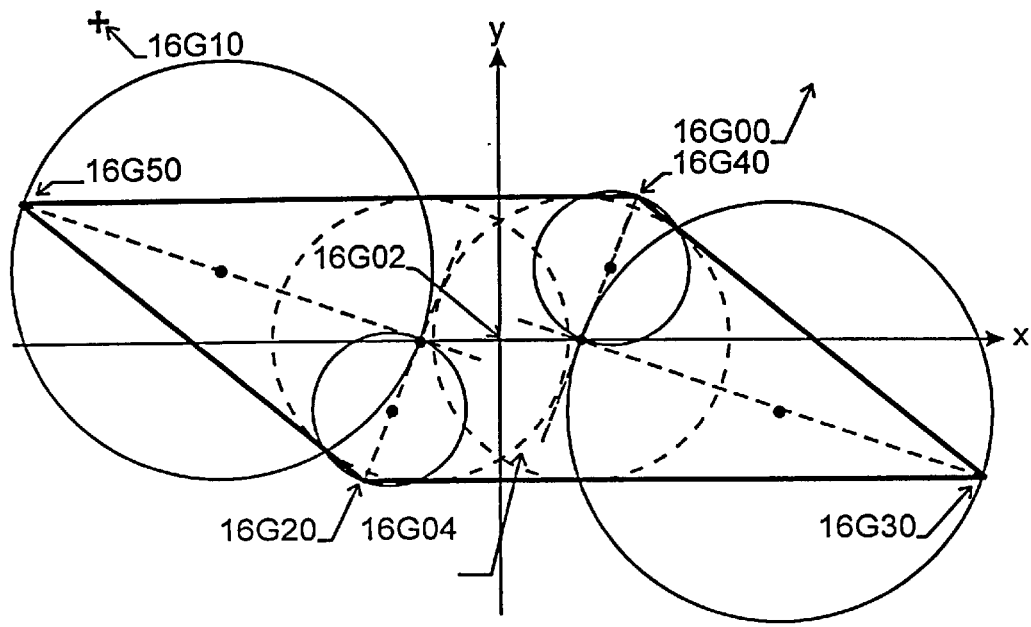
Figure 16H:
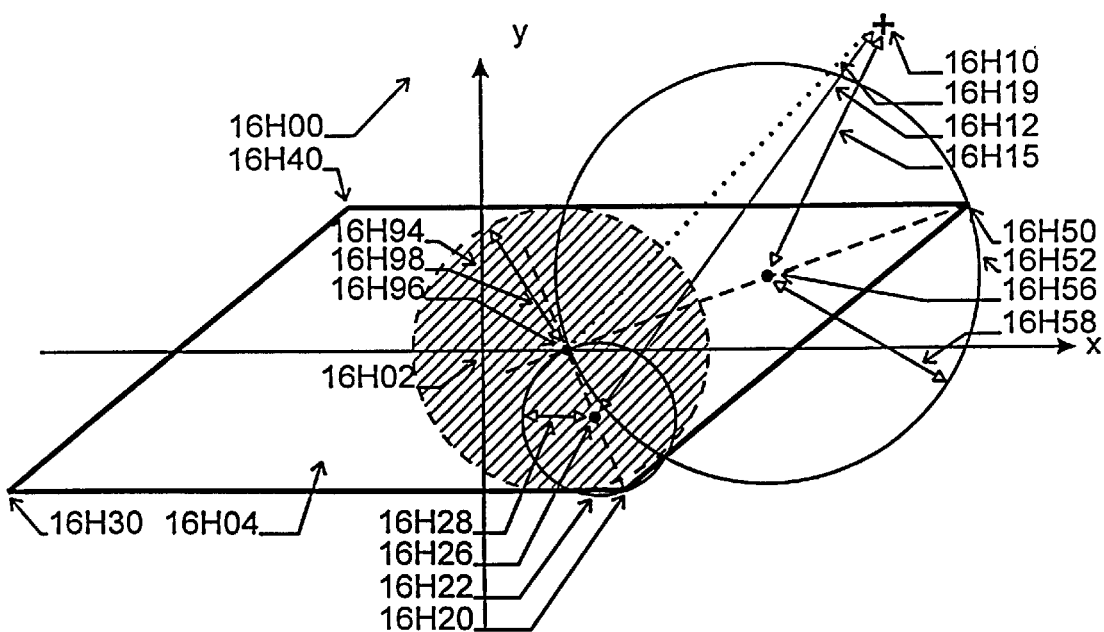

FIG. 10 contains two high level flowcharts showing a programming environment appropriate to implementing the invention:

Sheet 1 is a flowchart of an environment appropriate to design of computer-human interfaces for new application systems.

Sheet 2 is a flowchart of an environment appropriate to evaluation of existing computer-human interfaces.

FIG. 11 contains seven high level flowcharts detailing the preferred implementation of implicit target identification:

Sheet 1 details the root calling procedure.

Sheet 2 is the Detailed Analysis of the Triangle.

Sheet 3 and Sheet 4 is the Detailed Analysis of the Quadrilateral.

Sheet 5 is the Detailed Analysis of the Trapezoid.

Sheet 6 is the Detailed Analysis of the Standard Rectangle.

Sheet 7 is the Detailed Analysis of the Parallelogram.

FIG. 12 contains four triangular targets illustrating the preferred approach to implicit target identification for this class of target:

Sheet 1 illustrates identification of the largest circle which can be inscribed within a triangle.

Sheet 2 illustrates an acquiring entity location outside the influence of all MaxETL.

Sheet 3 Part C illustrates an acquiring entity location within the region of a MaxETL, the ETL pertaining to that said location and parameters of the axis transformation performed. Part D illustrates the axis after transformation and the identification of the implicit target appropriate to the CRT environment.

FIG. 13 contains five quadrilateral targets illustrating the preferred approach to implicit target identification for this class of target:

Sheet 1 illustrates determination of the coordinates of the two finite external apexes, identification of the largest and smallest inscribed extreme circles of each generating triangle, and identification of the primary triangle.

Sheet 2 illustrates identification of the MaxETL for each target apex, the MaxETL for external apex, and identification of the implicit target to be the largest inscribed circle when the acquiring entity is on or outside the bounds of all MaxETL.

Sheet 3 illustrates an acquiring entity location within the region of an apex MaxETL and the ETL pertaining to that acquiring entity location.

Sheet 4 illustrates an acquiring entity location within the region of the external apex MaxETL such that the center of the implicit target falls on the line connecting the centers of the smallest and largest inscribed extreme circles.

Sheet 5 illustrates adjustment to the implicit target location when the acquiring entity is within the region of the external apex MaxETL such that the optimal implicit target falls outside the actual target.

FIG. 14 contains five trapezoidal targets illustrating the preferred approach to implicit target identification for this class of target:

Sheet 1 illustrates determination of the coordinates of the single finite external apex, location of the inscribed extreme circles of each generating triangle, and identification of the primary triangle.

Sheet 2 is a trapezoidal target having a primary triangle with infinite external apex that illustrates axis transformation and identification of the MaxETL for target apexes and the external apex.

Sheet 3 is a trapezoidal target having a primary triangle with infinite external apex that illustrates an acquiring entity within the region of a target apex MaxETL and the ETL pertaining to said location.

Sheet 4 is a trapezoidal target having a primary triangle with infinitely remote external apex that illustrates identification of the implicit target for the case of an acquiring entity outside the influence of all apex MaxETL when a normal approach to the line connecting the centers of the inscribed extreme circles is not possible.

Sheet 5 is a trapezoidal target having a primary triangle with infinitely remote external apex that illustrates identification of the implicit target for the case of an acquiring entity outside the influence of all apex MaxETL when a normal approach to the line connecting the centers of the inscribed extreme circles is possible.

FIG. 15 contains a plurality of standard rectangular targets illustrating the preferred approach to implicit target identification for this class of target:

Sheet 1 Part A illustrates identification of the primary triangle and location of the inscribed extreme circles of the primary triangle. Part B illustrates axis translation and identification of the apex MaxETL for the transformed axis.

Sheet 2 Part A illustrates the case of an acquiring entity located within the MaxETL of an apex, the ETL pertaining to said location, and parameters of the reflection to be performed. Part B illustrates the result of acquiring entity reflection and identification of the implicit target for the reflected system.

Sheet 3 Part A illustrates the case of an acquiring entity located outside the influence of all apex MaxETL from which a normal approach to the line connecting the centers of the two inscribed extreme circles can be performed. Part B illustrates the result of acquiring entity reflection and identification of the implicit target for the transformed system.

Sheet 4 Part A illustrates the case of an acquiring entity located outside the influence of all apex MaxETL from which a normal approach to the line connecting the centers of the two inscribed extreme circles cannot be performed. Part B illustrates the result of acquiring entity reflection and identification of the implicit target for the transformed system.

FIG. 16 is a plurality of parallelogram targets illustrating the preferred approach to implicit target identification for this class of target:

Sheet 1 Part A illustrates identification of the primary triangle and location of inscribed extreme circles of the primary triangle. Part B illustrates axis translation and identification of the apex MaxETL for the transformed axis.

Sheet 2 Part A is the case of an acquiring entity located within the MaxETL of the apex in the upper-right quadrant and the ETL pertaining to that acquiring entity location. Part B illustrates identification of the implicit target for the given scenario.

Sheet 3 Part A is the case of an acquiring entity outside the influence of all apex MaxETL and located such that a normal approach to the line connecting the centers of the two inscribed extreme circles is possible. Part B illustrates the result of acquiring entity reflection, physical target reflection, and implicit target identification for the transformed system.

Sheet 4 Part A is the case of an acquiring entity in the upper left quadrant, outside the influence of all apex MaxETL and located such that a normal approach to the line connecting the centers of the two inscribed extreme circles cannot be performed. Part B illustrates the result of acquiring entity reflection, physical target reflection, and implicit target identification for the transformed system.

Figure 17A:
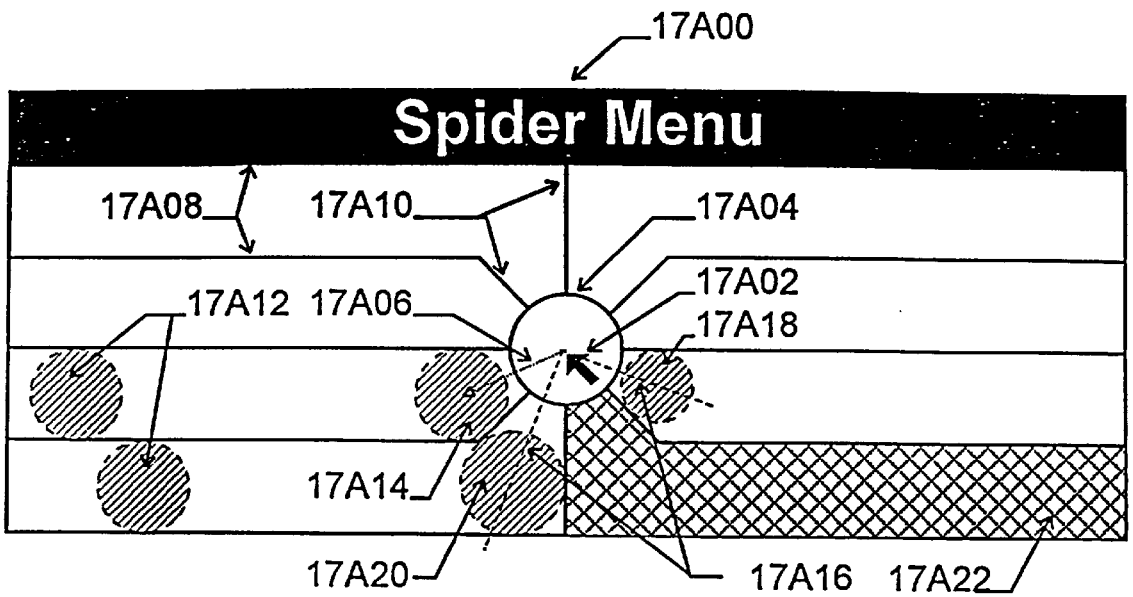
Figure 17B:
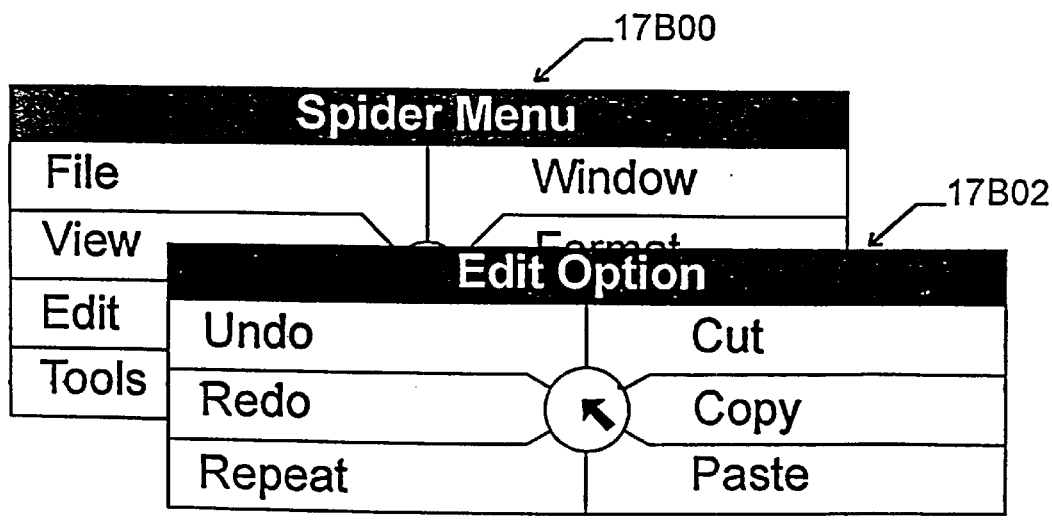

FIG. 17 is two spider menus illustrating application of implicit target analysis to a non-typical menu design. Part A illustrates a seven option display. Part B illustrates display when sub-options are displayed.

DETAILED DESCRIPTION OF THE INVENTION

Formalisms well understood by those familiar with the mathematical arts are employed to justify the procedures herein contained. These formalisms are presented to validate procedures of the preferred embodiment which, given the initial location of the target acquiring entity, identify the unique subset of points within a physical target displayed by a computer-human interface that forms the basis of an objective, quantitative measure of the physical effort expended during target acquisition.

For the purpose of this invention a procedure is perceived by those familiar with the computing arts as a self-consistent sequence of steps isomorphic to the steps implicit in the mathematical formalisms that underpin the goal of identifying the set of points within physical targets which best reflect user hit footprints during acquisition of a target displayed by a human-computer interface. Accomplishing individual steps of the procedures presumes manipulation of magnetic signals within the computer which are capable of storage, location transfer, and logical manipulation. To communicate these processes it is usually, though not necessarily required that the unique internal arrangements of signals which reflect the isomorphism of the interface target manipulations be expressed in terms which reflect human perceptions of target analysis. It is appreciated that whereas this terminology permits those experienced in the interface art to communicate between themselves, as implemented by the invention these terms are only labels convenient to humans to represent unique physical quantities actually existing within the magnetic mediums of the computer.

Further, terms implied and employed by the procedures relate to mathematical manipulations commonly performed by humans of requisite skill. Realization of such capability by a human is not implied, nor generally desirable, during the actualization of the invention which is expected to be performed by computer operations directed by procedures implicit to the preferred implementation presented below. The said procedures are applied to a symbolic representation of expected or actual human activity on computational machinery which will generally, but not necessarily, be a general purpose computer. To those experienced in the programming arts, the manner of accomplishing any particular manipulation will not ordinarily be unique. Thus, it is contemplated that many changes and modifications may be made to the detailed description of the invention by one of ordinary skill in the art without departing from the spirit and scope of the invention.

In the following description, numerous details are presented that employ geometric, matrix algebra, and other formalisms of the mathematical and computational arts which can be more readily comprehended through employment of definitions and nomenclature pertinent to the present invention. It is to be recognized that certain mathematical formulations and computational procedures not explicitly detailed are present by implication to those skilled in the requisite arts. Additionally, it is apparent to those skilled in these arts that the present invention may be described utilizing different notation without these specific details.

It is to be appreciated that in mathematical development reference to attributes of an object rather than to the object itself is commonly required. Rather than applying unique integer identifiers to reference individual attributes of a entity depicted by a figure, a single integer is assigned to identify said entity and as required to differentiate separate attributes of the entity itself, additional symbols readily understood by those knowledgeable in the mathematical arts will be affixed to the entity identifier. An instance of this approach is to reference a line by an integer, XXX, and reference the length of said line by $\|\overline{XXX}\|$. An additional relevant instance pertains to a point displayed on the CRT screen. Said point may be identified by AAA, the Cartesian location of said point identified by ($AAA_X$, $AAA_Y$), and directional X and Y displacement by $AAA_{\dot X}$ and $AAA_{\dot Y}$ respectively. Other instances of entity attribution rather than entity identification per se utilizes mathematical notation in conjunction with the entity identifier in manners well understood by those of normal skill in the mathematical arts.

FORMAL FOUNDATION OF THE INVENTION

Fitts opined that users envisage a specific point within the target to be the lowest effort acquisition point, but muscle tremor, inattention, fatigue, etc. result in physical target acquisition occurring at other than this optimal point. Applying Fitts' observation, this invention posits that the footprint of hits obtained from repeated trials in a constant environment represents the users balance between the additional physical effort expended when performing a sub-optimum traverse and the value of time and effort required to achieve a more optimum traverse. This footprint of hits is termed the "Implicit Target." The foundation of the invention additionally posits that users envisage the center of the implicit target to be the center of the largest circular footprint inscribed within the target commensurate with minimizing the Index of Difficulty. This contention of individual behavior is justified by the whole of economic science which is predicated on the presumption that individuals conduct themselves to either maximize gain from a given effort or attain a given goal at least effort. This concept has been explicitly applied to how individuals optimize physiologic resources. (Navon and Gopher, On the Economy of the Human-Processing System, *Psychological Review*, 1979, pp. 214–255). Finally, the foundation of the invention posits that if the implicit target can be identified, its distance, $D_t$, and width, $W_t$, can be utilized by the Index of Difficulty to provide a valid measure of the effort expended to acquire said target. Research involved in the present invention concludes that for typical human-omputer interface environments, the assumption that users seek to minimize the physical effort incurred while acquiring the physical target does permit predicting the diameter and location of the implicit target. Data collected for the present invention show that within limits identified by prior studies, user behavior during acquisition of targets with non-unitary aspect ratios can be described by Fitts' Law to an accuracy sufficient to aid interface design.

Analysis of Arbitrary Triangular Targets

Determining the extent of angle δ of arbitrary apex "a" of arbitrary triangle Δabc proceeds by determining the length of the triangle's sides via the equation:

$$\|\overline{ij}\| = \sqrt{(x_i - x_j)^2 + (y_i - y_j)^2} \quad i \neq j = a, b, c \tag{Eq. 2}$$

with application of the Law of Cosines to determine δ.

$$\delta = \cos^{-1}\left[\frac{\|\overline{ab}\|^2 + \|\overline{ac}\|^2 - \|\overline{bc}\|^2}{2 \times \|\overline{ab}\| \times \|\overline{ac}\|}\right] \tag{Eq. 3}$$

Figure 1A:
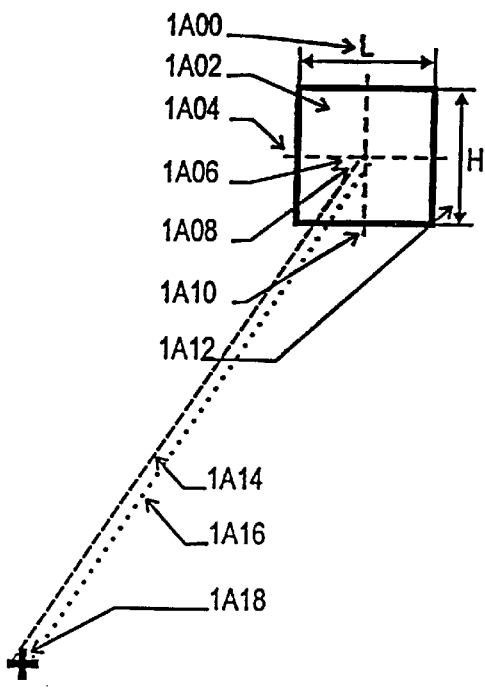
FIGS. 1A–1D contain four CRT targets having arbitrary height and width dimensions and an arbitrarily positioned acquiring entity. Paths depicted by dotted lines reflect observed typical traverses users take to each target given the initial locations depicted for the acquiring entity
Figure 1B:
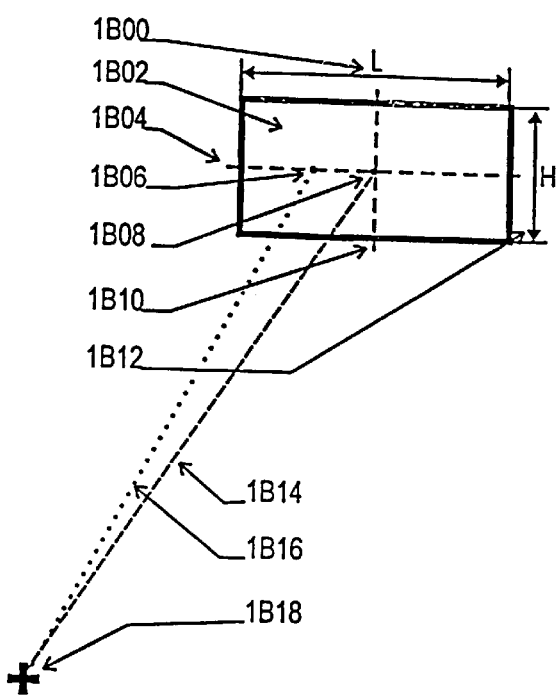
Figure 1C:
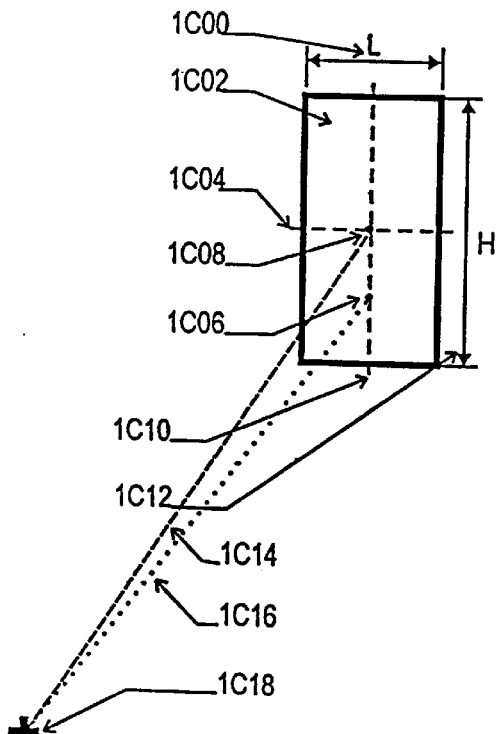
Figure 1D:
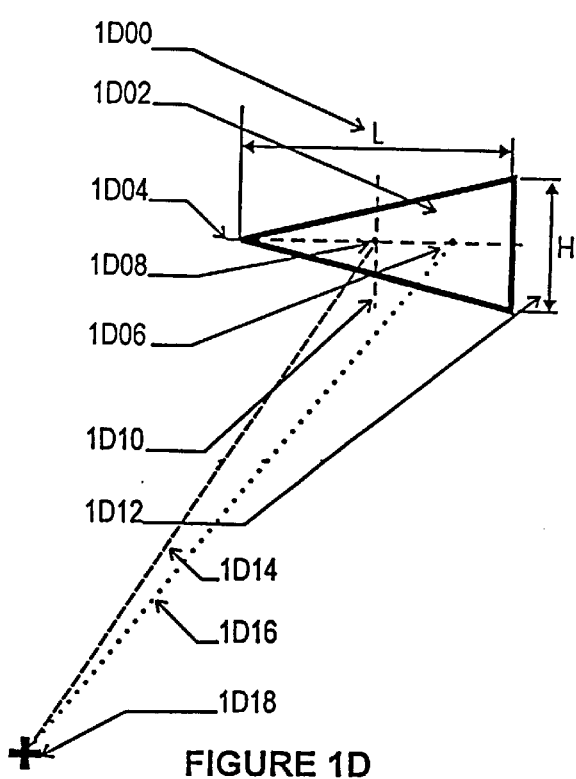
Figure 2:
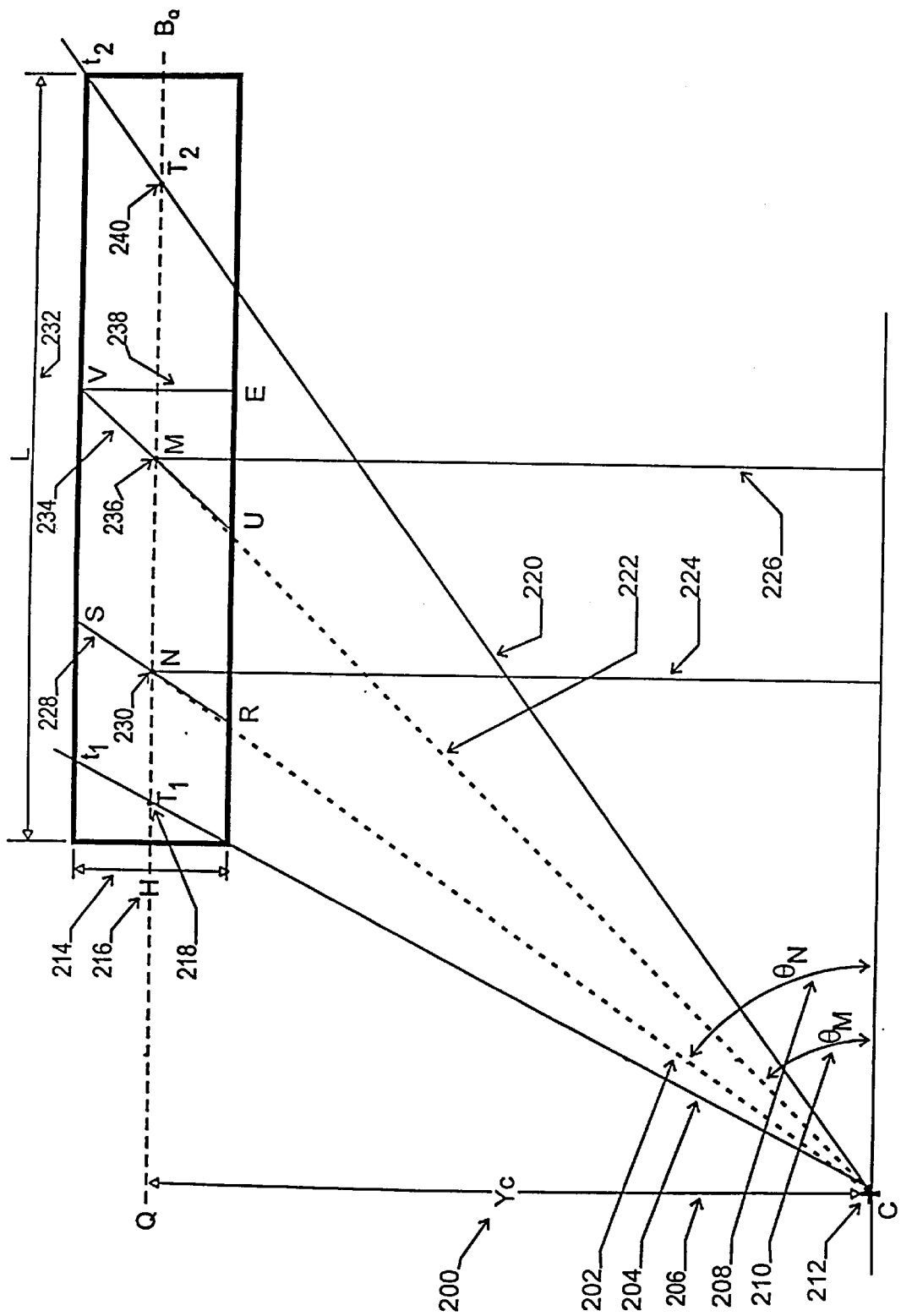
FIG. 2 is a rectangular target of non-unitary aspect ratio and an initial acquiring entity position employed to critique the angle-of-approach definition of target width and distance.
Figure 3:
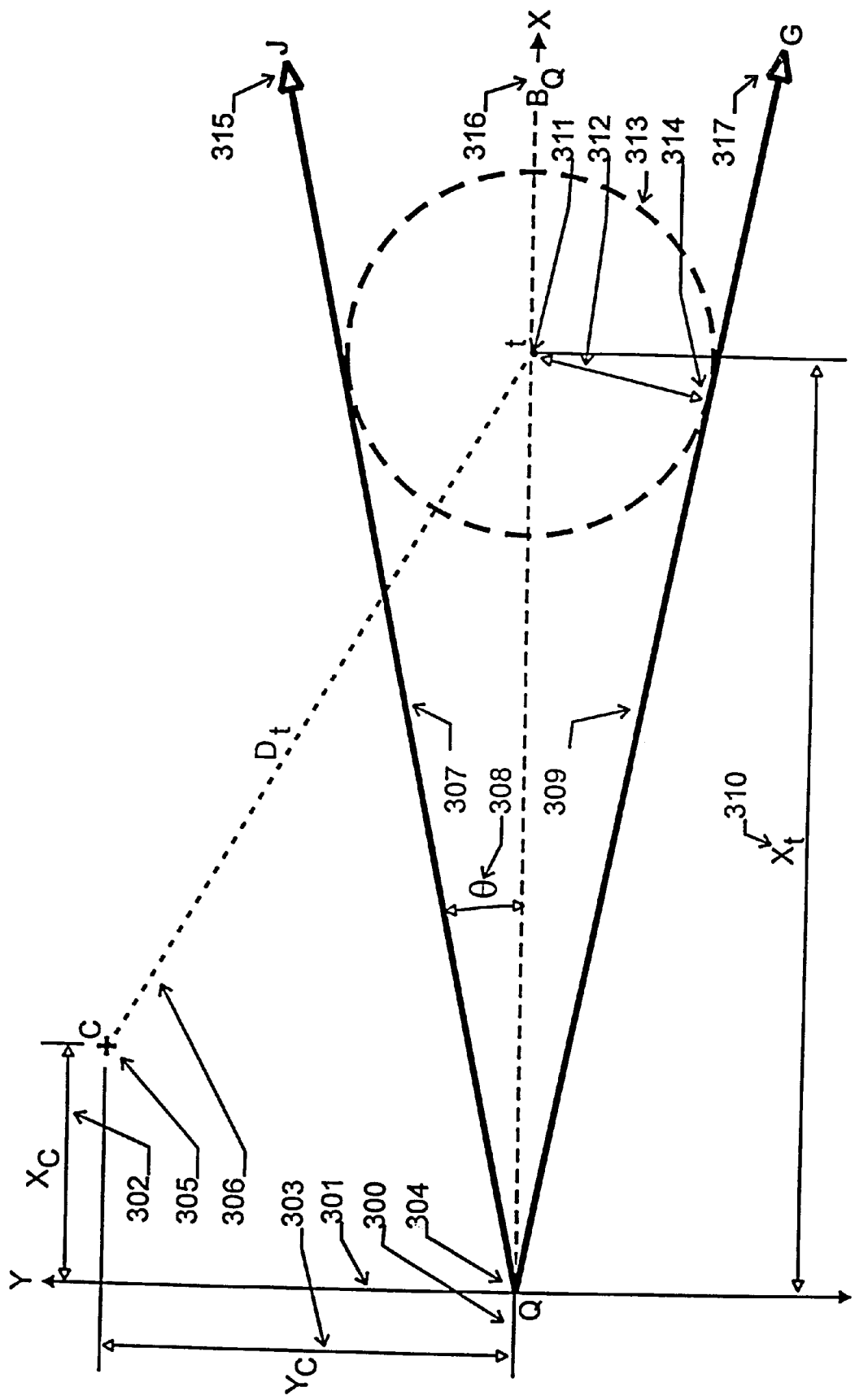
FIG. 3 is a triangular target of arbitrary height and arbitrary initial acquiring entity position employed to illustrate development of the implicit target method.

FIG. 3 illustrates the environment of a triangular target of arbitrarily large height in the direction of the X-axis. The physical target has an apex at the axis origin 304 formed by the intersection of sides 307 and 309 and has 316 as the bisector of said apex, said bisector being coincident with the X-axis. Bisector 316 and target side 307 form angle 308. The acquiring entity, 305, at location (302$_x$,303$_y$), is arbitrarily positioned relative to the 304 origin. The distance, 306, to the physical target is the length of the traverse to the unknown but optimal acquisition point 311 located at coordinates ($X_t$,0). Circle 313 denotes the largest circle centered at 311 on line 316 that can be inscribed between the sides forming apex 304. The radius, $R_t$, of this circle and its distance, $D_t$, are determined by:

$$R_t = X_t \sin\theta \tag{Eq. 4}$$

$$D_t = \sqrt{Y_C^2 + (X_t - X_C)^2} \tag{Eq. 5}$$

where:
$X_t$=310$_X$
θ=308
$X_c$=302$_X$
$Y_c$=303$_Y$

To determine the coordinates of the target acquisition point which minimizes the Index of Difficulty, express the Index of Difficulty, $I_t$, as:

$$I_t = F(G(X_t)) = \log_2\left(\frac{D_t}{2 \times R_t} + k\right) = \log_2\left(\frac{\sqrt{Y_C^2 + (X_t - X_C)^2}}{2 X_t \sin\theta} + k\right)$$

$I_t$ is a strictly increasing function since $$\frac{d(I_t)}{dX_t} > 0$$

for all t. Because the value of $X_t$ which minimizes a strictly increasing function of a function, $F(G(X_t))$, is the value of $X_t$ which minimizes $G(X_t)$, the value of $X_t$ which minimizes $I_t$ is the same value which minimizes $$G(X_t) = \left(\frac{\sqrt{Y_C^2 + (X_t - X_C)^2}}{2 X_t \sin\theta} + k\right).$$

Therefore:

$$\frac{dG(X_t)}{dX_t} = \frac{d\left(\frac{\sqrt{Y_C^2 + (X_t - X_C)^2}}{2 X_t \sin\theta} + k\right)}{dX_t} = \frac{d\left(\frac{\sqrt{Y_C^2 + (X_t - X_C)^2}}{2 X_t \sin\theta}\right)}{dX_t} + \frac{dk}{dX_t}$$

-continued $$= \frac{2X_t\sin\theta \times \frac{d\left(\sqrt{y_C^2 + (X_t - X_C)^2}\right)}{dX_t} - \sqrt{y_C^2 + (X_t - X_C)^2} \times \frac{d(2H_t\sin\theta)}{dX_t}}{(2H_t\sin\theta)^2} + 0$$

$$= \frac{2X_t\sin\theta \times \frac{0.5\left(0 + 2(X_t - X_C)\left(\frac{1}{X_t}\right)\right)}{\sqrt{y_C^2 + (Y_t - Y_C)^2}} - \sqrt{Y_C^2 + (X_t - X_C)^2}\left(\frac{2\sin\theta}{X_t}\right)}{(2X_t\sin\theta)^2} = 0$$

Since $X_t\sin\theta \neq 0$ for any $X_t > 0$ and all possible $\theta$ of convex polygonal targets, the preceding can be multiplied by $(2X_t \sin\theta)^2$ and terms rearranged to obtain:

$$\frac{dG(X_t)}{dX_t} = \frac{2\sin\theta(X_t - X_C)}{\sqrt{y_C^2 + (X_t - X_C)^2}} - \frac{2\sin\theta\sqrt{Y_C^2 + (X_t - X_C)^2}}{X_t} = 0$$

Canceling terms gives:

$$\frac{X_t - X_C}{\sqrt{Y_C^2 + (X_t - X_C)^2}} - \frac{\sqrt{Y_C^2 + (X_t - X_C)^2}}{X_t} = 0$$

Because $X_t - X_c \neq 0$ for $X_t \neq 0$ it follows that $\sqrt{Y_c^2 + (X_t - X_c)^2} > 0$, which gives:

$$(X_t - X_C) - \frac{Y_C^2 + (X_t - X_C)^2}{X_t} = 0$$

$$X_t^2 - X_tX_C - (Y_C^2 + X_t^2 - 2X_tX_C + X_C^2) = 0$$

$$X_tX_C = Y_C^2 + X_C^2$$

Given the initial acquiring entity location, the coordinates of the center of the implicit circular target of $r = X_t \sin\theta$ which permit lowest physical effort target acquisition are:

$$\text{Coordinates of } t = (X_t, 0) = \left(\frac{Y_C^2 + X_C^2}{X_C}, 0\right). \quad \text{(Eq. 6)}$$

To consider which acquiring entity locations have a given inscribed circle as the implicit target of lowest physical effort, complete the square for $X_tX_c = Y_c^2 + X_c^2$:

$$Y_C^2 + X_C^2 - X_tX_C = 0$$

$$Y_C^2 + X_C^2 - X_tX_C + \frac{X_t^2}{4} = \frac{X_t^2}{4}$$

$$Y_C^2 + \left(X_C - \frac{X_t}{2}\right)^2 = \frac{X_t^2}{4}$$

Rewriting gives:

$$(Y_C + 0)^2 + \left(X_C - \frac{X_t}{2}\right)^2 = \left(\frac{X_t}{2}\right)^2$$

This represents a circle having its center at coordinates $(X_t/2, 0)$ with radius of $(X_t/2)$.

Figure 4:
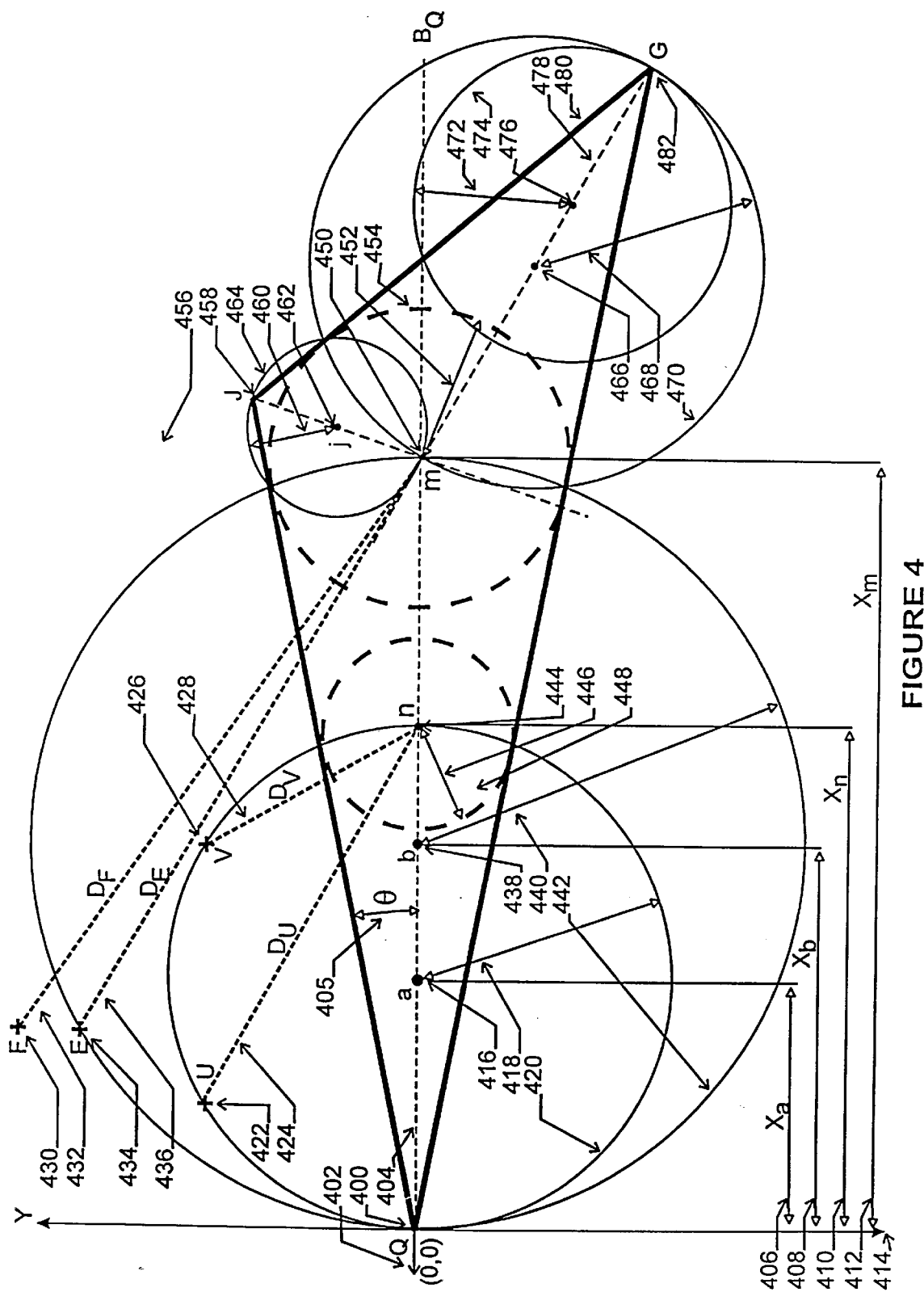
FIG. 4 is a scalar triangular target with illustrative initial acquiring entity locations and exemplar Equi-Target Loci to illustrate application of implicit target analysis to triangular targets.

FIG. 4 aids interpretation of these results. For an arbitrary circular footprint 448 within an arbitrary, scalene, triangular physical target 480 having center 444 on the bisector, 404, of 400 and having tangents with at least two sides of the triangle, there exists a locus of points, 420, comprising a circular arc for which this inscribed circle will be the implicit target of least acquisition effort. This arc is termed the "Equi-Target Locus", (ETL). From preceding results, the radius, $\|\overline{418}\|$, of the ETL for the implicit target centered at 444 is:

$$R_{ETL_{Qn}} = \frac{X_n}{2} = \|\overline{418}\| \quad \text{(Eq. 7)}$$

with center at:

$$a_{ETL_{Qn}} = \left(\frac{Xn}{2}, 0\right) = (416_X, 0_Y) \quad \text{(Eq. 8)}$$

There exists a unique $ETL_n$ for each $0 < X_n \leq X_m$. Circular arcs 420 and 442 exemplify ETL for two of the infinite number of possible implicit targets centered on line 404.

To appraise user behavior from different locations on a single ETL consider two arbitrary initial acquiring entity locations 422 and 426 on ETL 420. Since these locations are on the same ETL, the user will approach the same implicit target from either 422 or 426 to arrive near the optimal acquisition point 444 even though unequal levels of physical effort are expended to acquire the physical target. The validity of this statement is apparent by noting that traverses from 422 and 426 entail traverses of $\|\overline{424}\|$ and $\|\overline{428}\|$ respectively. Target width $2\times\|\overline{446}\|$; i.e., $2\times R_n$, is common to both traverses. Since $\|\overline{424}\| > \|\overline{428}\|$ it follows that:

$$I_{422} = \log_2\left(\frac{D_{424}}{W_{446}} + k\right) > \log_2\left(\frac{D_{426}}{W_{446}} + k\right) = I_{426}.$$

Because the above logic applies to each apex of physical target 480 there exists a "Maximum Equi-Target Locus" (MaxETL): i.e., $442_{MaxETL}$, $470_{MaxETL}$, and $464_{MaxETL}$ for apexes 400, 482, and 458 respectively. When combined $442_{MaxETL}$, $470_{MaxETL}$, and $464_{MaxETL}$ form the inner boundary of the 456 region. For initial acquiring entity locations within the 456 region the effort to acquire the triangular target is minimized when 450, the center of the largest inscribed circle 454, is selected as the optimal acquisition point. Thus, acquiring entity locations 430 and 434 both have 450 as the center of a common implicit target; 454, even though the physical effort from location 430 is greater than from locati on 434.

Analysis of Arbitrary Convex Quadrangular Targets

FIG. 5 conveys that any convex, quadrilateral target can be defined by the intersection of two appropriately shaped and positioned triangles which the present invention terms "Generating Triangles." The apex of a generating triangle which is not an apex of the physical target will be termed an "External Apex". When an external apex is generated by two converging sides of a generating triangle it will be termed a "Finite External Apex". An "Infinite External Apex" is to be considered a theoretical intersection at infinite distance of the parallel sides of a generating triangle of infinite height.

Figure 5A:
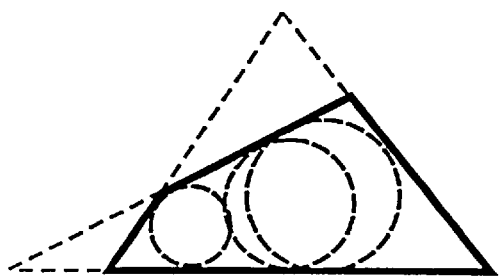
FIGS. 5A–5F contain six quadrilateral targets illustrating that the intersection of two triangles of appropriate shape and orientation suffice to generate a convex, arbitrarily shaped quadrilateral target.
Figure 5B:
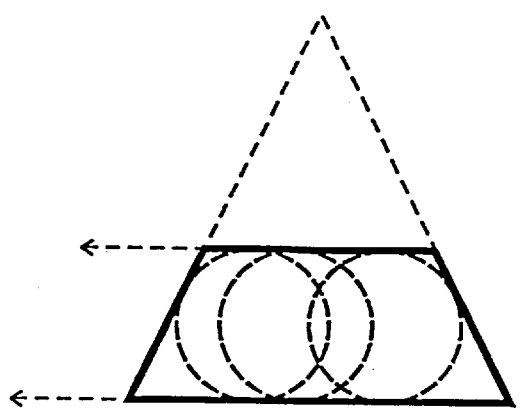
Figure 5C:
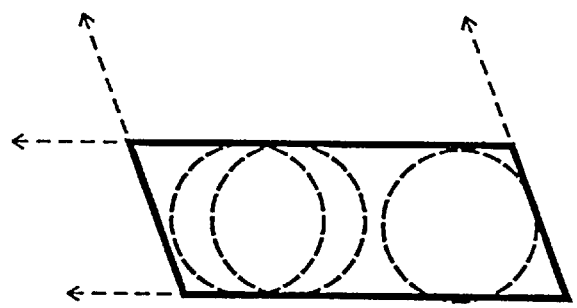
Figure 5D:
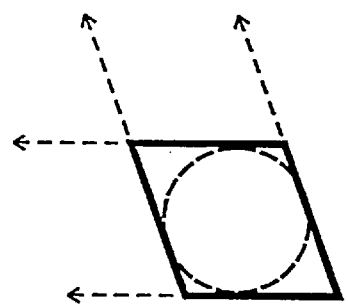
Figure 5E:
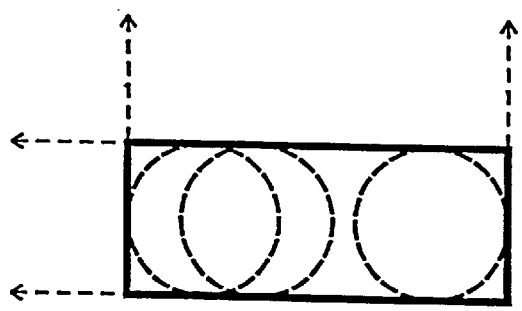
Figure 5F:
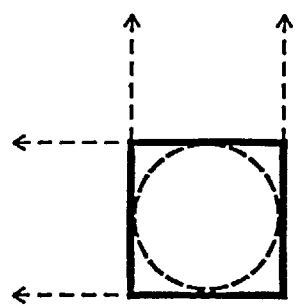

FIG. 5A depicts that two generating scalene triangles of finite height (generating triangles being indicated by light dashed lines) produce the general convex quadrilateral (physical targets being indicated by heavy solid lines). FIG. 5B depicts that when one generating triangle is of finite height and one is of infinite height the trapezoid subclass of quadrilateral is produced. When the triangle of finite height is isosceles the regular trapezoid results. FIG. 5C and FIG. 5D depict that two generating triangles of infinite height with non-orthogonal sides produce the parallelogram. FIG. 5C depicts that generating triangles of unequal bases, produce the general parallelogram, while FIG. 5D depicts that generating triangles of equal base lengths produce the rhombus. FIG. 5E depicts that two triangles of infinite height with orthogonal sides produce the rectangle sub-class of parallelogram. FIG. 5F depicts that generating triangles with orthogonal pairs of parallel sides and equal bases produce the square.

Figure 6:
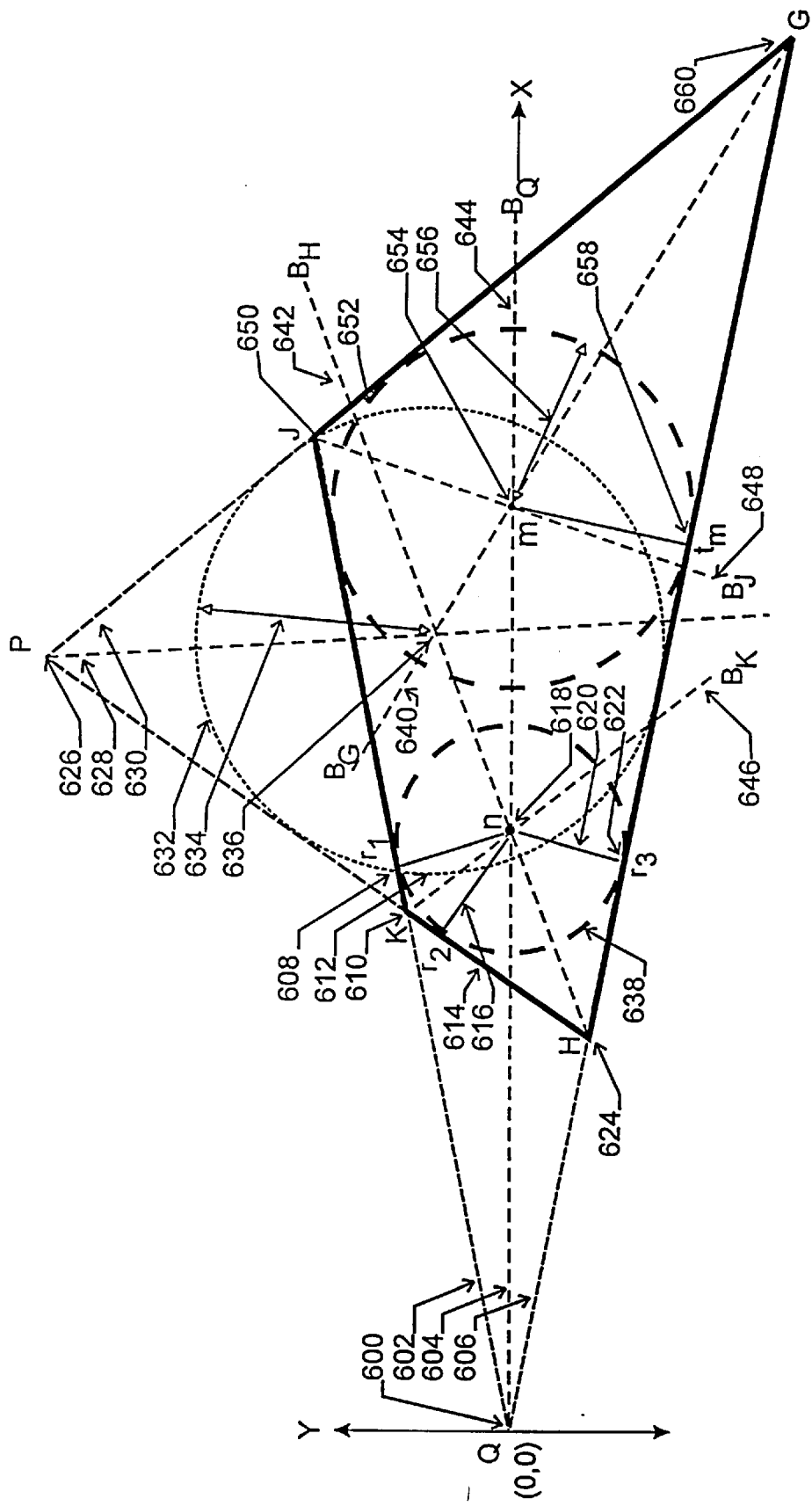
FIG. 6 is an arbitrary convex quadrilateral target generated by two exemplar triangles that illustrates identification of the primary generating triangle.

FIG. 6 depicts a convex, quadrangular target with apexes at 624, 660, 650, and 610. For purposes of developing the logic of the present invention, the origin of the coordinate system is made to coincide with one external apex and the X-axis aligned with the bisector of this apex. In FIG. 6 this is apex 600 with its bisector being 644. Define the "Primary Triangle" to be the generating triangle having its largest inscribed circle also inscribed in the quadrangular target. Specifically, the primary triangle is that triangle of the two generating triangles having the largest inscribed circle of least radius. The non-primary generating triangle will be termed the "Secondary Triangle." The physical target contains two apexes which are also apexes of the primary triangle. These will be termed "Base-Apexes". The target also contains two apexes which are not apexes of the primary triangle. These are termed "Nonbase-Apexes".

Analysis of quadrilateral targets proceeds by recalling that the slope of a line $\overline{ab}$ defined by any two points, "a" and "b", on a Cartesian coordinate system is:

$$S_{\overline{ab}} = \frac{y_a - y_b}{x_a - x_b} \quad \text{(Eq. 9)}$$

with its length defined by Eq. 2.

The equation of the family of parallel lines defined by two points, "a" and "b", is defined:

$$y = (\tan\theta)x = \left(\frac{y_a - y_b}{x_a - x_b}\right)x$$

with the specific equation of the line, $\overline{ab}$, expressed as:

$$y = y_a = \left(\frac{y_a - y_b}{x_a - x_b}\right)(x - x_a) = y_a + S_{\overline{ab}}(x - x_a) \quad \text{(Eq. 10)}$$

Also required for the analysis of quadrilateral targets is determination of the intersection of two non-parallel lines. To this end, consider an additional line defined by points "c" and "d" having slope $S_{\overline{cd}} \neq S_{\overline{ab}}$. The intersection of lines $\overline{ab}$ and $\overline{cd}$ is determined by:

$$y_a + S_{\overline{ab}}(x - x_a) = y_c + S_{\overline{cd}}(x - x_c)$$

which after rearranging terms gives:

$$x = -k(y_a - S_{\overline{ab}}x_a) + k(y_c - S_{\overline{cd}}x_c) \quad \text{(Eq. 11)}$$

where:

$$k = \frac{1}{S_{\overline{ab}} - S_{\overline{cd}}}$$

Solving for y:

$$y = y_a + S_{\overline{ab}}[[-k(y_a - S_{\overline{ab}}x_a) + k(y_c - S_{\overline{cd}}x_c)] - x_a] = (1 - kS_{\overline{ab}})(y_a - S_{\overline{ab}}x_a) + kS_{\overline{ab}}(y_c - S_{\overline{cd}}x_c)$$

Since:

$$1 - \left(\frac{S_{\overline{ab}}}{S_{\overline{ab}} - S_{\overline{cd}}}\right) = -kS_{\overline{ab}}$$

The result is:

$$y = -kS_{\overline{cd}}(y_a - S_{\overline{ab}}x_a) + kS_{\overline{ab}}(y_c - S_{\overline{cd}}x_c) \quad \text{(Eq. 12)}$$

From geometry it is known that the center of the largest circle tangent to three lines intersecting at two points, "g" and "j", is the intersection of the lines bisecting angles formed at points "g" and "j". To find this intersection assume an arbitrary line $\overline{hg}$ is defined by $(x_g, y_g)$ and $(x_h, y_h)$. Define "α" as the angle between the x-axis and line $\overline{hg}$:

$$\alpha = \tan^{-1}\left(\frac{y_h - y_g}{x_h - x_g}\right)$$

Similarly, define β as the angle between the x-axis and a second arbitrary line, $\overline{jg}$, which intersects line $\overline{hg}$:

$$\beta = \tan^{-1}\left(\frac{y_j - y_g}{x_j - x_g}\right)$$

Define δ to be the angle relative to the x-axis of the line bisecting angle ∠hgj:

$$\delta = \left(\frac{\alpha + \beta}{2}\right)$$

Utilizing Eq. 10, the equation of the bisector of the angle formed by the lines $\overline{hg}$ and $\overline{gj}$; namely, $\overline{gB_g}$ is:

$$y = y_g + S_{\overline{gB_g}}(x - x_g)$$

where:

$$S_{\overline{gB_g}} = \tan\left(\frac{\tan^{-1}\left(\frac{y_h - y_g}{x_h - x_g}\right) + \tan^{-1}\left(\frac{y_j - y_g}{x_j - x_g}\right)}{2}\right) \quad \text{(Eq. 13)}$$

The equation for a second angle bisector may be represented as: $y = y_j + S_{\overline{jBj}}(x - x_j)$. From Eq. 11 and Eq. 12, we can express the intersection of bisectors of two adjacent apexes of a polygonal target as:

$$x = \left(\frac{1}{S_{\overline{gB_g}} - S_{\overline{jB_j}}}\right)\left[\left(-y_g + S_{\overline{gB_g}} x_g\right) + \left(y_j - S_{\overline{jB_j}} x_j\right)\right] \quad \text{(Eq. 14)}$$

$$y = \left(\frac{1}{S_{\overline{gB_g}} - S_{\overline{jB_j}}}\right)\left[S_{\overline{jB_j}}\left(-y_g + S_{\overline{gB_g}} x_g\right) + S_{\overline{gB_g}}\left(y_j - S_{\overline{jB_j}} x_j\right)\right] \quad \text{(Eq. 15)}$$

Define the "Largest Inscribed Extreme Circle" to be the largest circle that can be inscribed within the physical target that has tangency with three sides of the physical target. To identify the largest inscribed extreme circle of an arbitrary quadrilateral target apply Eq. 13, Eq. 14, and Eq. 15 to determine the intersection of the bisectors of the two base-apexes of the primary triangle. The radius of the largest inscribed extreme circle is the length of the normal line from the intersection of the above determined bisector intersection to a nearest side of the quadrilateral, a distance determined by application of Eq. 2, Eq. 3, and Eq. 4.

To illustrate these concepts, in FIG. 6 the center of the largest inscribed extreme circle is depicted as location 654; i.e., the intersection of bisectors 640 and 648 of base apexes 660 and 650 respectively. The radius of this circle is the length of the normal from 654 to a nearest side of the quadrilateral; say the side 606. This is line 656. Employ Eq. 4 to determine the length of line 666; i.e., $\|656\| = X_m \sin \theta$ where $\theta$ is angle 604.

Similarly, define the "Smallest Inscribed Extreme Circle" to be the smallest circle which can be inscribed within the target having tangency with three sides of the target. To identify the smallest inscribed extreme circle of an arbitrary quadrilateral target apply Eq. 13, Eq. 14, and Eq. 15 to the intersection of the bisectors of the two non-base apexes. The radius of the smallest inscribed extreme circle is the length of the normal line from the intersection of the above determined bisector intersection to a nearest side of the quadrilateral, a distance determined by application of Eq. 2, Eq. 3, and Eq. 4. For FIG. 6, the intersection of bisector 642 of non-base apex 624 and bisector 646 of non-base apex 610 define the center, 618, of the smallest inscribed extreme circle 638. To prove this, note that in FIG. 6 $\overline{r_1 n} \perp \overline{JK}$ and $\overline{r_2 n} \perp \overline{KH}$ due to tangency conditions and that $\|\overline{r_1 n}\| = \|\overline{r_2 n}\|$ because they are radii of the same circle. Since $\angle r_1 nK = \cos^{-1}(\overline{r_1 n}/Kn) = \cos^{-1}(\overline{r_2 n}/Kn = \angle r_2 nK$, line $\overline{Kn}$ bisects $\angle JKH$. It follows that $\Delta Kr_1 n = \Delta Kr_2 n$ since triangles having three equal angles and a common side are equal. Similar logic shows that point n falls on line $\overline{HB_H}$, the bisector of $\angle KHG$. This proves that the center, n, of smallest extreme inscribed circle falls on the intersection of the bisectors of the external apex and non-base apexes $\angle JKH$ and $\angle KHG$ respectively. The length of the radius of the smallest inscribed circle $R_N$ is determined from Eq. 4; i.e., $\|\overline{nr_3}\| = X_n \sin \theta$. The intersection of the bisector, $\overline{QB_Q}$ of angle $\angle JQG$, and the bisector of either of the non-base apexes also determines the center, n, of the smallest inscribed extreme triangle. We know that $\overline{r_1 n} \perp \overline{JQ}$ and $\overline{nr_3} \perp \overline{QG}$ from tangency conditions and that $\|\overline{nr_1}\| = \|\overline{nr_3}\|$ because both are radii of the same circle. With $\overline{Qn}$ common to $\Delta Qr_1 n$ and $\Delta Qr_3 n$, we have:

$$\angle r_1 Qn = \sin^{-1}\left(\frac{\|\overline{nr_1}\|}{\|\overline{Qn}\|}\right) = \sin^{-1}\left(\frac{\|\overline{nr_3}\|}{\|\overline{Qn}\|}\right) = \angle r_3 Qn.$$

It can be noted that the radius of the smallest inscribed extreme circle can equal the radius of the largest inscribed extreme circle only when the there is a single infinite external apex as with the trapezoid or with quadrilaterals having $(X_n, 0) = (X_m, 0)$.

Once the primary triangle is identified, analysis applies solely to the primary triangle. Once the acquiring entity position is determined relative to the MaxETL's quadrilateral target analysis is identical to triangle target analysis when the initial acquiring entity location is: (1) not within any region delimited by the three MaxETLs of the primary triangle, (2) within a region delimited by one of the four MaxETL of the quadrilateral's apexes, (3) on any ETL containing the external apex having an intersection between said ETL and the line segment defined by the centers of the smallest and largest inscribed extreme circles. For initial acquiring entity positions located on ETLs containing the external apex and an intersection between said ETL and the line segment defined by the external angle's apex and the center of the smallest inscribed extreme circle, the optimum target acquisition point is the center of the smallest inscribed extreme circle.

Figure 7:
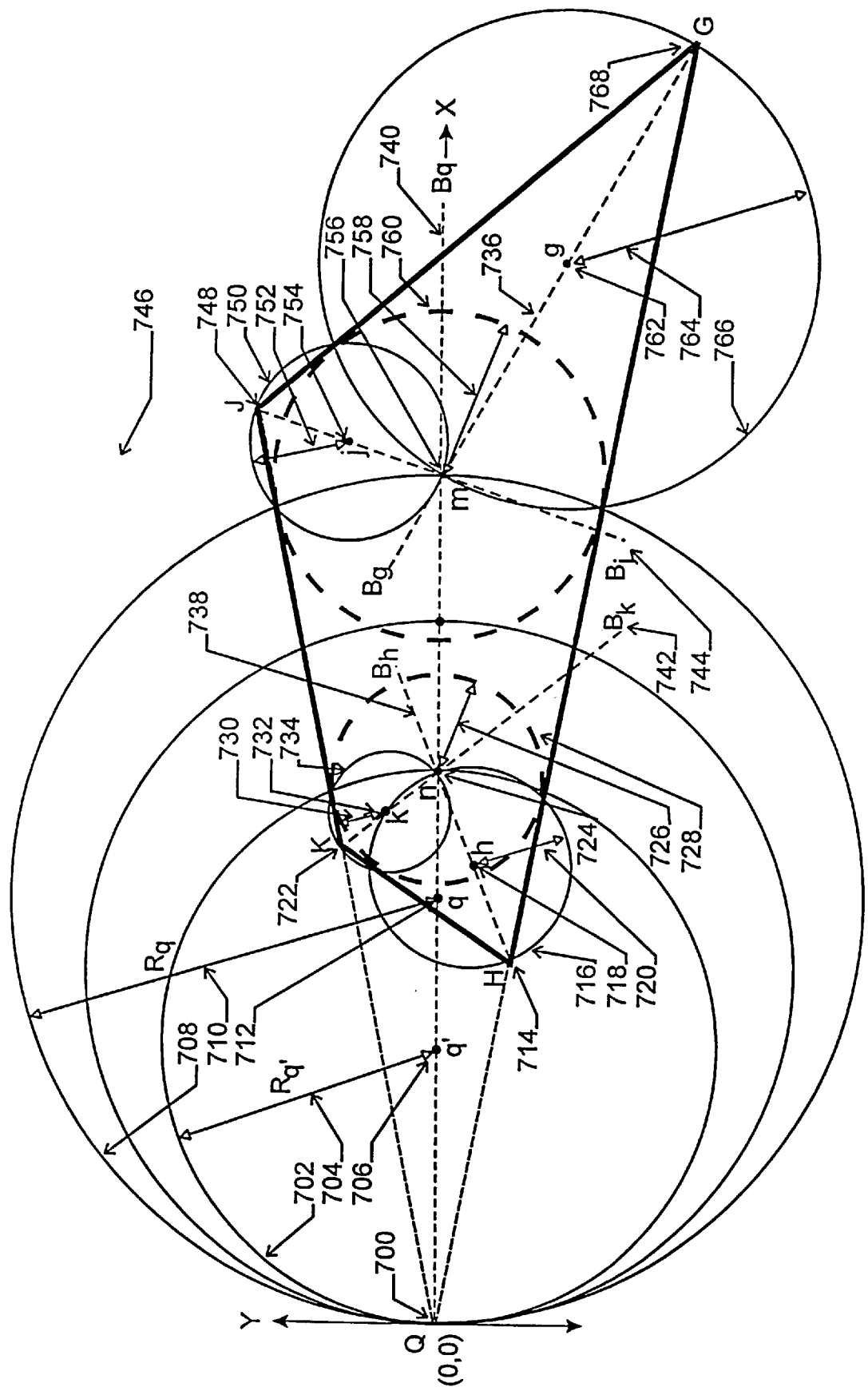
FIG. 7 is an arbitrary convex quadrilateral target, an acquiring entity location, and exemplar Equi-Target Loci to illustrate application of implicit target analysis to quadrilateral targets.

The exemplar quadrilateral of FIG. 7 illustrates application of these results. For initial acquiring entity locations more distant from the centers of the MaxETL of the primary triangle than the radii of said MaxETL, the acquiring entity is located within the 746 region. As shown during analysis of the triangular target, the optimal traverse from this region is to 756, the center of the largest inscribed circle. Initial acquiring entity locations not within the 746 region are within the influence of one of the apex ETLs. To identify the relevant apex, iterate to compare the distance from the acquiring entity to the center of each apex MaxETL to the radius of said apex MaxETL. If the MaxETL of one of these apexes contains the initial acquiring entity location, the axis is transformed to produce the environment of FIG. 3 and the analysis developed for apex ETL analysis applied. If the preceding does not identify a MaxETL containing the acquiring entity location, the acquiring entity is located within the MaxETL of the external apex. Since the optimal traverse from acquiring entity locations within the 708 MaxETL that are more distant from 706 than $\|\overline{704}\|$ will terminate within the quadrilateral, they are analyzed in the manner described for triangular analysis. Initial acquiring entity locations less distant from 724 than $\|\overline{704}\|$ have the smallest inscribed extreme circle as the implicit target.

Analysis of Rectangular Targets

FIG. 5E indicates that a rectangular target is defined by two generating triangles, each with infinite external apexes and having orthogonal sides. The primary triangle is the generating triangle having the narrowest base. With the diameter of all inscribed circles being equal, minimization of $\log_2(D_t/W_t+k)$ is attained by minimization of $Dt_t$.

When the initial acquiring entity location is within a MaxETL region the optimal traverse is determined by applying the apex ETL analysis introduced during analysis of the triangular target. For other locations it can be shown that if the line segment defined by the centers of the inscribed extreme circles can be reached via a normal traverse, the normal traverse is the optimal traverse to the target. For all remaining initial acquiring entity locations the optimal traverse is to the nearest inscribed extreme circle.

Figure 8:
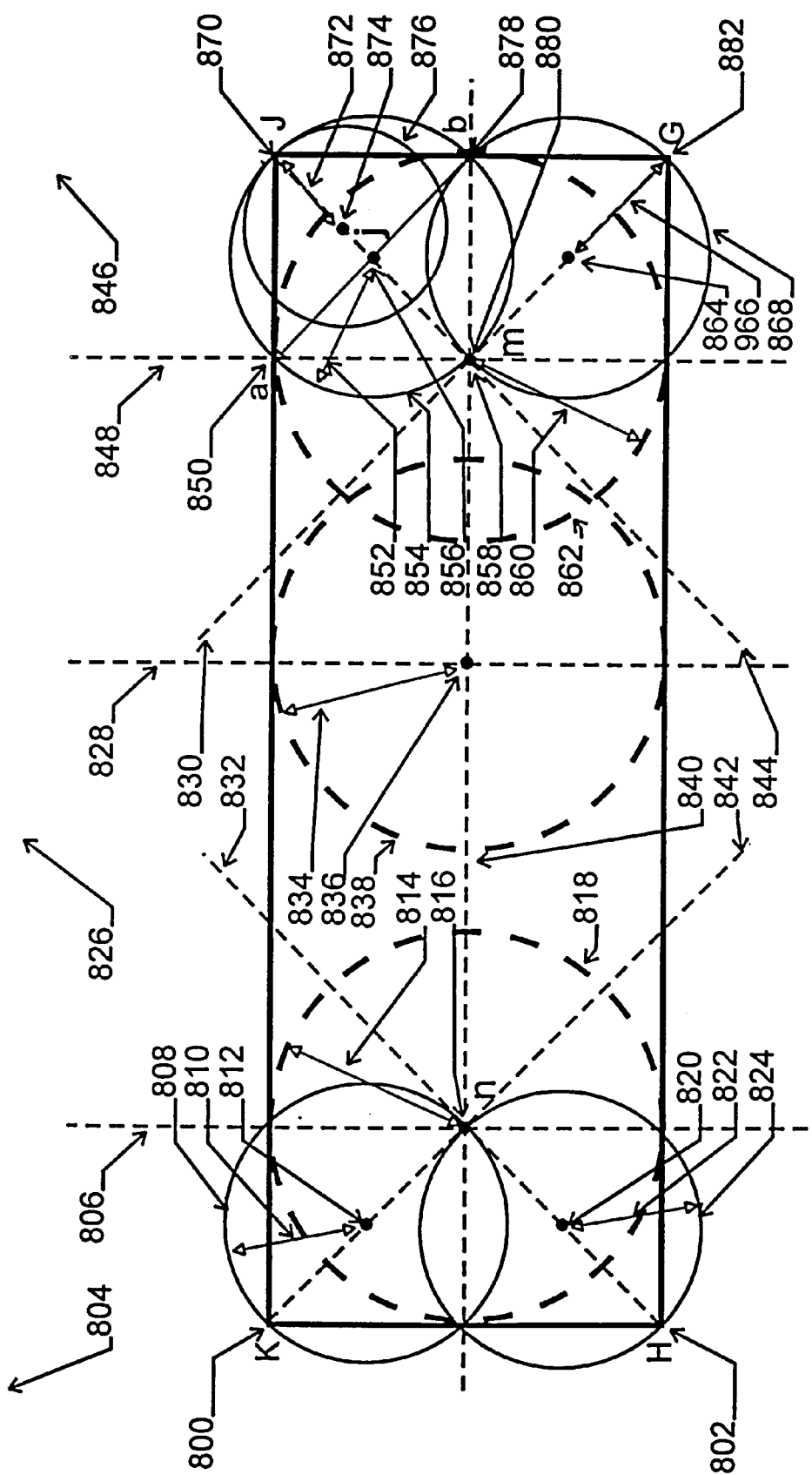
FIG. 8 is a rectangular target, an acquiring entity location, and exemplar Equi-Target Loci to illustrate application of implicit target analysis to rectangular targets.
Figure 9A:
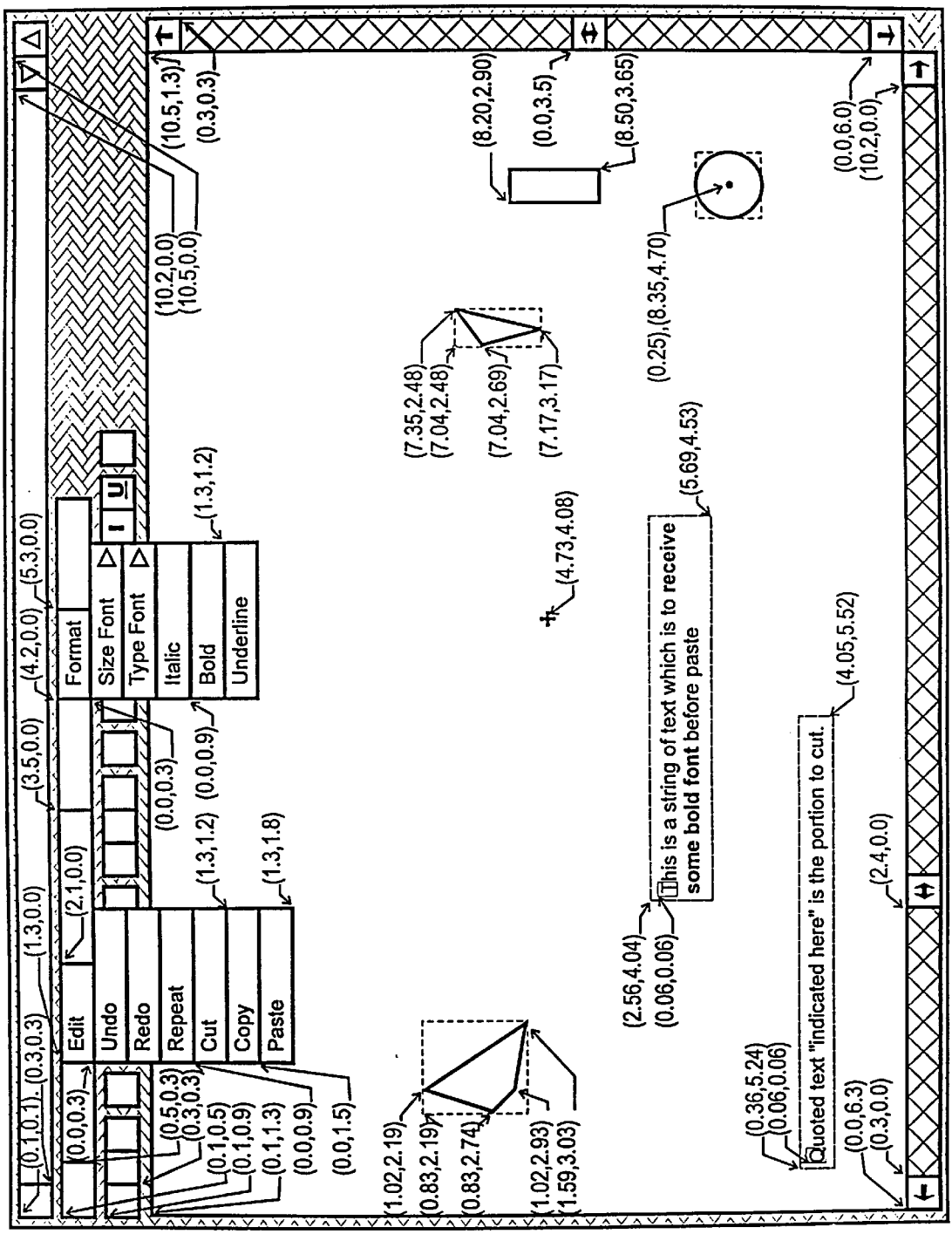
FIG. 9 contains a plurality of varied sheets employed by the example to illustrate application of the present invention.
Figure 9N:
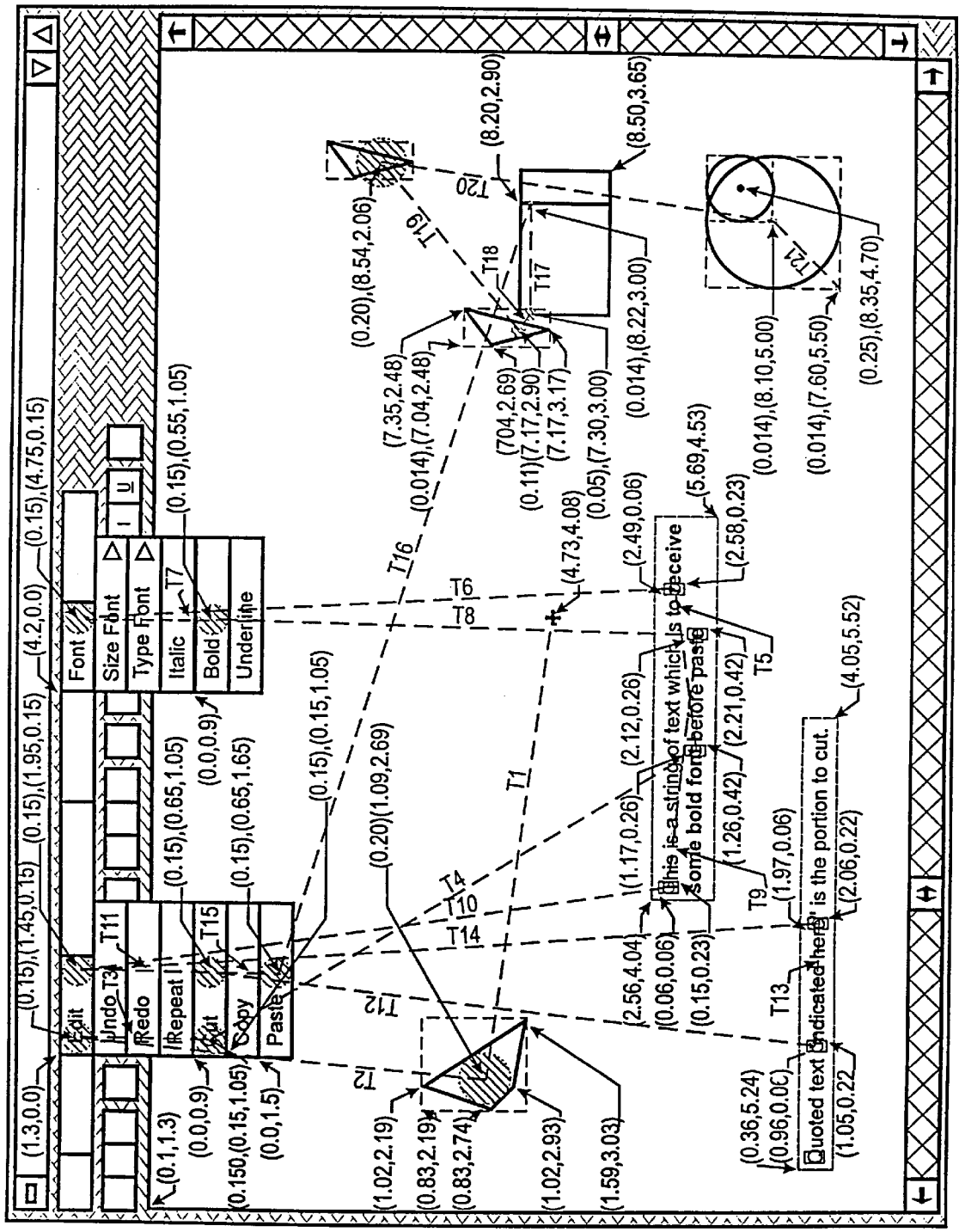
Figure 9P:
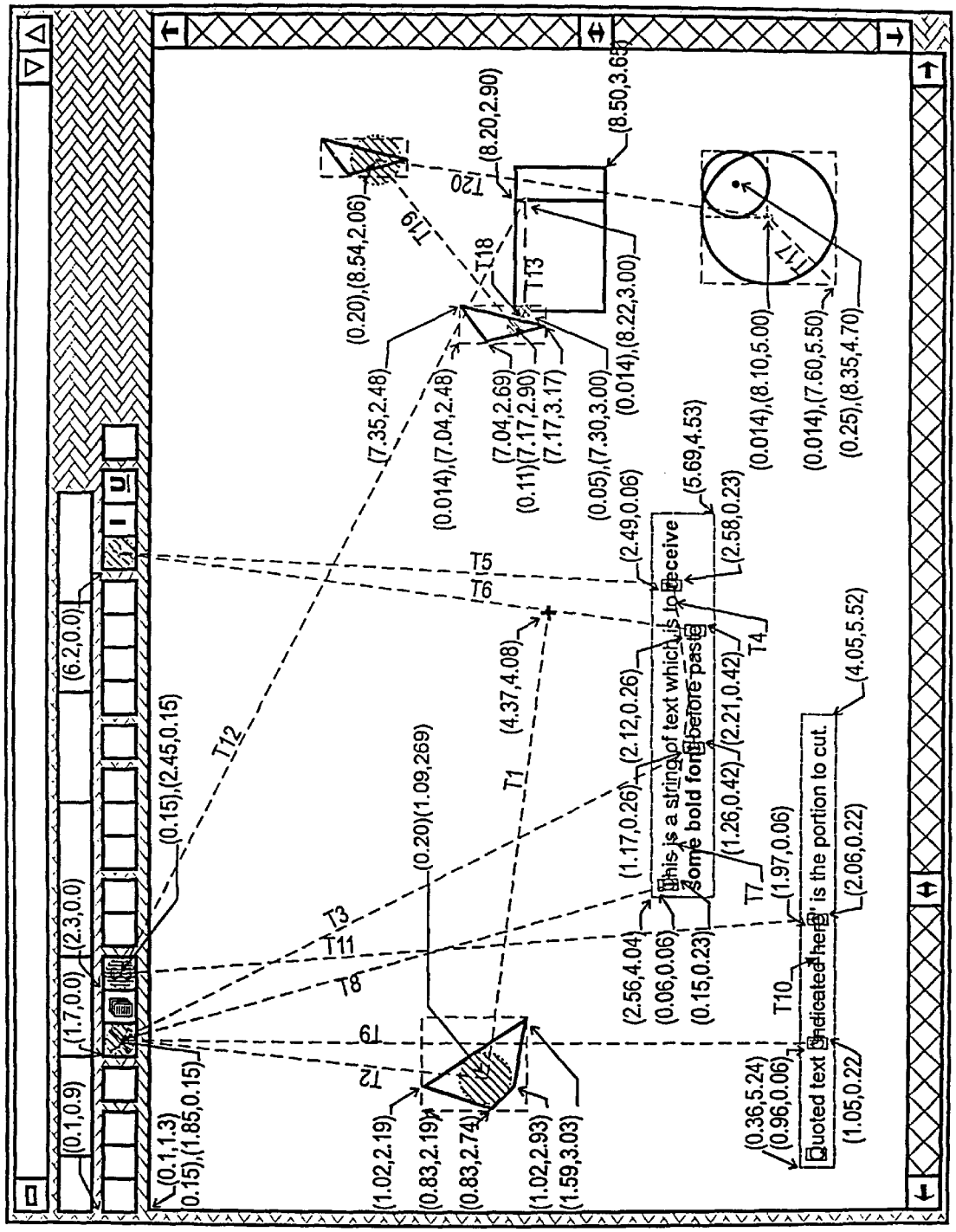
Figure 9R:
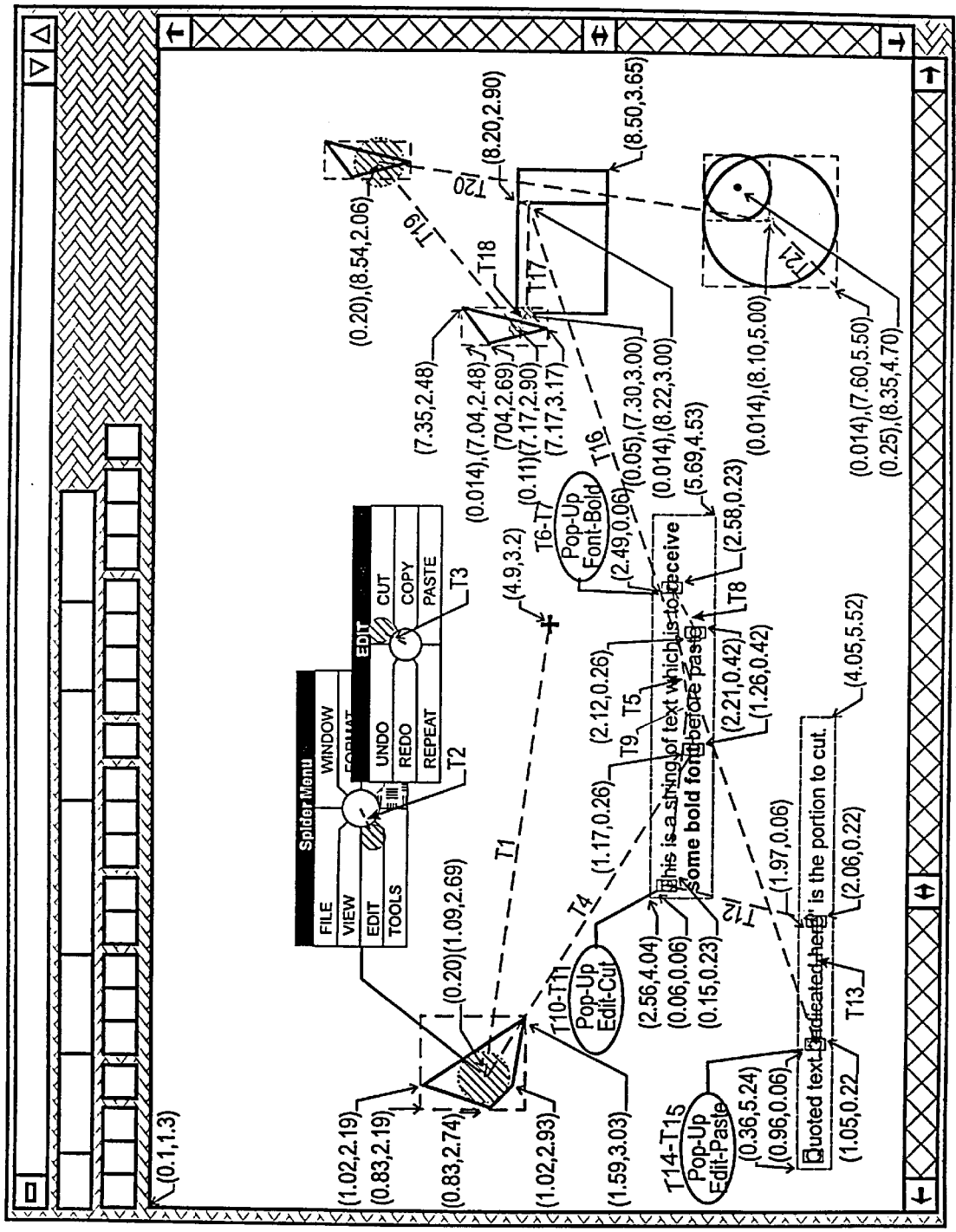
Figure 9T:
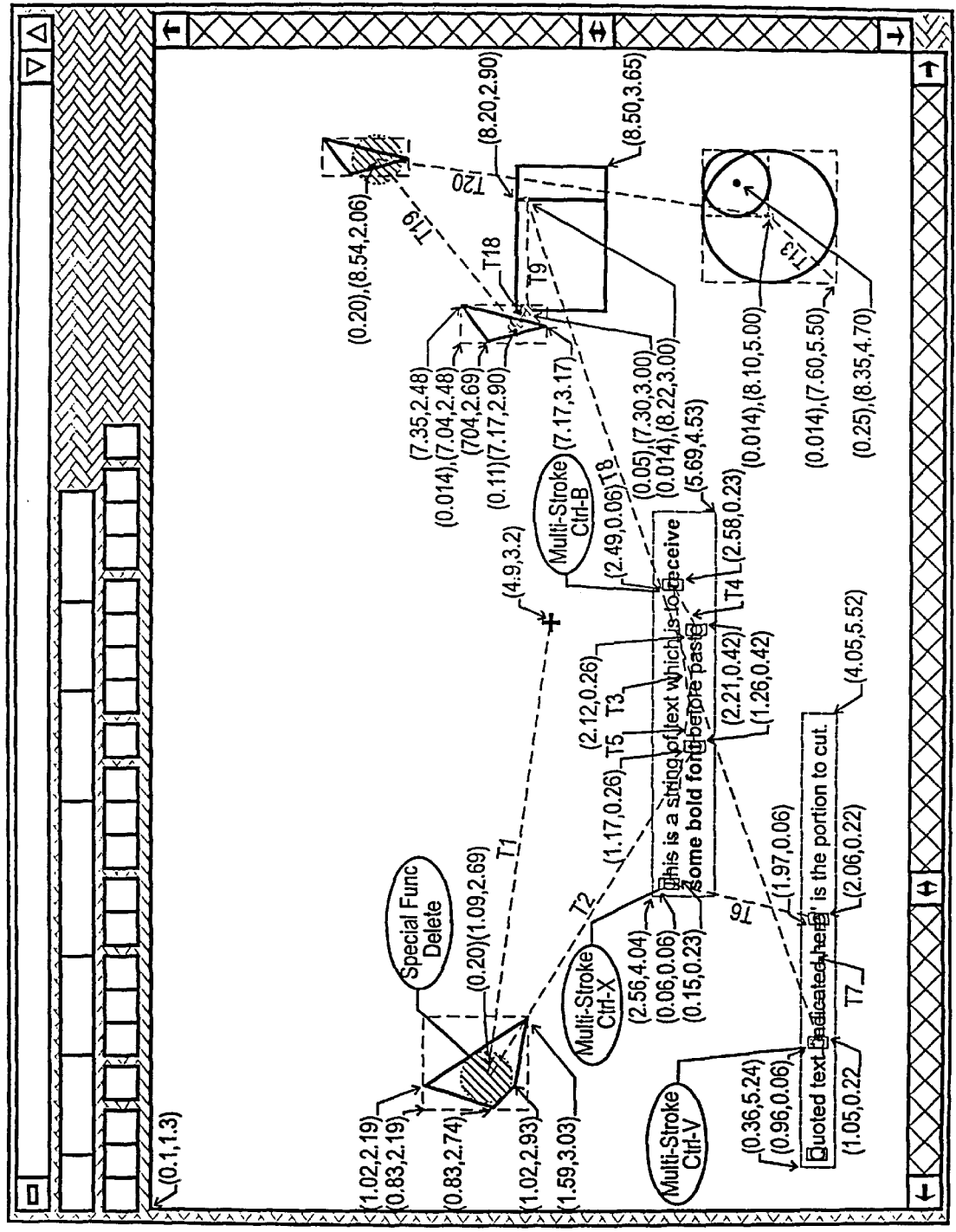

To elucidate, consider that if in FIG. 8 the infinitely remote external apex is at $-X_\infty$, 848 denotes the ETL of infinite radius which contains the center of the right-most inscribed extreme circle. From geometry of the target and the extreme inscribed circle it is apparent that $\|\overline{am}\|=\|\overline{mb}\|$, $\overline{am} \perp \overline{mb}$ and the shape maJb forms a square. $\overline{mJ}$ and $\overline{ab}$ are diagonals of square maJb and are thus of equal length and intersect at right angles. Since the hypotenuse of right triangle ΔaJb is a diagonal of 854, point a is the intersection between physical target side $\overline{KJ}$, the MaxETL of the infinitely remote external apex, and the MaxETL containing points m and J. Parallel arguments hold for remaining apexes of the physical target. It is thus concluded that if a normal traverse to the line segment between the centers of inscribed extreme circles is possible, it is not possible for this initial acquiring entity location to be located within a region bounded by the MaxETL of a physical target apex.

FIG. 8 depicts a rectangular target of Aspect Ratio>>1 having a coordinate system with origin at the target's center-of-gravity and X-axis coincident with the target's horizontal center line. Consider 806 and 848 to be ETL's of the infinite external apex located to the left and passing through the centers, 816 and 858, of inscribed extreme circles 818 and 862 respectively. If coordinates of the acquiring entity are designated by $(X_c, Y_c)$, preceding results permit the conclusion that if $806_x \leq X_c \leq 848_x$ the acquiring entity cannot be located within any of the MaxETLs. For analysis of rectangular targets the following three step procedure is the preferred approach:

1) Case of: ($848_x < X_c$)
   a) If the acquiring entity location lies within either the 854 MaxETL or 868 MaxETL translate the acquiring entity and pertinent apex to produce the alignment depicted by FIG. 3 and determine the optimum hit location using Eq. 6.
   b) If the acquiring entity does not lie within either the 854 MaxETL or the 868 MaxETL, select point 858 as the optimal hit location.
2) Case of: ($806_x \leq X_c \leq 848_x$). Select point $(X_c, 0)$ as optimum hit location.
3) Case of: ($X_c < 806_x$)
   a) If the acquiring entity location lies within either the 808 MaxETL or the 824 MaxETL, translate the acquiring entity and pertinent apex to produce the alignment depicted by FIG. 3, determine the optimal hit location using Eq. 6.
   b) If the acquiring entity does not lie within either the 808 MaxETL or the 824 MaxETL, select point 816 as the optimum hit location.

These results are paralleled for rectangular targets with AR<<1 since such a target can be rotated 90° to produce the environment of FIG. 8, thus permitting application of previous analysis

DETAILED DESCRIPTION OF THE INTERFACE GRAMMAR

The InterFace Grammar

Procedures presented below have ancestry in the Goals, Operators, Methods, and Selection (GOMS) model (Card, S., Moran, T., and Newell, A., *The Psychology of Human-Computer Interaction*, 1983) and subsequently appraised with qualified results as an interface design tool by Poison (Poison, P. A Quantitative Theory of Human-Computer Interaction, in Carroll, J., (ed.) *Interfacing Thought: Cognitive Aspects of Human-Computer Interaction*, 1987, pp. 184–235), (Karat, J. and Bennett, J., Working Within the Design Process: Supporting Effective and Efficient Design, in Carroll, J., (ed.) *Designing Interaction: Psychology at the Human-Computer Interface*, 1991, pp.269–285), and Tetzlaff, L. and Mack, R., Discussion: Perspectives on Methodology in HCI Research and Practice, in Carroll, J., op. cit., 1991, pp.286–314). While this invention employs the concept of subdividing user activity into sequences of subgoals and activities as pioneered by GOMS, it differs from GOMS by not seeking to predict periods during which users engage in cognitive activity and by not seeking to predict overt user behavior during evaluation of existing interfaces.

For purposes of developing this section, it is presumed a computer-human interface is designed to control the functionality of an application system as specified by an explicitly or implicitly developed Requirements Specification; a document whose preparation and purpose are well understood by those experienced in the art. It is also presumed that data to permit comparison of the computer-human interfaces being evaluated by the invention derive from explicit or implicit performance of a standard task suite reflective of typical use of the said compared application software. It is finally presumed that input-output devices available to the user are the keyboard, mouse, trackball, joystick and CRT, operation of which entails performing the following physical operations: single key stroke, multi-key stroke, cursor move, cursor drag, button click, button multi-click, hand-homing, and finger-homing.

Define a "Terminal Session" to be the sequence of physical operations undertaken by users on input devices of a computer-human interface while accomplishing the standard test suite. It is posited that during a terminal session the user seeks to accomplish some primary goal, P, which is subdivided into a set of subgoals, $G_1, \ldots, G_k$, that accomplish P. The invention additionally posits that software designers must provide at least one method, M, with which to accomplish each subgoal. A method comprises one or more tasks, T, performed by the user that, when successfully performed, parameterize software functionality that accomplishes the subgoal of said method. To accomplish each task of a given method the user executes a sequence of one or more of the above specified physical operations, O, on the input devices. Stated formally, the invention defines a terminal session to be the performance of a set of methods, $M_a$, $1 \leq a \leq b$, which accomplish the k subgoals, $G_1$, $1 \leq i \leq k$, into which the primary goal, P, is decomposed. Each method, $M_a$, comprises a set of one or more tasks, $T_d$, $1 \leq d \leq e$. Each task of each method comprises an ordered sequence of one or more physical operators, $O_j \ldots O_l$, that conform to the syntactic rules defined for the software during its design. A terminal session is thus comprised of a temporally ordered sequence of physical operations in which subgoal 1 is achieved before subgoal 2, etc., thus:

$$P = G_1 \quad \ldots \quad G_i \quad \ldots \quad G_k \qquad \text{(Eq 16)}$$
$$\rightarrow M_1 \quad \ldots \quad M_a \quad \ldots \quad M_b$$
$$\rightarrow T_1 \ldots T_b \ldots T_d \ldots T_e \ldots T_g \ldots T_h$$
$$\rightarrow O_1 \ldots O_b \ldots O_d \ldots O_e \ldots O_g \ldots O_h \ldots O_j \ldots O_l \ldots O_m \ldots O_n \ldots O_p \ldots O_q$$

where:

P the primary goal.

$G_i$ a subgoal; i.e., a subdivision into which the user partitions P.

$M_a$ a method; i.e., a process activating functionality to accomplish $G_i$ $T_d$ a physical task; i.e., one or more physical operations that parameterize each component of $M_a$.

$O_c$ a physical operation.

Performance of each $T_d$ entails acquisition of at least one target, the acquisition of said target entailing traversing a distance $D_t$ to acquire a target of width $W_t$ which, provided defensible values for $D_t$ and $W_t$ exist, entails expending $\log_2(D_t/W_t+1)$ bits of effort. Aggregating the physical effort expended to execute the individual physical operators provides a measure of the total physical effort embodied in a terminal session, thus:

$$I_T = \sum_{a=1}^{b} M_a \sum_{d=1}^{h} T_{ad} \sum_{c=g}^{k} I(O_{adc}) \qquad \text{(Eq 17)}$$

where:

$I_T$ total physical effort expended.

$M_a$ the $a^{th}$ in a sequence of b methods which accomplish P.

$T_{ad}$ the $d^{th}$ in a sequence of tasks forming the $a^{th}$ method.

$I(O_{adc})$ the physical effort expended to perform the $c^{th}$ physical operation of the $d^{th}$ task of the $a^{th}$ method executed.

Application of this result to interface evaluation entails a symbology which permits description of all displayed, targetable screen graphics and all user activity performed on input devices during a terminal session. In particular, capabilities of said symbology comprise: (1) specification of location, shape and size of any targetable artifact of the computer-human interface irrespective of whether said targetable artifact is a component of the system supplied Graphic User Interface or a component of the application system, (2) management of alterations to said targetable artifacts by the user, (3) specification of text or pattern fill of targetable artifacts enabled to receive fill, (4) ability to render visible or non-visible any targetable artifact, (5) ability to set defaults appropriate to terminal session needs, and (6) specification of linkages in which user manipulation of one targetable artifact induces secondary effects to one or more other targetable artifacts. The InterFace Grammar (IFG) presented in Appendix A is a symbology addressing these requirements expressed via Backus-Nuar Form (BNF), a notation well understood by those skilled in the formal language arts. BNF specifies syntax rules in the form TERMINAL/NON-TERMINAL←NON-TERMINAL whereby any embedded substring of non-terminal symbols matching the left-hand side of a Backus-Nuar Form production can be replaced by any substring on the right-hand side of said production. In addition to detailing productions which delimit physical operations of individual methods, declare default values, and provide other ancillary artifact management, the BNF notation appearing in Appendix A details the two separate but inter-related divisions of the InterFace Grammar (IFG). The Graphic-User-Interface Descriptor (IFG/GUID) detailed in Appendix A by the section "Grammar to Describe the Graphic User Interface" presents an extensive but non-exhaustive IFG/GUID which is here included to make possible the example presented below. The IFG/GUID is not considered part of the present invention. The second major IFG division is the Physical Operation Descriptor (IFG/POD) and is detailed in Appendix A by the sections "Grammar for Physical Operations Performed of the Keyboard" and "Grammar for Physical Operations Performed for Cursor Control." The IFG/POD presents BNF productions permitting exact description of actual or predicted user manipulation of input devices undertaken to accomplish the primary goal of a terminal session. IFG/POD code is employed in conjunction with IFG/GUID or its equivalent too objectively identify the implicit target which minimizes physical effort expended to acquire each physical target given an arbitrary initial location of the acquiring entity. This capability permits objective, quantitative determination of the physical effort expended during target acquisition. Not being obvious to persons of normal skill in the prior art of computer-interface design, procedures which utilize the Physical Operation Descriptor of the Interface Grammar are considered a component of the present invention.

For IFG/POD and IFG/GUID to be applicable to quantification of the physical effort of manipulating a computer-human interface it must be possible to declare system default values. IFG/POD and IFG/GUID syntax for system default specification is:

\D[KEYWORD=keyword-value]

\D commences an IFG sequence that defines a system default production. "KEYWORD" represents a reserved word denoting a parameter. "Keyword-value" is a system suggested value, a selection from IFG provided values, or a user supplied value.

IFG/GUID syntax for specification of key location on the keyboard is:

```
\B[KEYBOARD=
    START,
        UNITS={xx},
        KEYSIZE={h,w},
        KEY={key identification}, LOCATION={x,y},
        KEY={key identification}, LOCATION={x,y},
        . . .
    END]
```

"\B" commences an IFG sequence to define key locations while "START" and "END" bound the series of specifications defining size and location of each key of the keyboard. "KEY" identifies the key(s) being described and permits their assignment to alphameric, general function, predefined function, cursor control, toggle or numeric pad categories. "LOCATION" either explicitly designates or permits determination of the location of each key.

Within IFG/GUID artifacts are categorized either as classes and structures or as objects and associations. Classes are abstract templates from which individual objects are instantiated to represent individual, real-world concepts being manipulated by the application software. Structures are abstract templates from which aggregations of artifacts are instantiated to represent complex, real-world concepts being manipulated by the application software. IFG/GUID syntax generally conforms to one of the following formats:

```
\GC[CLASS=tag_c, SHAPE=type(apexes), /PARMS]
\GS[STRUCTURE=tag_s, {object/association list}, /PARMS]
\GO[OBJECT=path<tag_o>, CLASS=tag_c, LOCATION=(x,y), /PARMS]
\GA[ASSOCIATION=path<tag_A>, STRUCT=tag_s, LOCATION=(x,y),
/PARMS]
```

"\Gx" commences an IFG/GUID symbol string that defines a screen artifact of type "x"; "x" denoting a class, structure, object, or association. "Path" appears for Object and Association artifacts to identify the data structure providing the coordinate system of artifacts being defined. "Location" applies to Objects and Associations to specify either positioning of the artifact being referenced or the coordinates to which a previously acquired artifact is to be moved. "Tag" provides names to individual artifacts or to sets of undifferentiated artifacts being generated to permit specific artifact identification during subsequent manipulation. "Parms" either explicitly or implicitly declare parameters appropriate to control of a particular artifact or class of artifact.

IFG/POD permits specification of each user action that manipulates an input device of the human-computer interface. IFGIPOD syntax for specification of physical operations on the keyboard is:

\Kx{sequence of one or more key strokes}

"\K" commences an IFG keying sequence with "x" denoting one of the following category of key: alphameric, general function, pre-defined function, cursor control, toggle, or numeric pad.

Generally IFG/POD syntax for specifying physical operations of cursor management is:

\C{function activation}{target acquisition}{function activation}

Curly brackets, "{ ...}", denote optional physical operations performed in a manner specified by interface designers. When the syntax denotes function activation reference is to permitted button manipulation or to simultaneous button and keyboard manipulation. "Target acquisition" either references traverse to an extant graphic artifact or designates traverse to a location in white-space. IFG/POD syntax for cursor movement is:

path<tag>(segment or location or unbounded target)

"Tag" is the unique name of a displayed physical target to be acquired with its point of acquisition specified relative to the axis system of the ancestor association of which "tag" is a member. "Segment" denotes the component of the physical target such as the middle, an edge, or corner to be acquired. "Location" applies to targets not having unique identification that are acquired by delimiting an area of non-target real-estate within the "parent." association that contains the desired targets. Text strings and simultaneous acquisition of multiple artifacts exemplify such targets. An unbounded target is acquisition of an area not explicitly delimited by a physical target that is to be visualized as a circular area having radius dependent on the precision required to accomplish the purpose of performing the current task.

Since exigencies of a particular application may require adjustment to the capabilities of the IFG/POD that are not explicitly detailed in Appendix A, the invention encompasses such adjustments as are in keeping with the spirit and purpose of the Physical Operator Descriptor productions of the InterFace Grammar. Additionally, whereas BNF is one method with which to express a computer-human interface and user manipulation conducted thereon, it is realized that alternate methods for expressing the purpose of the Physical Operator Descriptor aspects of the InterFace Grammar are available which are equally applicable. It is the spirit and purpose of a symbology designed to permit description of a computer-human interface and physical operations thereon with the intent of determining the physical effort incurred during a terminal session that is considered within the scope of this invention. In consequence, the validity of the IFGI-POD aspect of the present invention does not depend on a particular style and form of symbology.

AN EXAMPLE ILLUSTRATING IMPLEMENTATION OF THE INVENTION

This section introduces the environment of a computer based activity, presents specifications of a standard test suite, and summarize results from application of the physical effort metric. The next page presents the specifications for an exemplar application of the physical effort metric with interpretation of results presented on subsequent pages. FIG. 9 Sheet 1 through Sheet 19 present detail of procedures followed to achieve these results. FIG. 9 Sheet 1

Exemplar Standard Task Suite: Assumptions and Specifications

Assumptions of the Example

1. Comprehension of the InterFace Grammar of Appendix A is presumed.

2. FIG. 9 Sheet 1 presents the GUI assumed for this example. Artifacts are drawn to scale with artifact origins presented relative to the origin of their parent association. Measurement is in inches.

3. The GRABWIDTH parameter is 2 pixels; i.e., ±0.014 inches.

4. Four strategies for performing the Standard Test Suite are illustrated

Drop-Down Menu Bar: Depicted by FIG. 9 Sheets 11 and 12.

Icon Activation: Depicted by FIG. 9 Sheets 13 and 14.

Pop-Up Spider Menu: Depicted by FIG. 9 Sheets 15 and 16. (Description of the Spider Menu appears in Appendix B)

Cmd-Key Equivalent: Depicted by FIG. 9 Sheets 17 and 18.

5. The terminal session commences with the cursor located at "+".

6. Cursor traverses are depicted in order of occurrence via T1, T2, . . . , Tn.

Specifications of the Standard Test Suit

Subgoal 1: Delete the trapezoidal target.

Subgoal 2: Set to bold the text string "receive some bold font"

Subgoal 3: Cut the complete text string "This is a string . . . before paste." and paste it over the quoted text string "indicated here."

Subgoal 4: Perform one-dimensional scaling of the standard rectangle by displacing the left edge (−0.9±0.014) inch.

Subgoal 5: Move the triangular target 1.36 inches left and 0.76 inches upward.

Subgoal 6: Perform two-dimensional scaling of the circular target by placing the bottom-left corner at location ((7.60,5.50)±0.014) inch. displays the CRT environment for a basic GUI with its canvas pre-populated by artifacts specified by the test suite. Coordinate locations shown are specified in the manner supported by the IFG/GUID of Appendix A; namely, coordinate values of an artifact are specified relative to the parent association of the artifact referenced. Thus, the origin of the "Edit" option of the menu is location (1.3, 0.0) relative to (0.1,0.5), the origin of the menu association which itself is relative to (0.0,0.0), the origin of its parent Window association. Similarly, "Cut", an element of the "EditStru" structure, has (0.0,0.9) as its origin expressed relative to its parent reference of (1.3,0.0), the origin of the object "Edit."

FIG. 9 Sheet 2 through Sheet 5 present IFG code that specifies: (1) default values, (2) IFG/GUID code declaring a window, a drop-down menu bar, icons, and a port association comprising scrollbars, viewport, and (3) IFG/GUID code depicting application system objects populating the canvas. information required for IFG/GUID coding of the GUI is generally envisaged to be a schematic detailing size, location of the GUI's artifacts and transforms permitted to their graphic display. IFG/GUID code to depict artifacts of the test suite derives from specifications of the standard test suite. In the present example, IFG/GUID code is employed to populate the canvas prior to performing the test suite which has as its primary goal the editing of six pre-existing graphic objects. Another test suite may entail user activity which includes populating the canvas. Materials of FIG. 9 Sheets 6 through Sheet 10 are not subsumed within the present invention since these materials are well understood by practitioners of the interface design arts. These sheets are included only to illustrate the process whereby METHODs and TASKs produce the IFG/POD strings that describe the physical operations of a terminal session and how these IFG/POD strings are subsequently utilized to quantify the physical effort of performing the standard test suite. Sheets 6 and 7 illustrate a set of TASKs which can be variously combined to produce the set of METHODS presented by Sheet 8 through Sheet 10. Each task specifies a header and a set of explicit physical operations to be performed by the user. A TASK-HEADER receives a user supplied name to identify both the type of physical target impacted by the task and the manipulation performed on that target. The ACTION component of the TASK-HEADER categorizes the particular manner in which each task performs the said manipulation. The combination of task-name and task-action must combine to form a unique phrase to permit its identification. Task-headers additionally include one or more formal ARGS to provide the task with generic characteristics that permit reusability.

FIG. 9 Sheet 8 through Sheet 10 illustrate a set of seventeen METHODS; each defined to accomplish one subgoal of the test suite. The seventeen methods presented, formed by variously combining the thirteen tasks of Sheet 6 and Sheet 7, illustrate that a CHI provides multiple methods for performing each subgoal of a terminal session. While naming conventions are similar to those employed for naming tasks, method names explicitly designate the artifact to which the method applies and the subgoal it accomplishes. The STYLE qualifier provides a designation to suggest the dominate technical approach employed by the method.

When the invention is employed to assist designers it is presumed a statement of desired functionality exists and the invention is employed to help determine icon size and position, consistent button usage, optimal menu style, key-equivalent bindings, etc. During design all such decisions become variables of the formal argument lists of the method set being developed. When the invention is employed to evaluate an interface, it suffices that only user emitted actions be entered as parameters into the method's formal argument list since parameters pre-defined during design are known to the method. FIG. 9 Sheet 11 illustrates how a method is coded and its task set parameterized to accomplish subgoal 3 of the test suite via the spider-menu approach (see Appendix B, FIG. 9 Sheets 16 and 17, and FIG. 17 for detail of the spider menu). Upon user activation top-level options in spider menu format are displayed with the cursor positioned by program control at the center of the display. To affect a selection the user traverses the cursor in a radial direction into the desired option and clicks the left button. If there exists a sub-menu option of the selected option the system displays second level options appropriate to the selected top-level option. Selection of a leaf option results in deletion of the menu graphic with the cursor generally returned to the location occupied prior to menu activation.

Physical operations performed by the user to accomplish the standard test suite in a manner to maximize use of the drop-down menu system are detailed by FIG. 9 Sheet 12. The cursor is initially located at coordinates (4.73,4.08) expressed relative to the origin of the Port association, The subgoal of trapezoid deletion is accomplished via the "Target-Delete/MenuBarSel" method. FIG. 9 Sheet 13 shows that this method entails a cursor traverse along the T1 path into the middle of the trapezoid, a left button click, a traverse along path T2 into the "Edit" option of the menu bar, another left-button click, a traverse of path T3 into the "Cut" sub-option of "Edit", and a final left button click. Successive tasks proceed in similar manner. The "IFG" entry under subgoal 1 of Sheet 12 presents the InterFace Grammar code specifying this sequence of user activity. The "Effort" entry indicates physical effort expended to accomplish these individual operations and the aggregate for the complete method. The remainder of Sheet 12 details the complete sequence of methods selected to perform the standard test suite using drop-down menu bar when appropriate, the IFG physical operations executed during performance of each method, and the physical efforts expended. FIG. 9 Sheet 13 displays the complete sequence of moves and implicit targets acquired when accomplishing the standard test suite using the said drop-down menu bar. Subsequent pages of FIG. 9 presents terminal session histories and subsequent analysis for icon, spider menu and key-equivalent approaches to performing the standard test suite.

The following table displays results of physical effort expended during performance of the example's standard test suite in both absolute terms and in terms relative to the key-equivalent technique. The key-equivalent technique is employed as the base for relative comparison as this technique is generally considered by those knowledgeable in computer usage to require least physical effort to accomplish a subgoal. Since each terminal session of the example Results of Applying the InterFace Grammar to Evaluate the
Physical Effort of Various Terminal Sessions
see Figure 9 for detail

| Subgoal | Drop-Down Menu | | Icon | | Spider Menu | | Key-Equivalent | |
|---|---|---|---|---|---|---|---|---|
| | Total bits | Ratio | Total bits | Ratio | Total bits | Ratio | Total bits | Ratio |
| Delete Obj. | 9.84 | 1.40 | 7.35 | 1.05 | 5.34 | 0.76 | 7.04 | 1.00 |
| Bold Text | 15.23 | 1.27 | 13.02 | 1.08 | 9.79 | 0.81 | 12.04 | 1.00 |
| Cut-Paste | 31.78 | 1.57 | 25.97 | 1.29 | 15.86 | 0.78 | 20.21 | 1.00 |
| X-Scale | 11.22 | 0.99 | 11.25 | 0.99 | 11.38 | 1.00 | 11.38 | 1.00 |
| Move Object | 3.99 | 1.00 | 3.99 | 1.00 | 3.99 | 1.00 | 3.99 | 1.00 |
| X/Y-Scale | 11.97 | 1.00 | 11.97 | 1.00 | 11.97 | 1.00 | 11.97 | 1.00 |
| TOTAL | 84.03 | 1.26 | 73.55 | 1.10 | 58.23 | 0.87 | 66.63 | 1.00 | entails identical physical operations for Subgoals 4–6 of the example, the physical effort incurred for their attainment is identical. With one-half of the physical subgoals for each terminal session being of identical physical effort, the drop-down menu bar requires 26 more percent physical effort overall than does the key equivalent approach. The icon approach requires 10 percent more physical effort and the spider menu technique requires 13 percent less. When only subgoals employing different approaches to subgoal accomplishment are compared the drop-down, the icon and the spider menu approaches entail 145, 118 and 79 percent the physical effort relative to the key-equivalent approach. With this example all subgoals of the test suite can be achieved via menu or icon based styles without hand homing while with the key-equivalent approach hand homing from keyboard to mouse and back is required, In consequence, this example may not fully reflect typical real-world terminal sessions and thus somewhat biased in favor of menu/icon based methods. Irrespective, the example suggests that prevalent styles of menu design provided by current commercial GUIs are inefficient relative to alternate menu styles. This conclusion is concordant with results of an unpublished experiment which investigates the efficacy of different menu designs conducted in support of patent application No. 08/191,015.

The example suggests that results generated by the quantitative, objective procedures embodied in the present invention correlate with the consensus of persons experienced with computer usage regarding relative levels of physical effort expended when using differing approaches to interface manipulation. The example also suggests that differences in physical effort of method execution can be substantial thus justifying attention to its reduction through design evaluated by the present invention.

ENVIRONMENT FOR APPLICATION OF THE INVENTION

Practical implementation of the invention presumes that IFG sequences of a terminal session are generated via software that offers a pseudo-natural language and palettes of graphic objects suitable for expressing the GUI environment and define methods of the application software undergoing evaluation. Being neither integral to the present invention nor an addition to the computing arts for those of normal skill, only the purpose and results of these software capabilities are here described.

Support Environment for the Design of Interfaces

FIG. 10 Sheet 1 depicts an environment appropriate to application of the invention as an aid to the design of interfaces for a proposed software system. Preliminary to employment of the invention task analysis, 10100, is performed to identify the functionality to be provided by the software and the input-output requirements. Also preparatory to employment of the invention is activity to ascertain the software's typical application. Resulting is a set of representative tasks which become the test suite of standard activities 10104. If exigencies of a particular application require, the two components of the Interface Grammar, 10102 and 10114, are adapted prior to the drafting of methods. Once method drafting is complete, there will exist one Graphic-User Interface, 10106, and one set of methods, 10108, for each proposed interface.

Application of the invention commences after completion of these stages. Initially, IFG/GUID descriptions of the keyboard and artifacts of each GUI proposed are produced 10102. It is presumed there is available one or more persons with skills appropriate to each proposed interface design. These persons devolve the primary goal of accomplishing the test suite into subgoals ordered in the sequence performed within a production environment. A proposed CHI is selected and the most appropriate method, 10110, of accomplishing each subgoal identified.

Each method and target(s) selected is then expressed to the invention via an Interface Pseudo-Code, 10112. Whereas in one aspect the invention pertains to identification of the physical subset of points users identify while acquiring an arbitrarily shaped and located triangular or quadrangular target, actual identification of the physical points which comprise the implicit target entails aspects of the invention burdensome for the designer to apply using manual techniques. The Interface Pseudo-Code exists to permit users to describe the real-world environment they confront in a minimally burdensome manner. When the Interface Pseudo-Code is an integral component of the interface evaluation system, the Interface Pseudo-Code translator 10116 that parses the pseudo-code into IFG/POD symbols, 10114, will be programmed to maintain data structures which store parameters defining the current status of each interface target. Output of 10116 is an ordered set of Interface Grammar symbols which comprise the Terminal Session Record, 10120. Submitting 10120 to analysis by the physical effort procedure, 10122, produces metrics showing physical effort expended during a terminal session that uses a given CHI, 10124. This process is repeated for each proposed interface and results in one report of inferred physical effort expended during a terminal session using a proposed computer-human interface.

Support Environment for Evaluation of Existing Interfaces and Computer Users

FIG. 10 Sheet 2 depicts the environment typical for application of the invention to either evaluation of existing interfaces or to evaluation of personnel. Preliminary to employment of the invention, the software's typical application, 10200, is ascertained and a set of representative tasks identified which define the test suite of standard activities, 10202.

Application of the invention now commences. It is presupposed there is available one or more persons with skills appropriate to each of the interface designs undergoing evaluation; i.e., knowledgeable regarding the implications of 10204 and 10214 without actual knowledge of IFG itself.

These persons accomplish 10208; i.e., physically perform the standard test suite using each interface being evaluated. For each interface all physical operations performed by the user while performing 10202 are recorded either through direct electronic event capture or through video recording of each terminal session, as indicated by 10210. When event capture is employed, the event queue of the computer's graphic user interface is screened for entries pertaining to target acquisition and relevant events are converted into symbol sequences of the Interface Grammar. When video recording of user activity is employed, the video record is viewed, the physical operations performed are identified, and each physical operation expressed via Interface Pseudo-Code. Upon parsing the Interface Pseudo-Code, 10216, there exists a Terminal Session Record, 10222, which details each physical operation performed on each interface during performance of the test suite of standard tasks. Submitting 10222 to analysis of the invention, 10224, produces metrics showing actual physical effort expended during a terminal session using a given CHI, 10226.

DETAILED DESCRIPTION OF IMPLICIT TARGET ANALYSIS

Notation and Definitions

It is above noted that the mathematical arts commonly identify a referenced entity via a base symbol with attribute identification of said entity achieved by subscripts, superscripts and other forms of symbol attached to the base symbol. Employing this convention, the following list presents definitions and notation utilized by mathematical references employed during the detailed description of the present invention:

| Definition | Notation |
|---|---|
| Reference to acquiring entity | G |
| Reference to arbitrary apex of the physical target | A |
| Coordinates of arbitrary apex of the primary generating triangle | $(X_A, Y_A)$ |
| Reference to external apex of the primary generating triangle | E |
| Coordinates of external apex of the primary generating triangle | $(X_E, Y_E)$ |
| Reference to largest inscribed circle identified by base-apexes | M |
| Reference to center of M | m |
| Coordinates of center of M | $(X_m, Y_m)$ |
| Radius of M | $R_M$ |
| Reference to largest inscribed circle identified by nonbase-apexes | N |
| Reference to center of N | n |
| Coordinates of center of N | $(X_n, Y_n)$ |
| Radius of N | $R_N$ |
| Reference to implicit target | T |
| Reference to center of T | t |
| Coordinates of center of T | $(X_t, Y_t)$ |
| Radius of T | $R_T$ |
| Reference to arbitrary Equi-Target Loci through apex A & point z | $ETL_{Az}$ |
| Reference to center of $ETL_{Az}$ | $etl_{Az}$ |
| Coordinates of center of $ETL_{Az}$ | $(X_{etl_{Az}}, Y_{etl_{Az}})$ |
| Radius of $ETL_{Az}$ | $R_{ETL_{Az}}$ |
| Reference to Max Equi-Target Loci through apex A & point z | $MaxETL_{Az}$ |
| Reference to center of $MaxETL_{Az}$ | $max\ etl_{Az}$ |
| Coordinates of center of $MaxETL_{Az}$ | $(X_{maxetl_{Az}}, Y_{maxetl_{Az}})$ |
| Radius of $MaxETL_{Az}$ | $R_{MaxETL_{Az}}$ |
| Coordinates of arbitrary point Z | $(X_Z, Y_Z)$ |
| Reference to line between points $Z_1$ and $Z_2$ | $L_{\overline{Z_1,Z_2}}$ |
| Length of line between points $Z_1$ and $Z_2$ | $\|L_{\overline{Z_1,Z_2}}\|$ |
| Distance to Implicit Target | $D_t$ |
| $\left(D_t = \|L_{\overline{C,t}}\| = \sqrt{(X_c - X_t)^2 + (Y_c - Y_t)^2}\right)$ | |
| Width of Implicit Target ($W_t = 2 \times R_T$) | $W_t$ |
| Index of Difficulty formulated from $D_t$ and $W_t$ | $I_t$ |

Given that many references in the detailed description of the present invention relate to attributes of geometric objects, comprehension of the detailed description is increased through figure references that identify the uniqueness if each entity referenced while concomitantly communicating commonalties within a given figure and between different figures. The following convention for FIGS. 12 through 16 is employed:

FPea where:
F →symbols 12 through 16 identify the Figure referenced.
P→as appropriate, symbols A through H identify the Part of Figure F referenced.
e→symbols 0–9 identify a referenced artifact of Figure F Part P.
a→symbols 0–9 identify a referenced attribute of Artifact e of Figure F Part P.

"e" assignment:

e = 0 → Special cases
"a" assignment:

0 → region beyond all MaxETL influence.
2 → origin of the Cartesian axis system.
4 → reference to the physical target.

-continued

6 → center-of-gravity of a physical target.
e = 1 → Acquiring entity attributes
"a" assignment:

0 → C → the acquiring entity.
2 → $L_{\overline{C,maxetl_{C,20}}}$ → distance from C to center of MaxETL of apex 20.
3 → $L_{\overline{C,maxetl_{C,30}}}$ → distance from C to center of MaxETL of apex 30.
4 → $L_{\overline{C,maxetl_{C,40}}}$ → distance from C to center of MaxETL of apex 40.
5 → $L_{\overline{C,maxetl_{C,50}}}$ → distance from C to center of MaxETL of apex 50.
6 → $L_{\overline{C,maxetl_{C,60}}}$ → distance from C to $(X_{maxetl_{Em}}, Y_{maxetl_{Em}})$.
9 → $D_t$ → distance from acquiring entity to center of T.
e = 2,3,4,5 → Physical target apexes referenced
counterclockwise with 2 denoting
the left-most apex or the lower-left apex if two equal left-most apexes
exist.
"a" assignment:

0 → A → reference to apex A.
1 → — → reference to line bisector of apex A.
2 → $MaxETL_{Az}$ → loci forming MaxETL containing apex A and center of closest extreme inscribed circle.
3 → — → extent of angle subtended by apex A.
4 → — → area contained within $MaxETL_{Az}$.
6 → $etl_{Az}$ → center of $MaxETL_{Az}$.
8 → $R_{MaxETL_{Az}}$ → radius of $MaxETL_{Az}$.
e = 6 → External apex of the primary generating triangle.
"a" assignment:

0 → E → reference to external apex.
1 → — → reference to line bisector of apex E.
2 → $MaxETL_{Em}$ → loci forming MaxETL containing apex E and point m
3 → — → extent of angle subtended by apex E.
4 → — → area contained within $MaxETL_{Em}$.
5 → — → one-half of angle subtended by apex E.
6 → $maxetl_{Em}$ → reference to center of $MaxETL_{Em}$.
8 → $R_{MaxETL_E}$ → radius of $MaxETL_{Em}$.
e = 7,8 → Largest and smallest inscribed extreme circles
of the primary generating triangle.
"a" assignment:

2 → M, N → reference to largest inscribed circles identified by
bisectors of base and nonbase-apexes respectively.
6 → m, n → centers of circles M and N respectively.
8 → $R_M$, $R_N$ → radii of circles M and N respectively.
e = 9 → Implicit target.
"a" assignment:

2 → T → reference to implicit target.
6 → t → reference to center of implicit target.
8 → $R_T$ → radius of implicit target.
e = 10 → the ETL containing the external apex and
the center of the largest
inscribed circle identified by bisectors of nonbase-apexes, and
e = 11 → an ETL of arbitrary radius containing either an apex
of the physical target or the external apex.
"a" assignment:

2 → $ETA_{En}$, $ETA_{Az}$ → respectively (1) the ETL
containing apex E and point
n and (2) the ETL containing a referenced apex A
and an arbitrary point z.
6 → $etl_{En}$, $etl_{Az}$ → reference to center of $ETL_{En}$ and $ETL_{Az}$ respectively.
8 → $R_{ETL_{En}}$, $R_{ETL_{Az}}$ → radius of $ETL_{En}$ and $ETL_{Az}$ respectively.
e = 12, 13 → reference to largest inscribed circles identified by
bisectors of base
and nonbase-apexes respectively of secondary generating triangle.
"a" assignment:

2 → M, N → reference to largest and smallest circles respectively.
6 → m, n → reference to center of circles M and N respectively.
8 → $R_M$, $R_N$, → radius of circles M and N respectively.

Typology of Targets Covered by the Detailed Description

While the invention concerns identification of the set of unique physical points located within an physical target that minimizes the physical effort expended to acquire said physical target, the preferred procedure by which these points are identified depends on the type of physical target. The following typology details physical target types for which preferred procedures of implementation are detailed:

1. To determine the physical effort to acquire a physical target of circular shape centered at location V with radius U apply prior art to obtain values of $D=\|L_{\overline{C,V}}\|$ and $W=2\times U$ as indicated by block 11100 of FIG. 11 Sheet 1.

2. To determine the physical effort expended to acquire a physical target of arbitrary triangular shape and arbitrary orientation apply the Detailed Analysis of the Triangle starting at block 11102 of FIG. 11 Sheet 1.

3. To determine the physical effort expended to acquire a physical target of a convex quadrilateral shape having no pair of parallel sides apply the Detailed Analysis of the Quadrilateral starting at block 11104 of FIG. 11 Sheet 1.

4. To determine the physical effort expended to acquire a physical target of quadrilateral shape having one pair of parallel sides at an arbitrary angle to the axis apply the Detailed Analysis of the Trapezoid starting at block 11106 of FIG. 11 Sheet 1.

5. To determine the physical effort expended to acquire a physical target of quadrilateral shape having two orthogonal pair of parallel sides parallel to the axis apply the Detailed Analysis of the Standard Rectangle starting at block 11108 of FIG. 11 Sheet 1.

6. To determine the physical effort expended to acquire a physical target of quadrilateral shape having two pair of parallel sides at arbitrary angles to the axis apply the Detailed Analysis of the Parallelogram starting at block 11110 of FIG. 11 Sheet 1.

Detailed Analysis of the Triangle

Procedure Commences at Block 11200

1. Determine Parameters of Largest Inscribed Extreme Circle (a) Determine $(X_m, Y_m)$ by procedure 11202.

Apply Eq 13, Eq 14, and Eq 15 to determine $(X_m, Y_m)$. This is location 12A76 and is determined by the intersection of bisectors of any two physical target apexes; i.e., any two of 12A21, 12A31, and 12A41.

(b) Determine RM by procedure 11204.

Repetitively apply Eq 2 to obtain the length of each side of the physical target. Apply Eq 3 to determine the angle of an arbitrary apex, A, then determine half the value of said arbitrary apex angle. Apply Eq 2 to determine $L_{\overline{A,m}}$, the distance between $(X_A, Y_A)$ and $(X_m, Y_m)$. Apply Eq 4 to said half angle and $L_{\overline{A,m}}$ to determine $R_M$. This is conveyed by FIG. 12 Sheet 1 where length of sides of 12AO4 are $\|\overline{12A20,12A30}\|$, $\|\overline{12A30,12A40}\|$, and $\|\overline{12A40,12A20}\|$. If 12A20 is the selected apex, the apex angle is 12A23 with $\|\overline{12A20,12A76}\|$ being the distance between apex 12A20 and the intersection of angle bisectors at 12A76. $\|\overline{12A78}\|$ s the radius of 12A72, the largest circle which can be inscribed in physical target 12A04.

2. Analyze the MaxETL of each apex in turn by iteration 11206:

From geometry recall that the midpoint $(X_d, Y_d)$ of the line connecting any two points, "a" and "b", located at $(X_a, Y_a)$ and $(X_b, Y_b)$ respectively is:

$$(X_d, Y_d) = \left(\frac{(X_a + X_b)}{2}, \frac{(Y_a + Y_b)}{2}\right) \quad \text{(Eq 18)}$$

(a) Determine $(X_{maxetl_{Am}}, Y_{maxetl_{Am}})$ of the current MaxETL by procedure 11208.

Eq 8 shows the center of each $\text{MaxETL}_A$, $(X_{maxetl_{Am}}, Y_{maxetl_{Am}})$, to be the mid-point of the line between apex A and the center of the nearest inscribed extreme circle. Apply Eq 18 to the current MaxETL to determine this location. This is illustrated in FIG. 12 Part B by locations 12B26, 12B36, and 12B46 which are the mid-points of lines between the center, 12B96, of the largest inscribed circle, 12A74, and the physical target apexes 12B20, 12B30, and 12B40 respectively.

(b) Determine $R_{MaxETL_{Am}}$ of the current MaxETL by procedure 11210. Apply Eq 2 to $(X_m, Y_m)$ and the current $(X_{maxetl_{Am}}, Y_{maxetl_{Am}})$ to determine $R_{MaxEtL_{Am}}$. This is illustrated in FIG. 12 Part B where MaxETL 12B22, 12B32, and 12B42 have radii $\|\overline{12B28}\|$, $\|\overline{12B38}\|$, and $\|\overline{12B48}\|$ respectively.

(c) Determine the current $\|L_{\overline{c,maxetl+di\,Am}}\|$ by procedure 11212.

Repetitively apply Eq 2 to $(X_c, Y_c)$ and the current $(X_{maxetl_{Am}}, Y_{maxetl_{Am}})$ to determine $\|L_{\overline{c,maxetl_{Am}}}\|$. This is illustrated by FIG. 12 Part B where $\|\overline{12B12}\|$, $\|\overline{12B13}\|$, and $\|\overline{12B14}\|$ respectively denote the distances between the acquiring entity at 12B10 and MaxETL centers at 12B26, 12B36, 12B46.

3. Identify Type of Analysis Required:

(a) For the case of no A such that $\|L_{\overline{c,maxetl_{Am}}}\| < R_{MaxETL_{Am}}$ use procedure 11218.

The acquiring entity is outside all $\text{MaxETL}_{Am}$ regions; i.e., region 12B00 of FIG. 12 Part B. To analyze apply Section 4 "ETL Analysis of the Largest Inscribed Extreme Circle" of the Detailed Analysis of the Triangle.

(b) For the case of one A having $\|L_{\overline{c,maxetl_{Am}}}\| < R_{MaxETL_{Am}}$.

The acquiring entity falls within one MaxETL region; i.e., in FIG. 12 Part C within the area delimited by 12C22. To analyze apply Section 5 "ETL Analysis of the Apex" of the Detailed Analysis of the Triangle.

4. ETL Analysis of the Largest Inscribed Extreme Circle:

The implicit target is the largest inscribed extreme circle of the physical target. Apply Eq 2 to $(X_c, Y_c)$ and $(X_m, Y_m)$ to determine $D_t$. $R_M$ is known from above. $W_t$ is twice $R_M$. FIG. 12 Part B illustrates that for a acquiring entity located at 12B10 the implicit target is 12B94 and results in a $D_t$ of $\|\overline{12B19}\|$ and a $W_t$ equal $2\times\|\overline{12B98}\|$.

5. ETL Analysis of the Apex:

(a) Transform the axis by procedures 11222 and 11224.

Translate the axis origin to coincide with the apex, A, of the ETL containing the acquiring entity. Perform rotation to make the positive direction of the transformed x-axis coincident with the bisector of apex A. For implicit target analysis of the apex it suffices to express the acquiring entity, the specified apex, and the center of the closest inscribed extreme circle in coordinates of the transformed axis. Employing lower-case letters to represent transformed coordinates, those skilled in the art can apply the following matrix formulation to affect these transformations:

$$\begin{bmatrix} x_A & y_A & 1 \\ x_C & y_C & 1 \\ x_m & y_m & 1 \end{bmatrix} = \begin{bmatrix} X_A & Y_A & 1 \\ X_C & Y_C & 1 \\ X_m & Y_m & 1 \end{bmatrix} \begin{bmatrix} 1 & 0 & 0 \\ 0 & 1 & 0 \\ -X_A & -Y_A & 1 \end{bmatrix} \quad \text{(Eq 19)}$$

-continued $$\begin{bmatrix} +\cos\delta & -\sin\delta & 0 \\ +\sin\delta & +\cos\delta & 0 \\ 0 & 0 & 1 \end{bmatrix}$$

where:

$X_A, y_A$ $(X_A, Y_A)$ expressed in terms of the translated axis.
$x_c, y_c$ $(X_c, Y_c)$ expressed in terms of the translated axis.
$X_m, y_m$ $(X_m, Y_m)$ expressed in terms of the translated axis.
$\delta \tan^{-1}$ (Slope of Apex Bisector).

Eq 19 performs clockwise rotation. Those applying the invention must assure direction and amount of rotation conforms to the behavior of Eq 19.

FIG. 12 Part C illustrates this environment with an initial acquiring entity located at 12C10 within the area delimited by 12C22. To analyze, the X-axis is translated by 12C20$_X$, and the Y-axis translated by 12C20$_Y$ followed by rotation of the translated axis by $\beta$ degrees. This procedure converts said relevant locations into the transformed locations of FIG. 12 Part D; namely, acquiring entity location 12C10 transforms to 12D10, the center of the largest inscribed circle 12C76 transforms to 12D76, and apex A at 12C20 transforms to 12D20.

(b) Determine $D_t$ by procedure 11226

Expressed in terms of the transformed axis, the optimum physical target acquisition point, t, is the intersection of the transformed x-axis and the ETL containing transformed coordinates of A and C. Apply Eq 6 to $x_c$ and $y_c$ to determine $(x_t, y_t)$. Apply Eq 2 to $(x_c, y_c)$ and $(x_t, y_t)$ to determine $D_t$. 12D112 is the ETL containing both apex 12D20 and acquiring entity 12D10. The optimal acquisition point is 12D96, the center of the implicit target 12D94, for a $D_t$ of $\|\overline{12D19}\|$ (c) Determine $W_t$ by procedure 11226.

Apply Eq 2 to $(x_A, y_A)$ and $(x_t, y_t)$ to determine $\|L_{\overline{A_t}}\|$. If not previously determined, apply Eq 3 to determine the extent of the angle of apex A. Determine one-half the extent of said angle. Apply Eq 4 to said half apex angle and $\|L_{\overline{A_t}}\|$ to determine the radius of the implicit target. Set $W_t$ equal to twice this radius. In FIG. 12 Part A the extent of the angle of apex 12A20 is denoted by 12A23 with 12D25 denoting half this angle. When resolved for a acquiring entity within the range of an MaxETL, as with FIG. 12 Part C, $W_t = 2 \times \|\overline{12D98}\|$.

Detailed Analysis of the Quadrilateral

Procedure Commences at Block 11300

1. Analyze each generating triangle in turn by iteration 11302:

(a) Determine $(X_E, Y_E)$ of current generating triangle by procedure 11304.

Select a pair of opposite sides of the quadrilateral physical target and apply Eq 11 and Eq 12 to determine $(X_E, Y_E)$. In FIG. 13 Part A these are locations 13A60 and 13A120.

(b) Determine $(X_m, Y_m)$ of the base-apexes by procedure 11306.

Apply Eq 13, Eq 14, and Eq 15 to the base-apexes of the current generating triangle to determine the center of the circle identified by bisectors of said apexes. In FIG. 13 centers of the two inscribed extreme circles of the base-apexes are location 13A76 as determined by bisectors 13A31 and 13A41 of apexes 13A30 and 13A40 and location 13A136 as determined by bisectors 13A21 and 13A31 of apexes 13A20 and 13A30 respectively.

(c) Determine $(X_n, Y_n)$ of the nonbase-apexes by procedure 11308.

Apply Eq 13, Eq 14, and Eq 15 to the nonbase-apexes of the current generating triangle to determine the center of the circle identified by bisectors of said apexes. In FIG. 13 centers of the two inscribed extreme circles of the nonbase-apexes are location 13A86 as determined by bisectors 13A21 and 13A51 of apexes 13A20 and 13A50 and location 13A146 as determined by bisectors 13A41 and 13A51 of apexes 13A40 and 13A50 respectively.

(d) Determine extent of the current external apex by procedure 11310.

Repetitively apply Eq 2 to obtain the length of each side of the current generating triangle. Apply Eq 3 to determine the angle subtended by the external apex. In FIG. 13 these are $\|\overline{13A60,13A30}\|$, $\|\overline{13A30,13A40}\|$ and $\|\overline{13A40,1A60}\|$ giving 13A63 as the extent of external apex 13A60 for one generating triangle. The other generating triangle has side lengths of $\|\overline{13A120,13A20}\|$, $\|\overline{13A20,13A30}\|$ and $\|\overline{13A30,1A120}\|$ giving 13A123 as the extent of external apex 13A120 for the other generating triangle.

(e) Determine radius of inscribed extreme circle of base-apexes via 11312.

Apply Eq 2 to determine $\|L_{\overline{E,n}}\|$, the distance between the current $(X_E, Y_E)$ and the center of the current largest inscribed extreme circle, $(X_m, Y_m)$, determined by base apexes. Apply Eq 4 to one-half the external angle and $\|L_{\overline{E,n}}\|$ to determine $R_M$. In FIG. 13 Sheet 1 the external apex, 13A60, subtends an angle depicted by 13A63. Bisectors 13A31 and 13A41 identify the said inscribed extreme circle with center at 13A76 and radius of $\|\overline{13A78}\|$. The external apex, 13A120, of the other generating triangle subtends an angle depicted by 13A123. Bisectors 13A31 and 13A41 determine the extreme inscribed circle to have center at 13A146 and radius of $\|\overline{13A148}\|$.

(f) Determine radius of inscribed extreme circle of non-base apexes vial 1314.

Apply Eq 2 to determine $\|L_{\overline{E,n}}\|$, the distance between the current $(X_E, Y_E)$ and the center of the current inscribed extreme circle $(X_n, Y_n)$ identified by nonbase apexes. Apply Eq 4 to one-half the external angle and $\|L_{\overline{E,n}}\|$ to determine $R_N$. In FIG. 13 Sheet 1 the external apex, 13A60, subtends an angle depicted by 13A63. Bisectors 13A21 and 13A51 identify the said inscribed extreme circle to have center at 13A86 and radius of $\|\overline{13A88}\|$. The external apex, 13A120, of the other generating triangle subtends an angle depicted by 13A123. Bisectors 13A21 and 13A31 determine the inscribed circle to have center at 13A136 and radius of $\|\overline{13A138}\|$.

2. Identify the Primary Triangle by procedure 11316:

Compare radii determined in steps 1(e) and 1(f) preceding to identify the inscribed circle of each generating triangle having greatest radius. Next compare the two selected radii and take as the primary triangle that generating triangle containing the largest inscribed circle of smallest radius. In FIG. 13 Part A, radius 13A78 of inscribed circle 13A72 and radius 13A148 of inscribed circle 13A142 identify the largest inscribed circles. For FIG. 13 Part A the primary triangle is the generating triangle defined by apexes 13A60, 13A30, and 13A40. All remaining analysis pertaining to identification of the implicit target of a quadrilateral physical target refers exclusively to the primary triangle.

3. Analyze the MaxETL of each base-apex in turn by iteration 11320:

(a) Determine $(X_{maxetl_{Am}}, Y_{maxetl_{Am}})$ for current base-apex by procedure 11322.

Apply Eq 18 to $(X_m, Y_m)$ and the current base-apex $(X_A, Y_A)$ to determine $(X_{maxetl_{Am}}, Y_{maxetl_{Am}})$. In FIG. 13 Part B the base-apexes are depicted by 13B30 and 13B40 with the centers of related MaxETL$_{Am}$ at 13B36 and 13B46 respectively.

(b) Determine $R_{MaxETL_{Am}}$ for the current base-apex by procedure 11324.

Apply Eq 2 to $(X_A, Y_A)$ and $(X_{maxetl_{Am}}, Y_{maxetl_{Am}})$ of the current base-apex to determine $R_{MaxETL_{Am}}$. In FIG. 13 Part B $R_{MaxETL_{Am}}$ values for the MaxETL of apexes 13B30 and 13B40 are $\|\overline{13B38}\|$ and $\|\overline{13B48}\|$ respectively.

(c). Determine $\|L_{\overline{c,maxetl_{Am}}}\|$ for the current base-apex by procedure 11326.

Apply Eq 2 to $(X_c, Y_c)$ and $(X_{maxetl_{Am}}, Y_{maxetl_{Am}})$ of the current base-apex to determine $\|L_{\overline{c,maxetl_{Am}}}\|$ the current base-apex. In FIG. 13 Part B $\|\overline{13B13}\|$ and $\|\overline{13B14}\|$ represent the distances between the acquiring entity, 13B10, and centers, 13B36 and 13B46, of MaxETL 13B32 and 13B42 respectively.

(d) For case of one base-apex of $\|L_{\overline{c,maxetl_{Am}}}\| < R_{MaxETL_{Am}}$ continue with block 11328.

If there exists one base-apex A such that $\|L_{\overline{c,maxetl_{Am}}}\| < R_{MaxETL_{Am}}$, continue the implicit target analysis of the quadrilateral from Section 5: "ETL Analysis of the Apex" of the Detailed Analysis of the Triangle.

4. Analyze MaxETL$_E$:

(a) Determine $(X_{max\ etl_{Em}}, Y_{max\ etl_{Em}})$ by procedure 11432.

Apply Eq 18 to $(X_m, Y_m)$ and $(X_E, Y_E)$ to determine $(X_{maxetl_{Em}}, Y_{maxetl_{Em}})$. In FIG. 13 Part B the external apex of the primary triangle is 13B60. The MaxETL of 13B60 is 13B62 with center at 13B66.

(b) Determine $R_{MaxETL_{Em}}$ by procedure 11434.

Apply Eq 2 to $(X_E, Y_E)$ and $(X_{maxetl_{Em}}, maxetl_{Em})$ to determine $R_{MaxETL_{Em}}$. In FIG. 13 Part B the value of $R_{MaxETL_{Em}}$ is $\|\overline{13B68}\|$.

(c) Determine $\|L_{\overline{c,max\ etl_{Em}}}\|$ by procedure 11436.

Apply Eq 2 to $(X_c, Y_c)$ and $(X_{maxetl_{Em}}, Y_{maxetl_{Em}})$ to determine $\|L_{\overline{c,maxetl_{Em}}}\|$. In FIG. 13 Part B this distance is $\|\overline{13B16}\|$.

(d) For acquiring entity located such that $\|L_{\overline{c,maxetl_{Em}}}\| \geq R_{MaxETL_{Em}}$ use procedure 11438.

If $\|L_{\overline{c,maxetl_{Em}}}\| \geq R_{MaxETL_{Em}}$, the acquiring entity is not located within the MaxETL region of either base-apex or the external apex. Apply Eq 2 to $(X_c, Y_c)$ and $(X_m, Y_m)$ to determine $D_t$. $R_M$ is known from above. $W_t$ is twice $R_M$. In FIG. 13 Part B for a acquiring entity located at 13B10, $D_t$ is $\|\overline{13B19}\|$. $W_t$ equals $2 \times \|\overline{13B98}\|$.

5. Analyze the MaxETL of each nonbase-apex in turn by iteration 11440:

Note that the physical target of FIG. 13 Part C has been scaled to better illustrate the portion relevant to analysis of nonbase-apexes.

(a) Determine $(X_{max\ etl_{An}}, Y_{max\ etl_{An}})$ for current nonbase-apex by procedure 11442.

Apply Eq 18 to $(X_n, Y_n)$ and the current nonbase-apex $(X_A, Y_A)$ to determine $(X_{maxetl_{An}}, Y_{maxetl_{An}})$. In FIG. 13 Part C the nonbase-apexes are at 13C20 and 13C50 with the centers of related MaxETL$_A$ at 13C26 and 13C56 respectively.

(b) Determine $R_{MaxET_A}$ for the current nonbase-apex by procedure 11444.

Apply Eq 2 to the current nonbase-apex $(X_A, Y_a)$ and its related $(X_{maxetl_{An}}, Y_{maxetl_{An}})$ to determine $R_{MaxETL_{An}}$. In FIG. 13 Part C, the $R_{MaxETL_{An}}$ values for MaxETL of apexes 13C20 and 13C50 are $\|\overline{13C28}\|$ and $\|\overline{13C58}\|$ respectively.

(c) Determine $\|L_{\overline{c,maxetl_{An}}}\|$ for the current nonbase-apex by procedure 11446.

Apply Eq 2 to $(X_c, Y_c)$ and the current nonbase-apex $(X_{maxetl_{An}}, Y_{maxetl_{An}})$ to determine $\|L_{\overline{c,maxetl_{An}}}\|$. In FIG. 13 Part C, $\|\overline{13C12}\|$ and $\|\overline{13C15}\|$ represent these distances between the acquiring entity, 13C10 and centers, 13C26 and 13C56 of MaxETLs 13C22 and 13C52 respectively.

37

(d) For the case of one apex such that $\|L_{\overline{c,maxetl_{An}}}\| < R_{MaxETL_{An}}$ select block 11448.

If there exists one nonbase-apex such that $\|L_{\overline{c,maxetl_{An}}}\| < R_{MaxETL_{An}}$, continue the implicit target analysis from Section 5: "ETL Analysis of the Apex" of the Detailed Analysis of the Triangle.

6. ETL Analysis of the External Apex:

(a) Determine $(X_{etl_{En}}, Y_{etl_{En}})$ by procedure 11450. Apply Eq 18 to $(X_E, Y_E)$ and $(X_n, Y_n)$ to determine $(X_{etl_{En}}, Y_{etl_{En}})$. FIG. 13 Part D the external apex of the primary triangle is 13D60. $ETL_{En}$, which contains locations 13D60 and 13D86, is 13D102 with center at 13D106.

(b) Determine $R_{ETL_{En}}$ by procedure 11452.

Apply Eq 2 to $(X_E, Y_E)$ and $(X_{etl_{En}}, Y_{etl_{En}})$ to determine $R_{ETL_{En}}$. In FIG. 13 Part D the value of $R_{ETL_{En}}$ is $\|\overline{13D108}\|$.

(c) Determine $\|L_{\overline{c,etl_{En}}}\|$ by procedure 11454.

Apply Eq 2 to $(X_c, Y_c)$ and $(X_{etl_{En}}, Y_{etl_{En}})$ to determine $\|L_{\overline{c,etl_{En}}}\|$. In FIG. 13 Part D the value of $\|L_{\overline{c,etl_{En}}}\|$ is $\|\overline{13D110}\|$.

(d) For the case of $R_{ETL_{En}} \leq \|L_{\overline{c,etl_{En}}}\| < R_{MaxETL_{Em}}$ select block 11456. d The center of the implicit target, $(X_t, Y_t)$, falls on the line connecting the centers of the two inscribed extreme circles, $(X_n, Y_n)$ and $(X_m, Y_m)$. To analyze perform Step 5: "ETL Analysis of the Apex" of the Detailed Analysis of the Triangle. In FIG. 13 Part D the resulting implicit target is depicted by 13D94. The value of $D_t$ is $\|\overline{13D19}\|$. $W_t$ equals $2 \times \|\overline{13D98}\|$.

(e) For the case of $\|L_{\overline{c,etl_{En}}}\| \leq R_{ETL_{En}}$ use procedure 11458.

The optimum acquisition point falls within an area of the primary triangle which is either not part of the physical target or is a sub-optimum location within the physical target. For this case the optimum physical target acquisition point is $(X_n, Y_n)$. In FIG. 13 Part E for a acquiring entity located at 13E10, $\|L_{\overline{c,etl_{En}}}\|$ is $\|\overline{13E16}\|$ and is observed to be less than $\|\overline{13E108}\|$, the radius of $ETL_{En}$ 13E102. If the physical target were not a truncated triangle, implicit target analysis would indicate an optimum hit location on line segment $\overline{13E60,13E86}$, but this segment is either not within the physical target or implies sub-optimum hit locations. Consequently, 13E86, the center of the smallest inscribed extreme circle, 13E84, is selected as implicit target. Apply Eq 2 to $(X_c, Y_c)$ and $(X_n, Y_n)$ to determine $D_t$. $W_t$ equals $2 \times R_N$. In FIG. 13 Part E the value of $D_t$ is $\|\overline{13E19}\|$. $W_t$ equals $2 \times \|\overline{13E88}\|$.

Detailed Analysis of the Trapezoid

Procedure Commences at Block 11500

1. Determine the generating triangle with finite external apex by procedure 11502:

Apply Eq 9 to any two non-adjacent sides of the physical target. If unequal slopes are observed the generating triangle containing these sides has a finite external apex and select this generating triangle. Otherwise select the other generating triangle as the generating triangle having finite external apex. In FIG. 14 Part A the infinite external apex has location at the left end of 14A60 with the other generating triangle having a finite external apex at 14A120.

2. Determine parameters for the generating triangle with finite external apex:

(a) Determine $(X_E, Y_E)$ of the said generating triangle by procedure 11504.

Apply Eq 11 and Eq 12 to the pair of non-parallel sides of the trapezoidal target to determine $(X_E, Y_E)$ of the finite external apex. In FIG. 14 Part A the finite external apex is at location 14A120.

38

(b) Determine $(X_m, Y_m)$, $(X_n, Y_n)$ of said generating triangle by procedure 11506. Apply Eq 13, Eq 14, and Eq 15 to the base-apexes of said generating triangle to determine the center of the circle identified by bisectors of the base-apexes. Apply Eq 13, Eq 14, and Eq 15 to the nonbase-apexes of said generating triangle to determine the center of the circle identified by bisectors of nonbase-apexes. In FIG. 14 Part A the bisectors of base-apexes 14A20 and 14A30 are lines 14A21 and 14A31 respectively and determine the center of inscribed extreme circle 14A132 to be location 14A136. The bisectors of nonbase-apexes 14A50 and 14A40 are lines 14A51 and 14A41 respectively and determine the center of inscribed extreme circle 14A142 to be location 14A146.

(c) Determine $R_M$ and $R_N$ of said generating triangle by procedure 11508.

Repetitively apply Eq 2 to determine the length of each side of said generating triangle. Apply Eq 3 to determine the angle subtended by the external apex of said generating triangle. Repetitively apply Eq 2 to determine the distance between the external apex and the centers of the two inscribed extreme circles identified by apex bisectors. Select one of the inscribed extreme circles and determine its radius by application of Eq 4 to one-half the external apex angle and the distance between the external apex and the center of said circle. Repeat this process to determine the radius of the other inscribed extreme circle. In FIG. 14 Part A the said generating triangle is identified by apexes 14A120, 14A20, and 14A30. The circle identified by base apexes, 14A142, has radius $\|\overline{14A148}\|$ while the circle identified by nonbase apexes, 14A132, has radius $\|\overline{14A138}\|$.

3. Determine parameters for the generating triangle with infinite external apex:

(a) Determine $(X_m, Y_m)$, $(X_n, Y_n)$ of said generating triangle by procedure 11510.

Apply Eq 13, Eq 14, and Eq 15 to the base-apexes of said generating triangle to determine the center of the circle identified by bisectors of these apexes. Apply Eq 13, Eq 14, and Eq 15 to the nonbase-apexes of said generating triangle to determine the center of the circle identified by bisectors of these apexes. In FIG. 14 Part A the bisectors of base-apexes 14A30 and 14A40 are lines 14A31 and 14A41 respectively and determine the center of inscribed extreme circle 14A72 to be location 14A76. The bisectors of nonbase-apexes 14A20 and 14A50 are lines 14A21 and 14A51 respectively and determine the center of inscribed extreme circle 14A82 to be location 14A86.

(b) Determine $R_M$ and $R_N$ of said generating triangle by procedure 11512.

Apply Eq 2 to determine the length of the side between the base-apexes of the generating triangle with infinite external apex. Repetitively apply Eq 2 to obtain the distance between each base-apex and the center of the inscribed extreme circle identified by bisectors of these apexes. Apply Eq 3 and determine one-half the angle of a base-apex. Apply Eq 4 to determine the radius of the inscribed circle. In FIG. 14 Part A the lengths of the lines determined are, $\|\overline{14A30,14A40}\|$, $\|\overline{14A40,14A76}\|$, and $\|\overline{14A30,14A76}\|$. Designator 14A33 depicts one-half the angle of apex 14A30. The radius of all circles which can be inscribed between the parallel sides of the physical target are denoted by $\|\overline{14A78}\|$ 4. Identify the primary triangle by procedure 11514:

Identify the extreme circle in each generating triangle of greatest radius. Select as the primary triangle that generating triangle containing the largest inscribed circle of smallest radius. All remaining analysis pertaining to identification of the implicit target of the trapezoidal target refers only to the primary triangle. In FIG. 14, the generating triangle with infinite external apex has $\|\overline{14A8}\|$ as radius of its largest inscribed extreme. The generating triangle with finite external apex has $\|\overline{14A148}\|$ as radius of 14A142, its largest inscribed extreme circle. In FIG. 14 the generating triangle with infinite external apex is the primary triangle.

5. Identify Type of Analysis Required Based on Primary Triangle Identification:

(a) For case of the primary triangle having finite external apex select block 11516.

Continue analysis at: Section 3: "Analyze MaxETL of Each Base-Apex in Turn" of the Detailed Analysis of the Quadrilateral.

(b) For case of a primary triangle having infinite external apex.

Continue analysis at: Section 6: "Transform Axis" of the Detailed Analysis of the Trapezoid following.

6. Transform axis by procedures 11518 and 11520:

Apply Eq 18 to find the midpoint of the line connecting $(X_m, Y_m)$ and $(X_n, Y_n)$, define this location as point "K". Apply Eq 19 to translate the axis to location K and rotate the axis by the slope of the parallel sides of the primary triangle. In FIG. 14 Part A locations 14A86 and 14A76 depict n and m respectively with location 14A06 depicting K Rotation is by the amount depicted by 14A63. FIG. 14 Part B depicts the physical target configuration after axis transformation.

7. Analyze the MaxETL of each apex in turn by iteration 11522:

(a) Determine $(x_{mexetl_{A_t}}, y_{maxetl_{A_t}})$ of current apex MaxETL by procedure 11524.

Apply Eq 18 to each $(x_A, y_A)$ and the center of the nearest inscribed extreme circle to determine each $(x_{maxetl_{A_t}}, y_{maxetl_{A_z}})$ where z is the closest of m or n to the current A. In FIG. 14 Part A these are locations 14B26, 14B36, 14B46, and 14B56.

(b) Determine $R_{MaxETL_{A_z}}$ of the current MaxETL by procedure 11526.

Apply Eq 2 to the current apex location $(x_A, y_A)$ and its related $(x_{maxetl_A}, y_{maxetl_A})$. In FIG. 14 Part B values of $R_{MaxETL_{A_z}}$ are $\|\overline{14B28}\|$, $\|\overline{14B38}\|$, $\|\overline{14B48}\|$, and $\|\overline{14B58}\|$.

(c) Determine $\|L_{\overline{c,max\,etl_{A_z}}}\|$ of the current MaxETL by procedure 11528.

Apply Eq 2 to $(x_c, y_c)$ and the current $(x_{maxetl_{A_z}}, y_{maxetl_{A_z}})$ to determine the length of each $\|L_{\overline{c,max\,etl_{A_z}}}\|$. In FIG. 14 Part D values of $\|L_{\overline{c,max\,etl_{A_z}}}\|$ are $\|\overline{14D12}\|$, $\|\overline{14D13}\|$, $\|\overline{14D14}\|$, and $\|\overline{14D15}\|$ for the MaxETL of apexes 14D20, 14D30, 14D40, 14D50 respectively.

8. Determine if $(X_c, Y_c)$ is within a MaxETL:

(a) For the case of one A such that $\|L_{\overline{c,max\,etl_{A_z}}}\| < R_{MaxETL_{A_z}}$ select block 11530.

The acquiring entity falls within the MaxETL region of one of the physical target apexes Continue implicit target analysis at: Section 5: "ETL Analysis the Apex" of the Detailed Analysis of the Triangle. In FIG. 14 Part C the acquiring entity lies within the MaxETL of apex 14C30; i.e., within the region delimited by 14C32. For this acquiring entity location the implicit target is 14C94 with $D_t$ equal $\|\overline{14C19}\|$ and $W_t$ equal $2 \times \|\overline{14C98}\|$.

(b) For the case of no A such that $\|L_{\overline{c,max\,etl_{A_z}}}\| < R_{MaxETL_{A_z}}$.

The acquiring entity falls outside all $MaxETL_A$ regions; as exemplified in FIG. 14 Part D by the 14D00 region. To analyze apply: Section 9: "ETL Analysis of the Inscribed Extreme Circle" of the Detailed Analysis of the Trapezoid following.

9. ETL Analysis of the Inscribed Extreme Circle:

(a) For the case of $(x_c < x_n)$ use procedure 11532.

For this case the acquiring entity is located to the left of $x_n$. Implicit target analysis determines the optimal traverse is to n, the center of the left-most inscribed circle. Apply Eq 2 to $(x_c, y_c)$ and $(x_n, y_n)$ to determine $D_t$. $W_t$ is twice the radius of said circle. In FIG. 14 Part D the optimum traverse is from the acquiring entity, 14D10, to the center, 14D96, of implicit target, 14D94. $D_t$ is $\|\overline{14D19}\|$. $W_t$ is twice the radius of the implicit target; i.e., $2 \times \|\overline{14D98}\|$.

(b) For the case of $(x_c > x_m)$ use procedure 11534.

For this case the acquiring entity is located to the right of $x_m$. Implicit target analysis determines that the optimal traverse is to the center, m, of the right-most inscribed circle. Apply Eq 2 to $(x_c, y_c)$ and $(x_m, y_m)$ to determine $D_t$. $W_t$ is twice the radius of said circle. This scenario is not depicted by FIG. 14 but being the mirror image of the case of $(x_c < x_n)$, $D_t$ equals the distance between the acquiring entity and the right-most inscribed extreme circle 14B72 with center at 14B76. As with the $(X_c < x_n)$ scenario, $W_t$ $2 \times \|\overline{14B78}\|$.

(c) For the case of $(x_n \leq x_c \leq x_m)$ use procedure 11536.

For this case the acquiring entity is located on or to the right of $X_n$ and on or to the left of $x_m$. Implicit target analysis determines that the optimum traverse is along the normal to the line connecting the centers of points m and n. $D_t$ is the length of the normal between $y_c$ and the x-axis; namely the value of $y_c$. W is twice the radius of any circle inscribed between the trapezoid physical target's parallel sides. This scenario is depicted by FIG. 14 Part E where the optimum traverse gives $D_t$ of $\|\overline{14E19}\|$; namely the traverse from the acquiring entity, 14E10, to the center, 14E96, of the implicit target 14E94. Wt is twice the radius of the implicit target; i.e., $2 \times \|\overline{14E98}\|$.

Detailed Analysis of the Standard Rectangle

Procedure Commences at Block 11600

For vertically elongated physical targets; i.e., AR<1, designate the top-most inscribed extreme circle as M and its center by location m. Similarly, designate the bottom-most inscribed extreme circle as N and its center by location n. For horizontally elongated physical targets; i.e., AR>1, designate the left-most inscribed extreme circle as M and its center by location m. Similarly, designate the right-most inscribed extreme circle as N and its center by location n.

1. Translate axis by procedure 11602:

Apply Eq 18 to determine the mid-point of the physical target's horizontal and vertical dimensions. Without rotation apply Eq 19 to translate the axis origin to said mid-point. In FIG. 15 Part A said mid-point is depicted by 15A06.

2. Reflect acquiring entity location by procedure 11604.

Perform the following assignments: $u_c = |x_c|$, $v_c = |y_c|$ to position the acquiring entity in quadrant 1 of the translated axis. On each of the separate sheets of FIG. 15 the diagram of the upper portion; i.e., Parts A, C, E, and G, depict an initial acquiring entity position before reflection while the lower portion; i.e., Parts B, D, F, and H, depict the acquiring entity location after reflection. All subsequent analysis is performed only on the upper right physical target apex. Define this apex as "K".

3. Identify the primary triangle by procedure 11606.

Apply Eq 2 to any two adjacent sides of the physical target. The primary triangle is the generating triangle which contains the longest sides of the physical target. In FIG. 15 Part A sides $\overline{15A30, 15A20}$ and $\overline{15A40, 15A50}$ represent segments of the parallel sides of the primary triangle The left end of line 15A61 is defined as the infinitely remote external apex of the primary generating triangle.

4. Determine parameters of the inscribed extreme circles of the primary triangle:

(a) Determine Rm and RN using procedure 11608.

All inscribed circles have a radius equal to one-half the radius of the physical target's narrow dimension. For the translated axis, when $x_K > y_K$ the resulting radius is $R_M = y_K$ and when $x_K < y_K$ the resulting radius is $R_m = x_K$. To illustrate from FIG. 15 Part B, since the physical target is elongated horizontally the radius of circles inscribed within the primary triangle is 15A40$_y$; i.e., width is $\|\overline{15B30, 1540}\|$, the physical target height.

(b) Determine $(x_m, y_m)$ by procedure 11610.

For vertically elongated physical targets: $(x_m, y_m) = (0, (y_K - x_K))$.

For horizontally elongated physical targets: $(x_m, y_m) = ((x_K - y_K), 0)$.

5. Analyze MaxETL$_{Km}$:

(a) Determine $(x_{max\ etlL_{Km}}, y_{max\ etl_{Km}})$ by procedure 11612.

Apply Eq 18 to $(x_K, y_K)$ and $(x_m, y_m)$ to determine $(x_{max\ etlLKm}, y_{max\ etlKm})$. Because this location is common to any scenario of initial acquiring entity location it is depicted as location 15D46, 15F46, and 15H46 in FIG. 15 Parts D, F, and H respectively.

(b) Determine $R_{MaxETL_{Km}}$ by procedure 11614.

Apply Eq 2 to $(x_K, y_K)$ and $(x_{max\ etl_{Km}}, y_{max\ etl_{Km}})$ to determine $R_{MaxETL_{Km}}$. Because this value is common to any scenario of initial acquiring entity location it is depicted as location 15D48, 15F48, and 15H48 in FIG. 15 Parts D, F, and H respectively.

(c) Determine LC maxeti by procedure 11616.

Apply Eq 2 to $(x_c, y_c)$ and $(x_{max\ etl_k}, y_{max\ etl_k})$ to determine $\|L_{\overline{c,max\ etl_k}}\|$. These lengths depend upon the initial acquiring entity location and are depicted as $\|\overline{15D14}\|$, $\|\overline{15F14}\|$, and $\|\overline{15H14}\|$ in FIG. 15 Parts D, F, and H respectively.

6. Identify type of analysis required:

(a) For the case of $\|L_{\overline{c,max\ etl_{km}}}\| < R_{MaxETL_{Km}}$ select block 11618.

The acquiring entity falls within the region delimited by MaxETL$_{Km}$. To analyze apply: Section 5: "ETL Analysis of the Apex" of the Detailed Analysis of the Triangle. FIG. 15 Part C illustrates this scenario. In FIG. 15 Part D the resulting implicit target is depicted by 15D94 with $D_t$ equal $\|\overline{15D19}\|$ and $W_t$ equal $2 \times \|\overline{15D98}\|$.

(b) For the case of $\|L_{\overline{c,max\ etl_{km}}}\| \geq R_{MaxETL_{Km}}$:

The acquiring entity falls outside the MaxETL$_K$ region. To analyze apply: Section 7: "ETL Analysis of the Inscribed Extreme Circle" of the Detailed Analysis of the Standard Rectangular Target following.

7. ETL Analysis of the Inscribed Extreme Circle:

(a) Horizontally elongated physical target:

For the case of $(u_c \leq x_m)$, use procedure 11620.

The acquiring entity is outside influence of all MaxETL regions at a location from which a normal traverse to the line segment connecting the axis origin and the center of the right-most inscribed circle is possible. This case gives $D_t = v_c$ and $W_t = 2 \times y_K$. FIG. 15 Part E illustrates this scenario. In FIG. 15 Part F.the resulting implicit target is depicted by 15F94. $D_t$ equals $\|\overline{15F19}\|$ and $W_t$ equals $2 \times \|\overline{15F98}\|$.

For $(u_c > x_m)$, use procedure 11622.

The acquiring entity is outside influence of all MaxETL regions at a location from which a normal traverse to the line segment connecting the axis origin and the center of the right-most inscribed circle is not possible. This case gives $D_t = \sqrt{(u_c - x_m)^2 + v_c^2}$ and $W_t = 2 \times y_K$. FIG. 15 Part G illustrates this scenario. In FIG. 15 Part H the resulting implicit target is depicted by 15H94. $D_t$ equals $\|\overline{15H19}\|$ and $W_t$ equals $2 \times \|\overline{15H98}\|$.

(b) Vertically elongated physical target:

For the case of $(v_c \leq y_m)$ use procedure 11624.

The acquiring entity is outside influence of all MaxETL regions at a location from which a normal traverse to the line segment connecting the axis origin and the center of the top-most inscribed circle is possible. This case, which is not illustrated, gives $D_t = u_c$ and $W_t = 2 \times x_K$.

For $(v_c > y_m)$, use procedure 11626.

The acquiring entity is outside influence of all MaxETL regions at a location from which a normal traverse to the line segment connecting the axis origin and the center of the top-most inscribed circle is not possible. This case, which is not illustrated, gives $D_t = \sqrt{u_c^2 + (v_c - y_m)^2}$ and $W_t = 2 \times x_K$.

Detailed Analysis of the Parallelogram

Procedure Commences at Block 11700

1. Determine parameters of inscribed extreme circles of the primary triangle:

(a) Determine lengths of physical target sides by procedure 11702.

Repetitively apply Eq 2 to obtain the length of a side in each pair of parallel sides. In FIG. 16 Part A side lengths are $\|\overline{16A50, 16A20}\|$ and $\|\overline{16A20, 16A30}\|$.

(b) Determine the primary triangle by procedure 11704.

The primary triangle is the generating triangle identified by the longest pair of parallel sides of the parallelogram. In FIG. 16 Part A the primary generating triangle has $\overline{16A30, 16A20}$ and $\overline{16A40, 16A50}$ as line segments of its parallel sides.

(c) Determine $(X_m, Y_m)$ of base-apexes by procedure 11706.

Apply Eq 13, Eq 14, and Eq 15 to the base-apexes of the primary triangle to determine the center of the inscribed extreme circle identified by bisectors of these apexes. In FIG. 16 Part A the bisectors of base-apexes 16A30 and 16A40 are lines 16A31 and 16A41 respectively and determine the center of inscribed extreme circle 16A72 to be location 16A76.

(d) Determine $(X_n, Y_n)$ of nonbase-apexes by procedure 11708.

Apply Eq 13, Eq 14, and Eq 15 to the nonbase-apexes of the primary triangle to determine the center of the inscribed extreme circle identified by bisectors of these apexes. In FIG. 16 Part A the bisectors of nonbase-apexes 16A20 and 16A50 are lines 16A21 and 16A51 respectively and determine the center of inscribed extreme circle 16A82 to be location 16A86.

(e) Determine radius of inscribed extreme circles using procedure 11710.

Apply Eq 2 and obtain the length of the side between the base-apexes of the generating triangle. Repetitively apply Eq 2 to obtain the distance between each base-apex and the center of the inscribed extreme circle identified by bisectors of these apexes. Apply Eq 3 and determine the angle of a base-apex. Apply Eq 4 to one-half the base angle apex just determined and $\|L_{\overline{A,m}}\|$ to determine the radius of the inscribed circle. In FIG. 16 Part A the lengths of the lines specified are $\|\overline{16A30, 16A40}\|$, $\|\overline{16A30, 16A76}\|$, and $\|\overline{16A76, 16A40}\|$. Designator 16A33 depicts one-half the angle of apex 16A30. The radius of all circles which can be inscribed between the parallel sides of the physical target is denoted by $\|\overline{16A78}\|$.

2. Adjust Physical target Environment:

(a) Translate and rotate axis by procedure 11712.

Apply Eq 18 to find the midpoint of the line connecting $(X_m, Y_m)$ and $(X_n, Y_n)$, define this location as point "K". Apply Eq 9 to end points of a long side of the primary triangle. Apply Eq 19 to translate the axis to location K and rotate the axis by the slope of the parallel sides of the primary triangle. In FIG. 16 Part A locations 16A76 and 16A86 depict m and n respectively with location 16A06 depicting K. Rotation is by the angle depicted by 16A23. FIG. 16 Part B depicts the physical target configuration after this transformation with 16B02 denoting the origin of the transformed axis.

(b) Reflect acquiring entity and physical target by procedure 11714.

Assign $(u_c = x_c)$ and $(v_c = y_c)$. If $(u_c < 0)$ assign $(u_c = |u_c|)$ and for each of the four physical target apex assign $(x_b = -1 \times x_a)$. If $(v_c < 0)$ assign $(v_c = |v_c|)$ and for each of the four physical target apex assign $(y_b = -1 \times y_a)$. In FIG. 16 Part C the initial acquiring entity location is in Quadrant 1 and no reflection is performed. FIG. 16 Part G depicts the case where the acquiring entity is initially located in Quadrant 2 which entails reflection only about the y-axis. FIG. 16 Part H depicts the post-reflection representation of this case by showing apexes 16H50 and 16H40 as being exchanged and apexes 16H20 and 16H30 being exchanged. FIG. 16 Part E depicts the case where the acquiring entity is located in Quadrant 3 and is reflected about both the x-axis and the y-axis. FIG. 16 Part F depicts the post-reflection representation of this case by showing apexes 16F20 and 16F40 as being exchanged and apexes 16F50 and 16F30 as being exchanged. All subsequent analysis relates only to the positive half plain of the transformed and reflected axis system. Define the upper right apex as "K"

3. Analyze the MaxETL of each base-apex in turn by iteration 11716:

After appropriate axis transformation and appropriate reflection the primary triangle has sides parallel to the translated x-axis and the acquiring entity is located in quadrant 1. Assume the infinitely distant apex of said primary triangle is at $(-x_\infty, 0)$. Base-apex are thus the two right-most physical target apexes.

(a) Determine $(x_{max\ etl_{Am}}, y_{max\ etl_{Am}})$ of current base-apex MaxETL by procedure 11718.

Apply Eq 18 to $(x_m, y_m)$ and the current base-apex $(x_A, y_A)$ to determine its $(x_{max\ etl_{Am}}, y_{max\ etl_{Am}})$. In FIG. 16 Part D, Part F. and Part H $(x_{max\ etl_{Am}}, y_{max\ etl_{Am}})$ values for base-apexes are $\|\overline{16D36}\|$ and $\|\overline{16D46}\|$, $\|\overline{16F56}\|$ and $\|\overline{16F26}\|$, and $\|\overline{16H26}\|$ and $\|\overline{16H56}\|$ respectively. In FIG. 16 Part B base-apexes are depicted by 16B30 and 16B40 with the centers of related MaxETL$_{Am}$ at 16B36 and 16B46 respectively.

(b) Determine $R_{MaxETL_{Am}}$ of current base-apex MaxETL by procedure 11720.

Apply Eq 2 to $(x_A, y_A)$ and the current base-apex $(x_{max\ etl_{Am}}, y_{max\ etl_{Am}})$ to determine its $R_{MaxETL_{Am}}$. In FIG. 16 Part D, Part F. and Part H $R_{MaxETL_{Am}}$ values for base-apexes are $\|\overline{16D38}\|$ and $\|\overline{16D48}\|$, $\|\overline{16F58}\|$ and $\|\overline{16F28}\|$, and $\|\overline{16H28}\|$ and $\|\overline{16H58}\|$ respectively.

(c). Determine $\|L_{\overline{c,max\ etl_{Am}}}\|$ for current base-apex MaxETL using procedure 11722.

Apply Eq 2 to $(u_c, v_c)$ and the current $(x_{max\ etl_{Am}}, y_{max\ etl_{Am}})$ to determine its $\|L_{\overline{c,max\ etl_{Am}}}\|$. In FIG. 16 Part D, Part F, and Part H $\|L_{\overline{c,max\ etl_{Am}}}\|$ values for base apexes are $\|\overline{16D13}\|$ and $\|\overline{16D14}\|$, $\|\overline{16F15}\|$ and $\|\overline{16F12}\|$, and $\|\overline{16H12}\|$ and $\|\overline{16H15}\|$ respectively.

4. Identify type of analysis required:

(a) For the case of one apex such that $\|L_{\overline{c,max\ etl_{Am}}}\| < R_{MaxETL_{Am}}$ use 11724

The acquiring entity falls within the region delimited by a MaxETL. Continue the implicit target analysis of the parallelogram from Section 5: "ETL Analysis of the Apex" of the Detailed Analysis of the Triangle. FIG. 16 Part C illustrates this scenario which does not entail reflection to produce the environment indicated by FIG. 16 Part D. The ETL Analysis of the Apex determines the optimum hit point to be 16D96, the center of implicit target 16D94. $D_t$ is $\|\overline{16D19}\|$. $W_t$ equals $2 \times \|16D98\|$ (b) For the case of $\|L_{\overline{c,max\ etl_{Am}}}\| \geq R_{MaxETL_{Am}}$ and $(0 \leq u_c \leq x_m)$ use 11726.

The x-value of the acquiring entity location falls on or to the right of the y-axis and on or to the left of the x-value of the center of the right-most inscribed extreme circle. For this case: $D_t = v_c$ and $W_t = 2 \times y_K$. FIG. 16 Part E depicts a acquiring entity transformed to location 16E10. Reflection of the acquiring entity and physical target about both the x-axis and the y-axis produces the environment indicated by FIG. 16 Part F. The shortest distance to the implicit target is a normal traverse to the x-axis, thus the distance traversed is the y-component of the transformed, reflected acquiring entity location i.e., to 16F96, the center of implicit target 16F94 for a $D_t$ value of $\|16F19\|$. With the implicit target being within the physical target sides parallel to the x-axis, the radius of said implicit target is the y-component of the location of the upper-right apex location; i.e., $\|\overline{0_x, 16F20_y}\|$.

(c) For the case of $\|L_{\overline{c,max\ etl_{Am}}}\| \geq R_{MaxETL_{Am}}$ and $(x_m < u_c)$ use procedure 11728.

The x-value of the acquiring entity location falls to the right of the x-value of the center of the right-most inscribed extreme circle. For this case: $D_t = \sqrt{(u_c - x_m)^2 + v_c^2}$ and $W_t = 2 \times y_K$. FIG. 16 Part E depicts a acquiring entity initially located at 16G10. Reflection of the acquiring entity and physical target about the x-axis and y-axis gives the environment illustrated by FIG. 16 Part H. The shortest distance to the implicit target is the length of the traverse to the center of the right-most inscribed extreme circle; i.e., to 16H96, the center of implicit target 16H94 for a D, value of $\|16H19\|$. With the implicit target being bounded by sides parallel to the x-axis, the radius of said implicit target is the length of any normal from the long side of the physical target to the x-axis; a distance indicated by the y-component of the location of the upper-right apex location; i.e., $\|\overline{0_x, 16H50_y}\|$.

The invention has been described in an exemplary and preferred embodiment, but is not limited thereto. Those skilled in the art will recognize that a number of additional modifications and improvements can be made in the invention without departure from the essential spirit and scope. The scope of the invention should only be limited by the appended set of claims.

APPENDIX A

Interface Grammar to Express:
Characteristics of the Graphical-User-Interface and Physical Operations of the Terminal Session

Terminology of the InterFace Grammar(IFG)

| Term | Definition |
|---|---|
| Aggregation | → A generic term to reference an association or structure. |
| Artifact | → A generic term to reference the class, object, entity, structure, or association. |
| Artifact origin | → Excepting circular targets, the origin of an artifact is the upper-left corner of the artifact's bounding rectangle. For classes and associations the origin is set to the formal value (0,0). For targets and associations the origin is specified relative to the origin of the parent structure or association. |
| Association | → A uniquely named artifact generated by instantiation of a structure. |
| Bounding rectangle | → The rectangle of smallest dimensions with sides parallel to the axis system that can contain a class-target artifact or all elements of an aggregation artifact. |
| Coordinates | → An ordered pair specifying a location within a Cartesian coordinate system having (0,0) origin with positive X-values extending to the right and positive Y-values extending downward. |
| Class | → A uniquely named template from which multiple copies may be instantiated. |
| Element | → A single artifact that is a member of the artifact set defining a structure or association. |
| Entity | → A uniquely named geometric shape either predefined for the keyboard or generated directly without instantiation from a class. |
| Object | → A uniquely named artifact generated by instantiation of a previously declared class. |
| Parent | → Reference to the artifact of which a target or association is the child. |
| Path | → A sequence of k associations in which, for any n, $assoc_n$ is an element of $assoc_{n-1}$. A path is written as: $assoc_1.assoc_2.\ldots.assoc_{k-1}.assoc_k$ |
| Path terminus | → The right-most association of a path listing. |
| Structure | → A uniquely named template created by defining a set of artifacts comprising targets and/or associations from which multiple copies may be instantiated. |
| Tag | → A unique name given an artifact. Tag comprises a string of arbitrary length which starts with (A-Z,a-z) and continues with (A-Z,a-z,0-9,_,-). |
| Target | → A generic term referencing any single object or entity. |
| WhiteSpace (WS) | → An area specified relative to the coordinate system holding FOCUS which is not within a defined artifact. |

APPENDIX A (continued)

Notation of the InterFace Grammar

| | | |
|---|---|---|
| UPPER CASE STRINGS | → | Reserved strings to be coded as presented. |
| Lower case strings | → | Tags and values submitted by the user. May not be a reserved string. |
| {Opt1 \| Opt2 \| ...} | → | Select no more than one option. An underlined option is the system default value. If the system default is appropriate, the parameter need not be coded. |
| {Opt1}{,Opt1}{,...} | → | Any combination of options may be selected. An underlined option(s) is the system default value(s). If the system default is appropriate, the parameter need not be coded. |
| (x,y) | → | Absence of a prefixed "+" or "−" symbol denotes absolute coordinate values relative to the origin of the aggregation to which the referenced coordinate pair belongs. |
| ({+\|−}x,{+\|−}y) | → | Presence of a prefixed "+" or "−" symbol denotes coordinate displacements along the X and Y axis relative to a coordinate location of the artifact referenced. |
| (tag{($s_1$\|,...)}) | → | Codes as (tag) if the system default is selected. Codes as (tag($s_n$)) if a user specified selection is made. |
| path<tag> | → | Specifies the hierarchy of associations to locate an artifact of which tag is an element. Expanded this is expressed: $assoc_1.assoc_2....assoc_{k-1}.assoc_k$<tag> |
| $t_1\{,t_2\{,t_3\{...\}\}\}$ | → | Specifies an arbitrary number of consecutive unique tag labels. |
| XXX.yyy | → | XXX is system defined. yyy is a user declared identifier for a user declared value or coordinate pair. XXX.yyy can replace any occurrence of values of the IFG having the same data type as XXX.yyy. |

APPENDIX A (continued)
Syntax for:
Top Level Specification of Graphic User Interfaces
and
Declaration of Method Bounds, Task Bounds, and Physical Operations

W → BDGX | BDGO

Specify location of keyboard keys

B → \b | \b\#comment

Declare system default parameters

```
D → \d | dD | \#comment
d → D[GU] | D[FT] | D[FS] | D[S]  | D[Wt] | D[Pt]  | D[Ct] | D[CO]  | D[VAL] | D[SIZ] |
    D[E]  | D[A]  | D[M]  | D[TB] | D[F]  | D[LBL] | D[LO] | D[TXT] | D[TO]  | D[TC]  |
    D[WW] | D[SC] | D[FO] | D[AQ]
```

Describe Graphic-User-Interface

```
G → \g | \gG
g → Gc | Ge | Gs | Gb | Ga| Gt | Gl | Gp | #comment
```

Declare Method and Task bounds

```
X →  \M[methodid=START)]      Y   \M[methodid)=END)]X  | \#comment
     \M[methodid=START)]      Y   \M[methodid)=END)]   | \#comment
Y →  \T[taskid=START)]        O   \T[taskid]=END)]Y    | \#comment
     \T[taskid=START)]        O   \T[taskid]=END)]
```

Specify Physical Operator sequence

```
O → \k | \c | \p | \kO | \cO | \pO
k → Ka | Kp | Kc |Kn | Kf | Kt | Ks | #comment
c → Cs | Cz | Cd | Cf | Cs | Gg  \#comment
```

111

APPENDIX A (continued)
Grammar to Specify Location of Keyboard Keys

Keyboard Declaration b → B[KEYBOARD=
    START
        UNITS=(inches | cm)
        KEYSIZE=((0.5, 0.6) | (width,height))
    s → $K_I$ | $K_Q$ | $K_A$ | $sK_I$ | $sK_Q$ | $sK_A$
        $K_I$ → KEY= $k_S$, LOCATION=$(x_{TL}, y_{TL})$, $(x_{BR}, y_{BR})$
        $K_Q$ → KEY=$(k_L-k_R)$, LOCATION=$(x_{TL_{kl}}, y_{TL_{kl}}), (x_{BR_{kn}}, y_{BR_{kn}}), (x_{BR_{kn}}, y_{BR_{kn}})$
        $K_A$ → KEY=$(k_1, k_2,...)$, LOCATION=$(x_{TL_{kl}}, y_{TL_{kl}}), (x_{BR_{kn}}, y_{BR_{kn}})$
    END]

| | | |
|---|---|---|
| KEYBOARD | → | Designate key locations of a keyboard. |
| UNITS | → | Units employed to express dimensions of keys. |
| KEYSIZE | → | Width and height of standard size keys. |
| $k_S$ | → | Actual symbol of one key as it appears on keyboard. |
| $(k_L-k_R)$ | → | Employed with QWERTY keyboards to specify key rows; i.e., q→], F5→F8, NumLock→←, etc. |
| $(k_1, k_2,...)$ | → | Employed with non-QWERTY keyboards to specify rows of horizontally contiguous keys. |
| $k_L$ | → | The left-most key of a horizontal row of equally spaced keys of KEYSIZE dimensions. |
| $k_R$ | → | The right-most key of the horizontal row commencing with $k_l$. |
| $k_2$ | → | Next key to the right in the horizontal row commencing with $k_l$. |
| LOCATION | → | Designates specific location of one key or a horizontal row of equal-size keys. With the QWERTY keyboard, key groupings conform to groupings listed under "Grammar for Physical Operations Performed on the Keyboard" excluding the Key-Equivalent category. |
| $(x_{TL}, y_{TL}), (x_{BR}, y_{BR})$ | → | Employed with single key specification. For an irregularly shaped "ENTER" key specify the dimensions of the horizontal rectangle having its bottom edge common with "ENTER". |
| $(x_{TL_{kl}}, y_{TL_{kl}}), (x_{BR_{kn}}, y_{BR_{kn}})$ | → | Employed in conjunction with row specifications to reference respectively the top-left and bottom-right corner of the left-most and right-most key in the key row specified |

APPENDIX A (continued)
Grammar to Declare System Default Parameters

```
d → D[GU]    | D[FU]  | D[FT]  | D[FS]  | D[S]   | D[Wt]  | D[Pt]   | D[Ct]  | D[CO]   | D[VAL] | D[SIZ] |
    D[E]     | D[A]   | D[M]   | D[TB]  | D[F]   | D[LBL] | D[LO]   | D[TXT] | D[TO]   | D[TC]  |
    D[WW]    | D[SC]  | D[FO]  | D[AQ]
```

Default Declarations

```
GU  →  GRAPHUNIT  = {INCH | POINT | PIXEL | CM}
FU  →  FONTUNIT   = {POINT | PIXEL | CM | INCH}
FT  →  FONTTYPE   = {COURIER | fontname}
FS  →  FONTSIZE   = {12 | f}
S   →  SCREEN     = {(11.5,8.5) | (width,height)}
Wt  →  WINDOW.tag = {(11.5,8.5) | (width,height)}
Pt  →  PORT.tag   = {(10.7,6.2) | (width,height)}
Ct  →  CANVAS.tag = {(11.0,8.5) | (width,height)}
CO  →  COORD.tag  = {(+0.0,+0.0) | ((+|-)x,(+|-)y)}
VAL →  VALUE.tag  = {integer | real | "text"}
SIZ →  SIZE.tag   = {width, height}
E   →  EDGE   = {NONE | MOVE | SCALE}
A   →  APEX   = {NONE | MOVE | SCALE | RESHAPE}
M   →  MIDDLE = {NONE | MOVE}
TB  →  TITLEBAR = {NONE | MOVE}
GW  →  GRABWIDTH = {5 | n}
F   →  FILL = {NONE | PATTERN | WHITE | LIGHT | MEDIUM | DARK | BLACK}
LBL →  LABEL = {NONE | TAG | PARENTTAG | "text"}
LO  →  LABELORIGIN = {CC | TL | CL | BL | TC | BC | TR | CR | BR | ($x_{TXT}$,$y_{TXT}$)}
TXT →  TEXT = {NONE | TAG | PARAGRAPH}
TO  →  TEXTORIGIN = {TL | CL | BL | TC | CC | BC | TR | CR | BR | ($x_{TXT}$,$y_{TXT}$)}
TC  →  TEXTCURSOR = {(0,0) | (row,column)}
WW  →  WORDWRAP = {YES | NO}
SC  →  CURSOR = {(1,1) | ($x_c$,$y_c$)}
FO  →  FOCUS = {DISALLOW | ALLOW}
AQ  →  ACQUIRE = {ALLOW | DISALLOW}
```

113

APPENDIX A (continued)

| | | |
|---|---|---|
| GRAPHUNIT | → | Units employed to express coordinates of targets. |
| FONTUNIT | → | Units employed to express text height. |
| FONTTYPE | → | Name of a font type. |
| FONTSIZE | → | Text height specified in FONTUNIT units. |
| SCREEN | → | Physical width and height of display area of the CRT screen. |
| WINDOW.tag | → | Width and height of a window assigned to user specified tag. |
| VIEWPORT.tag | → | Width and height of the view onto the canvas assigned to user specified tag. |
| CANVAS.tag | → | Abstract area named tag onto which targets and associations are drawn. |
| COORD.tag | → | Named pair representing coordinate values assigned to user specified tag. |
| VALUE.tag | → | Integer value, scalar value or text string assigned to user specified tag. |
| SIZE.tag | → | Width and height values assigned to user specified tag. |
| EDGE | → | Declares the availability of sides of each target as an acquisition region which can activate a transform unless specifically overridden. |
| APEX | → | Declares the availability of the intersection of target sides as an acquisition region which can activate a transform unless specifically overridden. |
| MIDDLE | → | Declares the availability of the interior of each target as an acquisition region which can activate a transform unless specifically overridden. |
| TITLEBAR | → | Declares the availability of the titlebar of each target containing a titlebar as an acquisition region which can activate a transform unless specifically overridden. |
| GRABWIDTH | → | Defines for each class or target the width of the region bounding each side of each edge and surrounding each apex which can activate transforms unless specifically overridden. |
| FILL | → | Declares the availability of all targets to receive non-text fill. |
| LABEL | → | Declares the availability of all targets to receive a LABEL. Always enabled for STDRECT targets with TITLEBAR. |
| LABELORIGIN | → | Specifies the label offset from the artifact origin. |
| TEXT | → | Declares the availability of all targets to receive text. |
| TEXTORIGIN | → | When TEXT is enabled, specifies the offset from the artifact origin which defines the (0,0) coordinates of TEXTCURSOR. |
| TEXTCURSOR | → | Places the Text Cursor at a row, column location specified relative to TEXTORIGIN. |
| WORDWRAP | → | When TEXT is enabled, inserts a NEWLINE symbol as needed in the text string at the right boundary of a canvas or panel artifact. |

APPENDIX A (continued)

| | | |
|---|---|---|
| CURSOR | → | Places the Screen Cursor at a coordinate location relative to the origin of the artifact holding FOCUS. |
| FOCUS | → | Designates whether an associations coordinate system can serve as the base coordinate system commencing a path. |
| ACQUIRE | → | Designates whether an individual target within the association currently holding FOCUS may be acquired by user activity. |
| POINT | → | Typographic unit of linear measure (1 point = 0.1667 inch). |
| PIXEL | → | Hardware-dependent dimension of the smallest display element of the CRT. |
| CM | → | Metric unit of linear measure (1 cm = 0.39 inch). |
| INCH | → | English unit of linear measure. (1 in = 2.56 cm) |
| COURIER | → | A common font style. |
| fontname | → | User-specified font style available to the computer system. |
| f | → | User-specified font size specified in FONTUNIT units. |
| integer | → | A numeric value having no fractional part. |
| real | → | A numeric value having a fractional part. |
| "text" | → | Any string of symbols generated using the alphameric keypad. |
| (w,h) | → | Width and height of a target specified in appropriate units. |
| (x,y) | → | A coordinate pair specifying an absolute location within the axis system of a referenced association or structure. |
| (±x,±y) | → | A coordinate pair specifying relative displacement from a specified location. |
| ($x_{TXT}$,$y_{TXT}$) | → | A coordinate pair specifying the location of the upper-left text symbol relative to the origin of the target receiving text. |
| (row,col) | → | A pair showing row and column displacement from ($x_{TXT}$,$y_{TXT}$). |
| TL, CL,... | → | Left symbol denotes vertical position: T=top, C=center, B=bottom Right symbol denotes horizontal position: L=left, C=center, R=right. |
| NONE | → | When denoting the keyword value of EDGE, APEX, or TITLEBAR keywords, sets the default to the transforms specified by the MIDDLE keyword unless specifically overridden. When denoting any other keyword value, sets the default to disable the related transform unless specifically overridden. |
| MOVE | → | Sets the default of all artifacts to enable relocation of the artifact acquired unless specifically overridden. |
| SCALE | → | Sets the default of all standard rectangle targets to enable:<br>+ horizontal scale transform following a RIGHT or LEFT EDGE acquisition<br>+ vertical scale transform following a TOP or BOTTOM EDGE acquisition unless specifically overridden. |

APPENDIX A (continued)

RESHAPE → Sets the default of all non-STDRECT targets to enable relocation of the single acquired apex unless specifically overridden.

n → Sets the default pixel width for the acquisition region on each side of all edges and around the apexes of all targets unless specifically overridden.

PATTERN → A user supplied interior fill unless specifically overridden.

WHITE,... → Paints targets with gray shade: WHITE=0% gray, LIGHT=25% gray, MEDIUM=50% gray, DARK=75% gray, and BLACK=100% gray unless specifically overridden.

TAG → Paints the tag name of referenced targets in the manner specified by TEXTORIGIN unless specifically overridden.

PARENTTAG→ Paints the tag name of the parent of referenced artifacts in the manner specified by TEXTORIGIN unless specifically overridden.

DISALLOW → When applied to FOCUS, stipulates that all targets of an association are permanently unavailable for acquisition by user activity. When applied to ACQUIRE, stipulates that any designated target of the association referenced is permanently unavailable for acquisition.

ALLOW → When applied to FOCUS, stipulates that all targets of an association are available for acquisition when that association holds FOCUS. When applied to ACQUIRE, stipulated that a designated target of the association holding focus available for acquisition unless specifically overridden.

APPENDIX A (continued)

Grammar to Describe the Graphic User Interface g → Gc | Ge | Gs | Ga | Gt | Gl | Gp | #comment

Class and Entity Declarations

```
c → C[CLASS=tag_C,
    SHAPE=
      {CIRCLE((r),(x_o,y_o)) |
       TRIANGLE((x_1,y_1),(x_2,y_2),(x_3,y_3)) |
       STDRECT({NULL | (h_Label),}((x_TL,y_TL),(x_BR,y_BR) | (0,0),(+w,+h))) |
       LINE((x_LE,y_LE),(x_RE,y_RE)) |
       QUAD((x_1,y_1),(x_2,y_2),(x_3,y_3),(x_4,y_4))}
    {, /PARM}]

e → E[ENTITY={parent | path}<tag_E>,
    SHAPE=
      {CIRCLE((r),(x_o,y_o)) |
       TRIANGLE((x_1,y_1),(x_2,y_2),(x_3,y_3)) |
       STDRECT({NULL | (h_Label),}((x_TL,y_TL),(x_BR,y_BR) | (x_TL,y_TL),(+w,+h))) |
       LINE((x_LE,y_LE),(x_RE,y_RE)) |
       QUAD((x_1,y_1),(x_2,y_2),(x_3,y_3),(x_4,y_4))}
    {, LOCATION=
      {(0,0) | (x_TL,y_TL) |
       COORD.loc((0,0) | ((+|-)Δ_x,(+|-)Δ_y)) |
       tag_O((TL|BL|TR|BR)((0,0)|((+|-)Δ_x,(+|-)Δ_y)))}}
    {, /PARM}]
```

| | |
|---|---|
| CLASS | → Define an artifact of type CLASS. |
| ENTITY | → Define an artifact of type ENTITY. |
| parent | → Path to the association to which the entity named tag_E will belong. Parent is used as |
| path | default when there is a single ancestor, as when tag_E is an element of a STRUCTURE. |
| tag_C, tag_E | → Name of the CLASS or ENTITY declared. |
| SHAPE | → Designate target geometry. |

CIRCLE((r),(x_o,y_o)) → Radius and center coordinates which define a circular artifact. The origin of the circular artifact is the circle center, (x_o,y_o). For a circle class the origin is set to (0,0). For a circle entity the origin may optionally be specified by the LOCATION parameter.

117

APPENDIX A (continued)

TRIANGLE((x₁,y₁),(x₂,y₂),(x₃,y₃)) →
    Coordinates of three apexes which define a triangular artifact. The origin of a triangular artifact is the top-left corner of the bounding rectangle, $(x_{TL}, y_{TL})$. For a triangle class the origin is set to (0,0). For a triangle entity the origin may optionally be specified by the LOCATION parameter.

LINE((x₁ₗₑ,y₁ₗₑ),(x₁ᵣₑ,y₁ᵣₑ)) →
    Coordinates of the ends which define a line artifact. The origin of a non-vertical line artifact is the left end. The origin of a vertical line artifact is the top end. For a line class the origin is set to (0,0). For a line entity the origin may be specified by the LOCATION parameter.

STDRECT([NULL | (h_title),](x_{TL},y_{TL}),(x_{BR},y_{BR}) | (x_{TL},y_{TL}),+w,+h)) →
    Coordinates of opposite corners of a rectangle having sides parallel to the axis system. When present, h_title specifies the titlebar height with LABEL defaulting to the artifact name and painted at the location specified by LABELORIGIN. When present the bottom-left corner of the titlebar coincides with the top-left corner of the standard rectangular target. The origin of the standard rectangle is the rectangle's top-left corner or the top-left corner of a label is present. For a standard rectangle class the origin is set to (0,0) with values of the bottom-right corner reflecting the width and height of the rectangle respectively; i.e., $(x_{BR}, y_{BR}) = (0+w, 0+h)$. For a standard rectangular entity the origin may optionally be specified by the LOCATION parameter.

QUAD((x₁,y₁),(x₂,y₂),(x₃,y₃),(x₄,y₄)) →
    Coordinates of four apexes which define an arbitrary convex polygonal artifact. The origin of a quadrilateral target is the top-left corner of its bounding rectangle, $(x_{TL}, y_{TL})$. For a quadrilateral class the origin is set to (0,0). For a quadrilateral entity the origin may optionally be specified by the LOCATION parameter.

LOCATION → The LOCATION keyword applies only to ENTITY artifacts. When not present, the origin of ENTITY is as specified in the SHAPE keyword. When present, SHAPE parameters determine relative positioning of artifact apexes with positioning of the artifact origin is determined by the reference specified by LOCATION.

COORD.loc → Origin of tag_E is designated by a pre-determined coordinate location specified ((±Δ_X, ±Δ_Y)) relative to the origin of the path terminus, optionally displaced by + or − Δ_X and + or − Δ_Y.

(x_{TL}, y_{TL}) → Origin of tag_E is specified relative to the origin of the path terminus
tag_O → Origin of tag_E is specified relative to the top-left, bottom-left, top-right, or [(TL),...] bottom-right corner respectively of the bounding rectangle of tag_O, an element of ((±Δ_X, ±Δ_Y))) the path terminus, optionally displaced by + or − Δ_X and + or − Δ_Y.

118

APPENDIX A (continued)

```
PARM →
[   EDGE      = {NONE | MOVE | SCALE}]
[,  APEX      = {NONE | MOVE | SCALE | RESHAPE}]
[,  MIDDLE    = {NONE | MOVE}]
[,  TITLEBAR  = {NONE | MOVE}]
[,  GRABWIDTH = n]
[,  FILL      = {NONE | PATTERN | WHITE | LIGHT | MEDIUM | DARK | BLACK}]
[,  LABEL     = {NONE | TAG | PARENTTAG | "text"}]
[,  LABELORIGIN = {TL| | CL | BL | TC | CC | BC | TR | CR | BR | (x_TXT, y_TXT)}]
[,  TEXT      = {NONE | TAG | PARAGRAPH}]
[,  TEXTORIGIN = {TL| | CL | BL | TC | CC | BC | TR | CR | BR | (x_TXT, y_TXT)}]
[,  TEXTCURSOR = (row, column)]
[,  WORDWRAP  = {YES | NO}]
[,  ACQUIRE   = {ALLOW | DISALLOW}]
```

EDGE → Declares the availability of sides of $tag_E$ or instantiations of $tag_C$ as acquisition regions which can activate transforms.

APEX → Declares the availability of apexes of $tag_E$ or instantiations of $tag_C$ as acquisition regions which can activate transform.

MIDDLE → Declares the availability of the interior of $tag_E$ or instantiations of $tag_C$ as an acquisition region which can activate transforms.

TITLEBAR → Declares the availability of the titlebar of $tag_E$ or instantiations of $tag_C$ as an acquisition region which can activate transforms.

GRABWIDTH → Declares the width of the acquisition region bounding each side of each edge and surrounding each apex of $tag_E$ or instantiations of $tag_C$ which can activate transforms.

FILL → Declares the availability of $tag_E$ or instantiations of $tag_C$ to receive user specified fill.

LABEL → Declares the availability of $tag_E$ or instantiations of $tag_C$ to receive a label.

LABELORIGIN→ Specifies the label start position within a TITLEBAR. Otherwise specifies the top-leftmost coordinate within $tag_E$ or instantiations of $tag_C$ where label may appear.

TEXT → Declares the availability of $tag_E$ or instantiations of $tag_C$ to receive text.

TEXTORIGIN → Specifies the top-leftmost coordinate of $tag_E$ or instantiations of $tag_C$ where text may appear.

APPENDIX A (continued)

TEXTCURSOR → Places the Text Cursor at the row-column of tag$_E$ or instantiations of tag$_C$ specified relative to TEXTORIGIN.

WORDWRAP → Insert a NEWLINE symbol as needed in text string at the right boundary of tag$_E$ or instantiations of or instantiations of tag$_C$.

ACQUIRE → Designates whether tag$_E$ or instantiations of tag$_C$ may be acquired by user activity when the association to which tag$_C$ belongs holds focus.

NONE → When denoting the keyword value of EDGE, APEX, or TITLEBAR keywords, sets the default to the transforms specified by the MIDDLE keyword. When denoting keyword values, sets the default to disable the related transforms for the referenced artifact.

MOVE → Enables the referenced artifact for relocation.

SCALE → Applicable when tag$_C$ is of STDRECT shape. Enables tag$_C$ for:
* horizontal scale transform following a RIGHT or LEFT EDGE acquisition.
* vertical scale transform following a TOP or BOTTOM EDGE acquisition.

RESHAPE → Applicable when tag$_E$ or instantiations of tag$_C$ is of non-STDRECT shape. Enables tag$_C$ for relocation of a single acquired apex.

n → Specifies width of the regions bounding each side of all edges and around the apexes of tag$_C$.

PATTERN → References a user supplied fill style.

WHITE,... → Specifies the shade of gray fill: WHITE=0%, LIGHT=25%, MEDIUM=50%, DARK=75%, and BLACK=100% gray.

TAG → Paint the name of generated targets at the LABELORIGIN location.

PARENTTAG→ Paint the parent association name at the LABELORIGIN location.

"text" → Paint "text" into each generated object at the LABELORIGIN location.

TL,CL,... → Left symbol denotes vertical position: T=top, C=center, B=bottom
Right symbol denotes horizontal position: L=left, C=center, R=right.

($x_{TXT}$,$y_{TXT}$) → A coordinate pair specifying the origin of the left-most text symbol relative to the origin of tag$_E$ or instantiations of tag$_C$.

PARAGRAPH→ Enables the interior of tag$_E$ or instantiations of tag$_C$ for fill with text strings.

DISALLOW → Disables tag$_E$ or instantiations of tag$_C$ as permanently unavailable for acquisition.

ALLOW → Enables tag$_E$ or instantiations of tag$_C$ as available for acquisition.

120

APPENDIX A (continued)

Homogeneous Structure Declaration s → S[STRUCTURE=str$_s$,
    OBJECT={str$_s$}<tag$_1$(,tag$_2$(,tag$_3$(...)})(((R|B)|(O)|(δ)})>,
    CLASS=class$_0$
    (,/PARM)]

STRUCTURE= → Initiate definition of a homogeneous structure of objects instantiated from a single specified class.

str$_s$ → Name of the structure generated. Origin of the structure is the top-left corner of the minimal bounding rectangle which contains all elements comprising str$_s$. The origin of str$_s$ is assigned the formal location (0,0) The origin of objects instantiated from class$_0$ which comprise str$_s$ are specified relative to (0,0).

tag$_1$(,tag$_2$(...)) → Instantiate one object of the class class$_0$ for each tag specified. Consecutively assign the instantiated objects the names tag$_1$, tag$_2$,....

((R|B)|(O)|(δ)}) → Specify placement of (,tag$_2$(...)) relative to top-left corner of the bounding rectangle of tag$_1$ when multiple instantiations are stipulated. R denotes rightward placement, B denotes downward placement, and δ denotes spacing between adjacent sides of tag$_n$ and tag$_{n-1}$.

class$_0$ → The name of the class from which objects are instantiated.

PARM →
{ RELOCATE = (DISALLOW | ALLOW)}
{, FOCUS = (DISALLOW | ALLOW)}
{, TEXT = (NONE | TAG)}

RELOCATE → Designates associations instantiated from str$_s$ are enabled for repositioning.
    FOCUS → Designates associations instantiated from structure str$_s$ can receive focus.
    TEXT → Designates whether objects of instantiations of str$_s$ will be painted with specified fill.
    DISALLOW → Disables instantiations of str$_s$ for the specified activity unless specifically overridden.
    ALLOW → Enables instantiations of str$_s$ for the specified activity unless specifically overridden.
    TAG → Prints the tag name of all target artifacts in manner specified by TEXTORIGIN.

APPENDIX A (continued)

Heterogeneous Structure Declaration

```
s → S[STRUCTURE=str_s,
      START
         {Any combination of target and association declarations.}
      END
      {,/PARM}]
```

STRUCTURE= → Initiate definition of a structure generated from diverse targets and associations.

$str_s$ → Name of the heterogeneous structure being declared. The origin of the structure is the top-left corner of the minimal bounding rectangle which contains all elements comprising $str_s$ and is assigned the formal location (0,0). The origin of elements comprising $str_s$ are specified relative to (0,0).

START/END → Bounds the declarations of artifacts comprising the structure being declared.

```
PARM →
  { RELOCATE = {DISALLOW | ALLOW}}
  {, FOCUS = {DISALLOW | ALLOW}}
  {, TEXT = {NONE | TAG}}
```

RELOCATE → Designates associations instantiated from $str_s$ are enabled for repositioning.

FOCUS → Designates associations instantiated from structure $str_s$ can receive focus.

TEXT → Designates whether objects of instantiations of $str_s$ will be painted with specified fill.

DISALLOW → Disables instantiations of $str_s$ for the specified activity unless specifically overridden.

ALLOW → Enables instantiations of $str_s$ for the specified activity unless specifically overridden.

TAG → Prints the tag name of all target artifacts in manner specified by TEXTORIGIN.

APPENDIX A (continued)

Compound Structure Declaration

```
b → sA_m L_m
s → T[TREESTRU=str_R,
A_m → \GA[ASSOCIATION=str_m<assoc_m>,  STRUCTURE=str_m,  LOCATION=(0,0)
L_m → START B_mn C END
c → NULL | B_mn | B_mn C
  B_mn → O_mn | P_(m+1)h | L_(m+1)
  P_mn → \GP[PARENT=tgt_mn,  ASSOCIATION=assoc_(m+1),  STRUCTURE=str_(m+1),
         LOCATION=tgt_mn|((TL|BL|TR|BR)|((+|-)Δ_x,(+|-)Δ_y))]]
```

| | | |
|---|---|---|
| TREESTRU= | → | Structures containing associations that are children of elements of parent assoc. |
| str_R | → | When appearing with TREESTRU is the name of the structure being declared. |
| str_m | → | When used with "m" subscript, specifies name of the structure instantiating the association which provides parent elements. When used with "m+1" specifies name of the structure instantiating the association providing child associations. |
| m | → | Permits iterative binding of associations to targets. Expansion of $L_{m+1}$ transmits "m+1" as the "m" subscript for the subsequent $L_m$ → START $B_{mn}$C END production. |
| n | → | Each "n" represents a specific, named target which is an element of assoc_m. |
| PARENT | → | Specifies the target of an association to which a child association is bound. |
| tgt_mn | → | Specifies that target "n" of association "m" is parent of association "m+1." |
| assoc_m | → | The association having target "n" as element, and is parent to association "m+1." |
| assoc_(m+1) | → | The child association of target "n", an element of association "m." |
| LOCATION | → | Location specified relative to the origin of the child target. |
| tag_mn[(TL|...) | → | The top-left, bottom-left, top-right, or bottom-right corner respectively of tgt_mn, |
| ((±Δ_x,±Δ_y))] | | an element of assoc_m specified relative to the origin of assoc_m, optionally displaced by + or − Δ_x and + or − Δ_y. |
| PARM | → | {RELOCATE = (DISALLOW | ALLOW)}(,FOCUS = {DISALLOW | ALLOW}) |
| RELOCATE | → | Designates associations instantiated from str_s are enabled for repositioning. |
| FOCUS | → | Designates associations instantiated from str_s can receive focus. |
| DISALLOW | → | Disables instantiations of str_s for the specified activity unless overridden. |
| ALLOW | → | Enables instantiations of str_s for the specified activity unless overridden. |

APPENDIX A (continued)

Object Instantiation

```
o → O[OBJECT={parent | path}<tag₁(,tag₂(,tag₃(...)))((R|B)((0)|(δ))))>,
    CLASS=class₀,
    LOCATION=((0,0) |
    (COORD.loc((0,0) | ((+|-)Δₓ,(+|-)Δᵧ)) |
    (xₜₗ,yₜₗ) |
    tag₀[((TL|BL|TR|BR)[(0,0)|((+|-)Δₓ,(+|-)Δᵧ))]))
    (,/PARM)]
```

OBJECT → Instantiate one or more objects from a previously declared class.
parent → Path to the association to which the objects instantiated will belong. Parent is used as
path       default when there is a single ancestor as occurs with STRUCTURE declarations.
tag₁(tag₂(...)) → Create one object of the class₀ class for each tag specified. consecutively
                  assign the names tag₁, tag₂,....
tag₁(,tag₂(...)) → Instantiate one object of the class class₀ for each tag specified. Consecutively
                   assign the instantiated objects the names tag₁, tag₂,....
((R|B)((0)|(δ))) → Specify placement of (,tag₂(...))) relative to top-left corner of the bounding
                   rectangle of tag₁ when multiple instantiations are stipulated. R denotes rightward
                   placement, B denotes downward placement, and δ denotes spacing between adjacent
                   sides of tagₙ and tagₙ₋₁.
class₀ → Name of a previously declared class from which the object(s) is instantiated.
LOCATION → Location given in the coordinates of the path terminus.
COORD.loc → Origin of tag₁ is designated by a pre-determined coordinate location specified
((±Δₓ,±Δᵧ))   relative to the origin of the path terminus, optionally displaced by
              + or - Δₓ and + or - Δᵧ.
(xₜₗ,yₜₗ) → Origin of tag₁ is specified relative to the origin of the path terminus.
tag₀ → Origin of tag_E is specified relative to the top-left, bottom-left, top-right, or
(((TL)...)   bottom-right corner respectively of the bounding rectangle of tag₀, an element of
((±Δₓ,±Δᵧ))) the path terminus, optionally displaced by + or - Δₓ and + or - Δᵧ.
PARM →
LABEL = (TAG | PARENTTAG | "text")
  TAG → Paint the name of each generated object at the LABELORIGIN location.
  PARENTTAG → Paint the parent association name at the LABELORIGIN location.
  "text" → Paint "text" into each generated object at the LABELORIGIN location.

APPENDIX A (continued)

Association Instantiation a → A[ASSOCIATION=(path<assoc₁[,assoc₂[,assoc₃[...]]][([R|B][(0)|(δ)])])>,
  STRUCTURE=str_s,
  LOCATION=[(0,0) |
    {COORD.loc([(0,0)] | [(+|-)Δ_x, (+|-)Δ_y)] |
    (x_TL, y_TL)} |
    tag₀[((TL|BL|TR|BR)|(0,0)|((+|-)Δ_x,(+|-)Δ_y))]]
  [, /PARM]]

| | | |
|---|---|---|
| ASSOCIATION | → | Instantiate one or more associations from a previously declared structure. |
| path | → | Path to the association to which artifacts created or referenced belong. |
| assoc₁[,assoc₂[...]] | → | Instantiate one association of the structure str_s for each tag specified. Consecutively assign the instantiated associations the names tag₁, tag₂,..... |
| ([R|B][(0)|(δ)]) | → | Specify placement of (,assoc₂[...])) relative to top-left corner of the bounding rectangle of tag₁ when multiple instantiations are stipulated. R denotes rightward placement, B denotes downward placement, and δ denotes spacing between adjacent sides of tag_n and tag_{n-1}. |
| str_s | → | Name of a previously declared structure from which association(s) are instantiated. |
| LOCATION | → | Location given in the coordinates of the path terminus. |
| COORD.loc | → | Origin of assoc₁ is designated by a pre-determined coordinate location specified relative to the origin of the path terminus, optionally displaced by |
| [(±Δ_x, ±Δ_y)] | | + or - Δ_x and + or - Δ_y. |
| (x_TL, y_TL) | → | Origin of assoc₁ is specified relative to the origin of the path terminus |
| tag₀ | → | Origin of tag_E is specified relative to the top-left, bottom-left, top-right, or |
| [((TL|...)] | | bottom-right corner respectively of the bounding rectangle of tag₀, an element of |
| [(±Δ_x, ±Δ_y)])] | | the path terminus, optionally displaced by + or - Δ_x and + or - Δ_y. |

PARM →
{, MEMBER = {NONE | MOVE}]
[, FOCUS = {DISALLOWED | ALLOWED}]

| | | |
|---|---|---|
| MEMBER | → | References a target belonging to the set of artifacts defining str₀. |
| FOCUS | → | Designates whether user activity may acquire instantiated targets. |
| NONE | → | The structure str_s is disabled for the MOVE transform. |
| MOVE | → | Acquisition of any element of str₀ enables str_s for relocation. |

125

APPENDIX A (continued)

Text-Fill of Objects or Entities t → T[TARGET=path<tgt_T>,
    TEXT = "text",
    LOCATION=(TEXTCURSOR | (row,column))]]

| | |
|---|---|
| TARGET | → A specified target is to receive text fill. |
| path | → Path to the association to which tgt_T belongs. |
| tgt_T | → Name of the target to receive text. |
| "text" | → Paint text into tgt_T starting at the location specified by LOCATION. |
| TEXTCURSOR | → Text is to commence at the current location of the text cursor. |
| (row, column) | → Text is to commence at the row-column of tgt_T. |

Pre-Define Coordinate Location l → L[COORD.loc = path<tag_T>(((TL|BL|TR|BR)|(0,0))|((+|-)Δ_x,(+|-)Δ_y))])]

| | |
|---|---|
| COORD | → Denotes a (x,y) coordinate pair for storage in a user declared variable. |
| loc | → The name assigned to the declared coordinate pair. "loc" becomes an integral part of a "COORD.loc" expression |
| path | → Path to the association containing referenced artifacts. |
| tag_T | → Name of an artifact from which a coordinate pair is derived. |
| ((TL|...)) | → Specifies the coordinate pair to be the top-left, bottom-left, top-right, top-right, or bottom-right corner respectively of the bounding rectangle of tag_T. |
| tag_0[(TL|...)] | → The coordinate pair identified is specified relative to the top-left, bottom-left, |
| ((±Δ_x,±Δ_y))] | → an element of the path terminus, optionally displaced by + or − Δ_x and + or − Δ_y. |

126

APPENDIX A (continued)

Paint Artifacts

```
p → P[PAINT=path<tag_P>,
     LOCATION=
     {COORD.loc{(0,0) | ({+|-}Δ_X,{+|-}Δ_Y)} |
     (x_TL,y_TL) |
     tag_O{((TL|BL|TR|BR){(0,0)|({+|-}Δ_X,{+|-}Δ_Y))})}
```

| | | |
|---|---|---|
| PAINT | → | Specifies that a target or association is to be displayed on the CRT screen. |
| path | → | Path to the target or association to be painted. |
| tag_P | → | Name of the target or association to be displayed. |
| LOCATION | → | Location specified in coordinates of the association given by path. |
| COORD.loc | → | Origin of tag_1 specified by a pre-calculated coordinate pair, optionally |
| ({±Δ_X,±Δ_Y}) | | displaced by + or - Δ_X and + or - Δ_Y. |
| (x_TL,y_TL) | → | Coordinate pair specifying the absolute location of the origin of tag_1. |
| tag_O | → | Origin of tag_E is specified relative to the top-left, bottom-left, top-right, or |
| ((TL|...) | | bottom-right corner respectively of the bounding rectangle of tag_O, an element of |
| ({±Δ_X,±Δ_Y})} | | the path terminus, optionally displaced by + or - Δ_X and + or - Δ_Y. |

APPENDIX A (continued)

Grammar for Physical Operations Performed on the Keyboard

```
k → Ka | Kp | Kc | Kn | Kf | Kt | Ks | #comment
```

Alphameric Keypad

```
a → Kaa'
  a' → NULL | aa'
  a  → l | u
    l → stroke of any alphameric, Lower-case key.
    u → stroke of any alphameric, Upper-case key (stroke of SHIFT implicit).
```

Pre-Defined Function Keys

```
p → Px
  x → B | PD | E | H | I | R | S | T | PU | X
    B  → stroke of the Pre-defined, Backspace function key.
    PD → stroke of the Pre-Defined, Page-Down function key.
    E  → stroke of the Pre-Defined, End function key.
    H  → stroke of the Pre-Defined, Home function key.
    I  → stroke of the Pre-Defined, Insert function key.
    R  → stroke of the Pre-defined, Return function key.
    S  → stroke of the Pre-Defined, ESC function key.
    T  → stroke of the Pre-defined, Tab function key.
    PU → stroke of the Pre-Defined, Page-Up function key.
    X  → stroke of the Pre-defined, Delete function key.
```

128

APPENDIX A (continued)

Cursor Control Keypad

```
c  → Ccc'
c' → NULL | cc'
c  → U | D | R | L
     U → stroke of the ↑ Cursor key stroke.
     D → stroke of the ↓ Cursor key stroke.
     R → stroke of the → Cursor key stroke.
     L → stroke of the ← Cursor key stroke.
```

Numeric Keypad

```
n  → Nnn' | Ncc' | Nx
n' → NULL | nn'
n  → stroke of any Numeric pad number key; (e.g. 0-9).
c' → NULL | cc'
c  → stroke of any Numeric pad cursor key; (e.g. U, D, L, R)
x  → / | * | - | + | . | E | ENT | H | I | PD | PU | X
     /   → stroke of the Numeric pad "/" key.
     *   → stroke of the Numeric pad "*" key.
     -   → stroke of the Numeric pad "-" key.
     +   → stroke of the Numeric pad "+" key.
     .   → stroke of the Numeric pad "." decimal point key.
     E   → stroke of the Numeric pad End key.
     ENT → stroke of the Numeric pad ENTER key.
     H   → stroke of the Numeric pad Home key.
     I   → stroke of the Numeric pad Ins key.
     X   → stroke of the Numeric pad Del key.
     PU  → stroke of the Numeric pad Page-Up key.
     PD  → stroke of the Numeric pad Page-Down key.
```

129

APPENDIX A (continued)

Toggle Action

```
t → Tx[a]
  x → C | N | D}
       C → CapsLockKey
       N → NumLockKey
       D → DataToggle Designator (Alphameric strokes are tallied but not included as effort)
  a → {TOGGLE | ON | OFF}
       TOGGLE → Toggle the designated parameter.
       ON     → Specified parameter set to ON by system.
       OFF    → Specified parameter set to OFF by system.
```

F'-Keys

```
f → Fn
  n → stroke of the General Function Fn key
```

Key-Equivalent Functions

```
s → SAAk | SAFn | SAPx | SACc | SCAk | SCPx | SCFn | SCCc | SSAk | SSPx | SSFn | SACc
    AAk → Simultaneous press of the ALT & any Alphanumeric key "k".
    APx → Simultaneous press of the ALT & any Pre-Defined function key "x".
    AFn → Simultaneous press of the ALT & any General Function key "n".
    ACc → Simultaneous press of the ALT & any Cursor Control key "c".
    CAk → Simultaneous press of the CTRL & any Alphanumeric key "k".
    CPx → Simultaneous press of the CTRL & any Pre-Defined function key "x".
    CFn → Simultaneous press of the CTRL & any General Function key "n".
    CCc → Simultaneous press of the CTRL & any Cursor Control key "c".
    sAk → Simultaneous press of the SHIFT & any Alphanumeric key "k".
    SPx → Simultaneous press of the SHIFT & any Pre-Defined function key "x".
    sFn → Simultaneous press of the SHIFT & any General Function key "n".
    sCc → Simultaneous press of the SHIFT & any Cursor Control key "c".
```

APPENDIX A (continued)

Grammar for Physical Operations Performed for Cursor Control c → Cs | Cz | Cd | Cf | Cs | Cg | #comment

Simultaneous Function Key-Button Activation s → Sx(b)R | Sx(b)t$_1$...t$_n$R | tSx(b)R | Sx(b)RtSx(b)R
x → A | C | S
    A → Simultaneous press of ALT and specified button(s).
    C → Simultaneous press of CTRL and specified button(s).
    S → Simultaneous press of SHIFT and specified button(s).
b → i | i,j | i,j,k
    i → Activate button i ($1 \leq i \leq 3$).
    i,j → Simultaneously activate buttons i ($1 \leq i \leq 3$), j ($1 \leq j \neq i \leq 3$).
    i,j,k → Simultaneously activate buttons i ($1 \leq i \leq 3$), j ($1 \leq j \neq i \leq 3$), k ($1 \leq j \neq i \neq k \leq 3$).
t → Traverse of cursor as detailed below.
R → Release of all keys and buttons.

Button Activation z → nC(b) | t | P(b)t$_1$...t$_n$R | nC(b)t | tmC(b) | nC(b)tmC(b)
nC → Perform n button click(s).
mC → Perform m button clicks.
P → Press specified button(s)
R → Release specified button(s)
b → i | i,j | i,j,k
    i → Activate button i ($1 \leq i \leq 3$).
    i,j → Simultaneously activate buttons i ($1 \leq i \leq 3$), j ($1 \leq j \neq i \leq 3$).
    i,j,k → Simultaneously activate buttons i ($1 \leq i \leq 3$), j ($1 \leq j \neq i \leq 3$), k ($1 \leq j \neq i \neq k \leq 3$).

APPENDIX A (continued)

Traverse-Cursor Management t → [path<tag>(EDGE = {T|B|R|L})]
   path<tag> → The association hierarchy of tag.
   EDGE → The region by which to acquire tag.
   T|B|.... → Traverse the cursor to the top, bottom, left, or right edge respectively of tag.

t → [path<tag>(APEX = {(TL|BL|TR|BR} | (x,y)})]
   path<tag> → The association hierarchy of tag.
   APEX → The region by which to acquire tag.
   TL|.... → Acquire the top-left, bottom-left, top-right, or bottom-right corner respectively of the bounding rectangle of tag.
   (x,y) → Traverse the cursor to the apex of tag identified by the specified coordinates.

t → [path<tag>(MIDDLE)]
   path<tag> → The association hierarchy of tag.
   MIDDLE → The region by which to acquire tag.

t → [path<tag>]
   path<tag> → The association hierarchy of tag.
   default → Traverse the cursor into the middle region of tag. This is equivalent to the BNF production t→[path<tag>(MIDDLE)] preceeding.

t → [path<tag>(TITLEBAR)]
   path<tag> → The association hierarchy of tag.
   TITLEBAR → The region by which to acquire tag.

t → [path<tag>(CHAR=(x_{TL},y_{TL}))]
   path<tag> → The association hierarchy of tag.
   CHAR → Acquire a text symbol contained within the object tag.
   (x,y) → Traverse the cursor into the text symbol having a bounding rectangle with origin at $(x_{TL},y_{TL})$ and opposite apex at $(x_{BR},y_{BR})$, both specified relative to the origin of tag

APPENDIX A (continued)

t → [path<assoc>(WHITESPACE = (e), (CURSOR[(0,0) | ((+|-)Δ_x,(+|-)Δ_y)] | (x,y) |
                                COORD.loc[(0,0) | ((+|-)Δ_x,(+|-)Δ_y)] |
                                tag_0[((TL|BL|TR|BR)[(0,0)|((+|-)Δ_x,(+|-)Δ_y)])])]

path<assoc> → The association hierarchy of assoc.
WHITESPACE → An implicit circular target unconstrained by physical target bounds.
e          → Radius of precision required for the implicit circular target in whitespace.
CURSOR     → The artifact is painted relative to the current position of the cursor.
 (±Δ_x,±Δ_y)  displaced by + or - Δ_x and + or - Δ_y.
(x,y)      → An explicit coordinate location specified relative to the origin of assoc.
COORD.loc  → A coordinate location determined by the [COORD.loc(COORD = ...)] expression.
tag_0[(TL  → The origin of tag specified relative to the top-left, bottom-left, top-right,
 |(±Δ_x,±Δ_y)]   or bottom-right corner respectively of the bounding rectangle of tag_c optionally
              displaced by + or - Δ_x and + or - Δ_y.

t → [path<tag>(WORD=(x_TL,y_TL),(x_BR,y_BR))]
path<tag>  → The association hierarchy of tag.
WORD       → Acquire a text word contained within the object tag.
           → Traverse the cursor into the word having a bounding rectangle with origin at (x_TL,y_TL) and
(x,y)         opposite apex at (x_BR,y_BR), both specified relative to the origin of tag.

t → [path<tag>(PARAGRAPH=(x_TL,y_TL),(x_BR,y_BR))]
path<tag>  → The association hierarchy of tag.
PARA...    → Acquire a paragraph contained within the object tag.
           → Traverse the cursor into the paragraph having a bounding rectangle with origin at
(x,y)         (x_TL,y_TL) and opposite apex at (x_BR,y_BR), both specified relative to the origin of tag.

t → [path<tag>(TCURSOR = ((col,row) | ((+|-)col,(+|-)row) | CURSOR))]
path<tag>  → The association hierarchy of tag.
TCURSOR    → Assign location to the Text Cursor.
(row,col)  → A location within tag specified as column-row number from the top-left of tag.
(±r,±c)    → Displace the Text Cursor by "r" rows and "c" columns from its current location in tag.
CURSOR     → Convert current Cartesian coordinate location of the Mouse Cursor into (row,col)
              coordinates and assign Text Cursor to this location.

133

APPENDIX A (continued)

Paint Artifacts

```
d → P[PAINT=path<tag>,
     LOCATION = {ORIGINAL |
                 (x_TL, y_TL) |
                 CURSOR({CENTER | LABEL | ((+|-)Δ_X,(+|-)Δ_Y)}) |
                 COORD.loc{(0,0) | ((+|-)Δ_X,(+|-)Δ_Y)} |
                 tag_0{((TL|BL|TR|BR)[(0,0)|((+|-)Δ_X,(+|-)Δ_Y))]}}]
```

| | |
|---|---|
| PAINT | → Specifies that a target or association is to be displayed on the CRT screen. |
| path | → Path to the target or association to be painted. |
| tag | → Name of the target or association to be displayed. |
| LOCATION | → Location specified in coordinates of the association given by path. |
| FIXED | → Unvarying coordinate pair specified at time of instantiation. |
| $(x_{TL}, y_{TL})$ | → Coordinate pair specifying the absolute location of the origin of tag. |
| CURSOR( | → The artifact is painted relative to the current position of the cursor. |
| CENTER | The center of the bounding rectangle is positioned at the cursor. |
| LABEL | The center of the label is positioned at the cursor. |
| $(\pm\Delta_X, \pm\Delta_Y)$) | The origin of the artifact is positioned at the cursor displaced by $\pm\Delta_X, \pm\Delta_Y$. |
| COORD.loc | → Origin of tag specified by a pre-calculated coordinate pair, optionally |
| $((\pm\Delta_X, \pm\Delta_Y))$ | displaced by + or - $\Delta_X$ and + or - $\Delta_Y$. |
| tag_0 | → Origin of tag_R is specified relative to the top-left, bottom-left, top-right, or bottom-right corner respectively of the bounding rectangle of tag_0, an element of |
| {(TL|...} | |
| $((\pm\Delta_X, \pm\Delta_Y))$}} | the path terminus, optionally displaced by + or - $\Delta_X$ and + or - $\Delta_Y$. |

UnPaint Artifacts

```
d → U[UNPAINT=path<tag>]
```

| | |
|---|---|
| UNPAINT | → Display of specified target or association is to be removed from CRT screen. |
| path | → The path to the target or association to be unpainted. |
| tag | → Name of the target or association to be removed from display. |

134

APPENDIX A (continued)

Assign Focus f → F[FOCUS=path<artifact$_A$>, STATUS=(ASSIGN | UNASSIGN)]

| | | |
|---|---|---|
| FOCUS | → | Specifies capability to acquire of not acquire elements of an association. |
| path | → | Path to association referenced. |
| artifact$_A$ | → | Name of association whose status is to being altered. |
| STATUS | → | Specify FOCUS status. |
| ASSIGN | → | Permit acquisition of any targets within artifact$_A$. |
| UNASSIGN | → | Disallow acquisition of any targets within artifact$_A$. |

Scroll Canvas s → S[SCROLL=(UP | DOWN | RIGHT | LEFT | VERTSLIDER | HORZSLIDER),
PORT=path<tag$_P$>, PORTLOC=((0,0) | (X$_V$,Y$_V$)),
CANVAS=path<tag$_C$> CANVASLOC=((X$_C$,Y$_C$)| (m%,n%) | ((+|-)Δ$_X$,(+|-)Δ$_Y$)) | (tag[((+|-)Δ$_X$,(+|-)Δ$_Y$))]]

| | | |
|---|---|---|
| SCROLL= | → | Translate the origin of the Port relative to the origin of its Canvas to produce coincidence of the coordinate pairs specified by the PORTLOC and CANVASLOC when expressed in screen coordinates. |
| UP,DOWN,... | | Acquire the scroll control button specified. |
| PORT= | | |
| path<tag$_P$> | → | Specification of path to tag$_P$, the Portal referenced. |
| CANVAS= | | |
| path<tag$_C$> | → | Specification of path to tag$_C$, the Canvas linked with tag$_P$. |
| PORTLOC= | → | Convert the origin of Port to absolute screen coordinates. |
| (0,0) | | |
| (X$_P$,Y$_P$) | | Convert (X$_P$,Y$_P$) specified relative to Port coordinates to Screen coordinates. |
| CANVASLOC= | | |
| (X$_C$,Y$_C$) | | Position the specified Port location (X$_P$,Y$_P$) at Canvas location (X$_C$,Y$_C$). |
| (m%,n%) | | Position the specified Port location m and n percent the length of Canvas axis. |
| ±Δ$_X$,±Δ$_Y$ | | Displace the Port origin ±Δ$_X$ and ±Δ$_Y$ units on the Canvas axis. |
| tag(±Δ$_X$,±Δ$_Y$) | | Position the specified Port location at the origin of tag displaces by ±Δ$_X$ and ±Δ$_Y$ units on the Canvas axis. |

Group Management

```
g → G[GROUP = path<grp_G>,
    MEMBERS=[DELETE | {(NULL | + |-)tag_1, (NULL | + |-)tag_2, ..., (NULL | + |-)tag_n}]
    [,/PARM]

GROUP     → Initiate creation, deletion, or alteration of a group.
    path      → Path to an association containing artifacts related to the group.
    grp_G     → Name assigned the non-permanent set of artifacts being manipulated.
    MEMBERS   → Identifies artifacts of the grp_G effected by the production.
    DELETE    → Terminate existence of the group grp_G.
    (tag_n, ...) → Artifact names to be added or deleted from grp_G. "NULL" or "+" specifies addition
                   of the named artifact to group grp_G. "-" specifies deletion of the artifact grp_G.

PARM →
    [MOVE=(ENABLE | DISABLE)]
    (SCALE=XX)
    MOVE      → Specifies whether the group may be relocated.
    SCALE     → Specifies whether the group.
    ENABLE    → Acquisition of an element of grp_G enables grp_G for relocation.
    DISABLE   → Acquisition of an element of grp_G does not enable grp_G for relocation.
```

APPENDIX B
DESCRIPTION OF THE SPIDER MENU

Figure 17 presents an illustrative graphic of the Spider Menu as described in Patent Application Serial No. 08/191,015. With this menu system, there exists no display of the menu graphic unless specifically initiated by the user. Although at the discretion of system designers, to minimize expended physical effort it is recommended that menu activation be affected by simultaneous click of two buttons. At activation the top-level graphic is displayed in the format illustrated by 17A00 of Figure 17 Part A at a position related to cursor location at the moment of menu activation. When the menu displays an odd number of options, the unused option is deactivated and visually shown to be deactivated, as illustrated by 17A22. At menu activation the cursor, 17A02, is positioned under system control at the center of the central region, 17A04, said central region having dynamic characteristics whose purpose is not relevant to the present invention. In general, option acquisition entails traversing the cursor in a radial manner into the chosen option and performing a button click, as illustrated by 17A06. If a sub-option set attaches to a selected option another display is generated to present sub-options appropriate to said selection as illustrated by 17B00 from which the "Edit" option has been selected as indicated by the label of 17B02. If a sub-option display is generated the cursor is moved under system control to the center of the central region of the sub-option display. Upon selection of a leaf option, the system removes the menu graphics from the display and the cursor is returned under system control to the location occupied at the time of menu activation.

Acquisition of any option may be affected by button activation either within the area bounded by horizontal portions of an option, 17A08, or within the region bounded by rays diverging from the center of the central region, 17A10. Within the 17A08 region all circular hit footprints have equal radii as exemplified 17A12. When the hit location is selected to be within a 17A08 region the physical effort of option acquisition is minimized by positioning the hit at the minimal possible distance from the initial cursor location; i.e., 17A14. Alternatively, acquisition may occur within the area bounded by radiating lines; i.e., 17A18 or 17A20. The angle subtended by radiating option sides of an option is $\theta = \frac{360}{n}$ where $n$ is the number of options. The radius of an inscribed circle centered at any point along bisectors of angles formed by pairs of radiating option sides, 17A16, is: $r = D \times \sin\theta$, giving a target width of $W = 2 \times r = 2 \times D \times \sin\theta$. Physical effort of acquiring such a target is:

$$I = \log_2\left(\frac{D}{2D\sin\theta} + 1\right) = \log_2\left(\frac{1}{2\sin\theta} + 1\right). \tag{Eq 20}$$

Physical effort expended for option acquisition along any 17A16 is thus constant and independent of where acquisition is affected. As visually shown by 17A20, an inscribed circle tangent to three sides of an option of which two are tangent to radiating lines may have a radius may be greater than the radius of circles inscribed within the 17A08 portion of an option. To minimize the physical effort of option acquisition, the rational user will thus terminate the traverse along the bisector of the portion of the option delimited by the radiating lines.

From these considerations the physical effort of acquiring any option from an eight option display will be:

$$I = \log_2\left(\frac{1}{2\sin 45} + 1\right) = 0.7716 \text{ bits.}$$

Similarly, the physical effort of option acquisition from a six option display is 0.6575 bits. While not the usual case, for the above example illustrating application of the physical effort metric, there occurs one acquisition from an eight option display and one acquisition from a six option display at each activation of the spider menu system. Thus each spider menu access of the example requires expenditure of 1.43 bits of effort

I claim:

1. A computer-based method of representing computer-human interactions to enable a comparison of a plurality of physical operations performed in said computer-human interactions, comprising the steps of:

(a) defining a physical operator rule grammar to include classes of physical operations and their instantiations of physical operations;

(b) defining said physical operator rule grammar to include interrelationships of said classes to represent said plurality of computer-human interactions;

(c) storing into memory of said computer system a first computer-human interaction;

(d) comparing said stored first computer-human interaction with said physical operator rule grammar to identify said instantiation that corresponds to said first computer-human interaction; and (e) storing in memory said first instantiation that corresponds to said first computer-human interaction as a representation of said first computer-human interaction.

* * * * *